(12) United States Patent
Wolcott et al.

(10) Patent No.: US 9,444,719 B2
(45) Date of Patent: Sep. 13, 2016

(54) REMOTE DETECTION AND MEASUREMENT OF DATA SIGNAL LEAKAGE

(71) Applicant: Comcast Cable Communications, LLC, Philadelphia, PA (US)

(72) Inventors: Lawrence D. Wolcott, Denver, CO (US); Philip Chang, Langhorne, PA (US); Wilfredo Colon, Philadelphia, PA (US); Paras Kharwal, Englewood, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 132 days.

(21) Appl. No.: 14/498,553

(22) Filed: Sep. 26, 2014

(65) Prior Publication Data
US 2015/0029869 A1  Jan. 29, 2015

Related U.S. Application Data

(63) Continuation-in-part of application No. 13/834,962, filed on Mar. 15, 2013.

(60) Provisional application No. 61/773,138, filed on Mar. 5, 2013.

(51) Int. Cl.
*H04L 12/26* (2006.01)
*H04B 3/487* (2015.01)

(52) U.S. Cl.
CPC .............. *H04L 43/50* (2013.01); *H04B 3/487* (2015.01)

(58) Field of Classification Search
CPC ..................................................... H04L 43/50
See application file for complete search history.

(56) References Cited

U.S. PATENT DOCUMENTS

| 5,311,546 | A | 5/1994 | Paik et al. |
| 5,881,108 | A | 3/1999 | Herzberg et al. |
| 6,377,810 | B1 | 4/2002 | Geiger et al. |
| 6,434,193 | B1 | 8/2002 | Fukuoka |
| 6,556,239 | B1 | 4/2003 | Al-Araji et al. |
| 6,671,334 | B1 | 12/2003 | Kuntz et al. |

(Continued)

FOREIGN PATENT DOCUMENTS

JP          04208707 B2      1/2009

OTHER PUBLICATIONS

"VSWR, or Voltage Standing Wave Ratio", available at http://emc.loprudder.com/vswr.pdf (last visited Nov. 22, 2010).

(Continued)

*Primary Examiner* — Rasheed Gidado
(74) *Attorney, Agent, or Firm* — Banner & Witcoff, Ltd.

(57) ABSTRACT

Disclosed are systems and methods for detecting and locating ingress of an over-the-air signal into a wired communications network. Computing devices located in a plurality of different areas may be configured to identify amplitude of signals transmitted over the wired communications network as it varies by signal frequency. In one embodiment, the system may determine expected amplitude of the over-the-air signal at the plurality of different areas. In other embodiments, the system may identify amplitudes received over the wired communication path at the computing devices. The system may determine a location at which the over-the-air signal has entered the wired communications network based on a comparison of the identified and expected amplitudes of the over-the-wire signal.

20 Claims, 55 Drawing Sheets

(56) References Cited

U.S. PATENT DOCUMENTS

| | | | |
|---|---|---|---|
| 6,728,887 B1 | 4/2004 | Dziekan et al. | |
| 6,862,315 B1 | 3/2005 | Garg et al. | |
| 6,880,170 B1 | 4/2005 | Kauffman et al. | |
| 6,947,502 B2 | 9/2005 | Taylor et al. | |
| 6,947,741 B2 | 9/2005 | Beech et al. | |
| 7,142,609 B2 | 11/2006 | Terreault et al. | |
| 7,574,492 B2* | 8/2009 | Karaoguz | H04W 24/02 455/456.1 |
| 7,742,777 B2 | 6/2010 | Strater et al. | |
| 7,843,847 B2 | 11/2010 | Quigley et al. | |
| 8,143,900 B2* | 3/2012 | Shimp | G01R 29/0828 324/527 |
| 8,284,828 B2 | 10/2012 | Cooper et al. | |
| 8,416,697 B2 | 4/2013 | Wolcott et al. | |
| 8,458,759 B2 | 6/2013 | Zinevich | |
| 8,576,705 B2 | 11/2013 | Thibeault et al. | |
| 8,650,602 B2 | 2/2014 | Pond et al. | |
| 8,787,223 B2* | 7/2014 | Watson | H04W 88/14 370/310 |
| 8,829,916 B2* | 9/2014 | Defoort | H04M 3/085 324/512 |
| 2001/0017904 A1 | 8/2001 | Pukkila et al. | |
| 2003/0058786 A1 | 3/2003 | Sato et al. | |
| 2003/0109999 A1 | 6/2003 | Stein et al. | |
| 2003/0191856 A1* | 10/2003 | Lewis | H04L 12/5692 709/241 |
| 2003/0217122 A1 | 11/2003 | Roese et al. | |
| 2004/0100881 A1 | 5/2004 | Wakabayashi et al. | |
| 2004/0145470 A1 | 7/2004 | Fager et al. | |
| 2004/0153898 A1 | 8/2004 | Hidaka | |
| 2004/0222908 A1 | 11/2004 | MacDonald et al. | |
| 2005/0207346 A1 | 9/2005 | Chu et al. | |
| 2005/0226421 A1 | 10/2005 | Briancon et al. | |
| 2006/0007997 A1 | 1/2006 | Jones | |
| 2006/0121946 A1 | 6/2006 | Walton et al. | |
| 2006/0271986 A1 | 11/2006 | Vogel | |
| 2007/0109995 A1 | 5/2007 | Quigley et al. | |
| 2007/0211618 A1 | 9/2007 | Cooper et al. | |
| 2007/0288982 A1 | 12/2007 | Donahue | |
| 2008/0080607 A1 | 4/2008 | Shah | |
| 2008/0089224 A1 | 4/2008 | Kim et al. | |
| 2008/0129421 A1 | 6/2008 | Ninan et al. | |
| 2008/0192816 A1 | 8/2008 | Momtaz | |
| 2008/0276111 A1 | 11/2008 | Jacoby et al. | |
| 2009/0007210 A1 | 1/2009 | Nishide et al. | |
| 2009/0268799 A1 | 10/2009 | Wang et al. | |
| 2009/0304065 A1 | 12/2009 | Choi et al. | |
| 2010/0095360 A1 | 4/2010 | Pavlovski et al. | |
| 2010/0142608 A1 | 6/2010 | Kim et al. | |
| 2010/0158093 A1 | 6/2010 | Thompson et al. | |
| 2010/0183258 A1 | 7/2010 | Chow et al. | |
| 2010/0185865 A1 | 7/2010 | Yeap et al. | |
| 2010/0223650 A1 | 9/2010 | Millet et al. | |
| 2011/0026577 A1 | 2/2011 | Primo et al. | |
| 2011/0110415 A1 | 5/2011 | Cooper et al. | |
| 2015/0318937 A1* | 11/2015 | Ruth | H04L 27/34 375/224 |

OTHER PUBLICATIONS

Melissa Ray Weimer, "Waveform Analysis Using The Fourier Transform", DATAQ Instruments, Inc., available at http:!/www.dataq.com/applicat/articles/an11.htm (last visited Nov. 22, 2010).

Rob Thompson et al., "Optimizing Upstream Throughput Using Equalization Coefficient Analysis", Motorola Home & Networks Mobility, prior to Nov. 1, 2010.

Robert L. Howald et al., "Characterizing and Aligning the HFC Return Path for Successful DOCSIS 3.0 Rollouts", SCTE Cable-Tec Expo, Denver, CO, Oct. 28-30, 2009.

Robert L. Howald et al., "Docsis 3.0 Upstream: Readiness & Qualification," SCTE Cable-Tec Expo, Oct. 2009.

Docsis® Best Practices and Guidelines Proactive Network Maintenance Using Preequalization CM-GL-PNMP-V01-100415; Apr. 15, 2010.

CableLabs invention disclosure titled "Pre-Equalization based proactive network maintenance process model"; prior to Nov. 1, 2010.

Hranac, R., "Linear Distortions part 1 ,"downloaded Apr. 22, 2010.

Qureshi, S.U.H., "Adaptive Equalization," Proceedings of the IEEE, Sep. 1985.

CableLabs invention disclosure titled "A Simple algorithm for fault localization using naming convention and micro reflection signature"; prior to Nov. 1, 2010.

\* cited by examiner

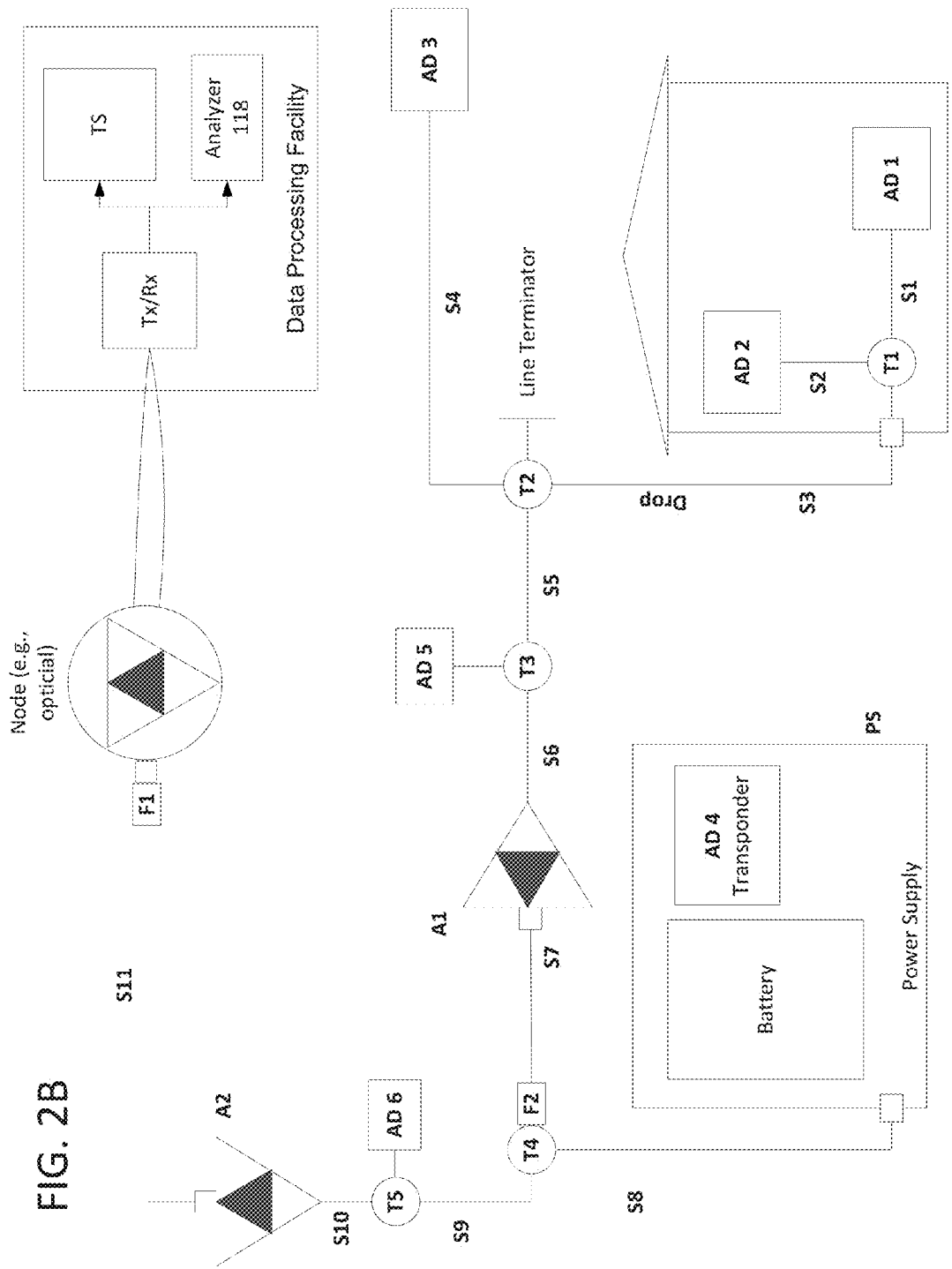

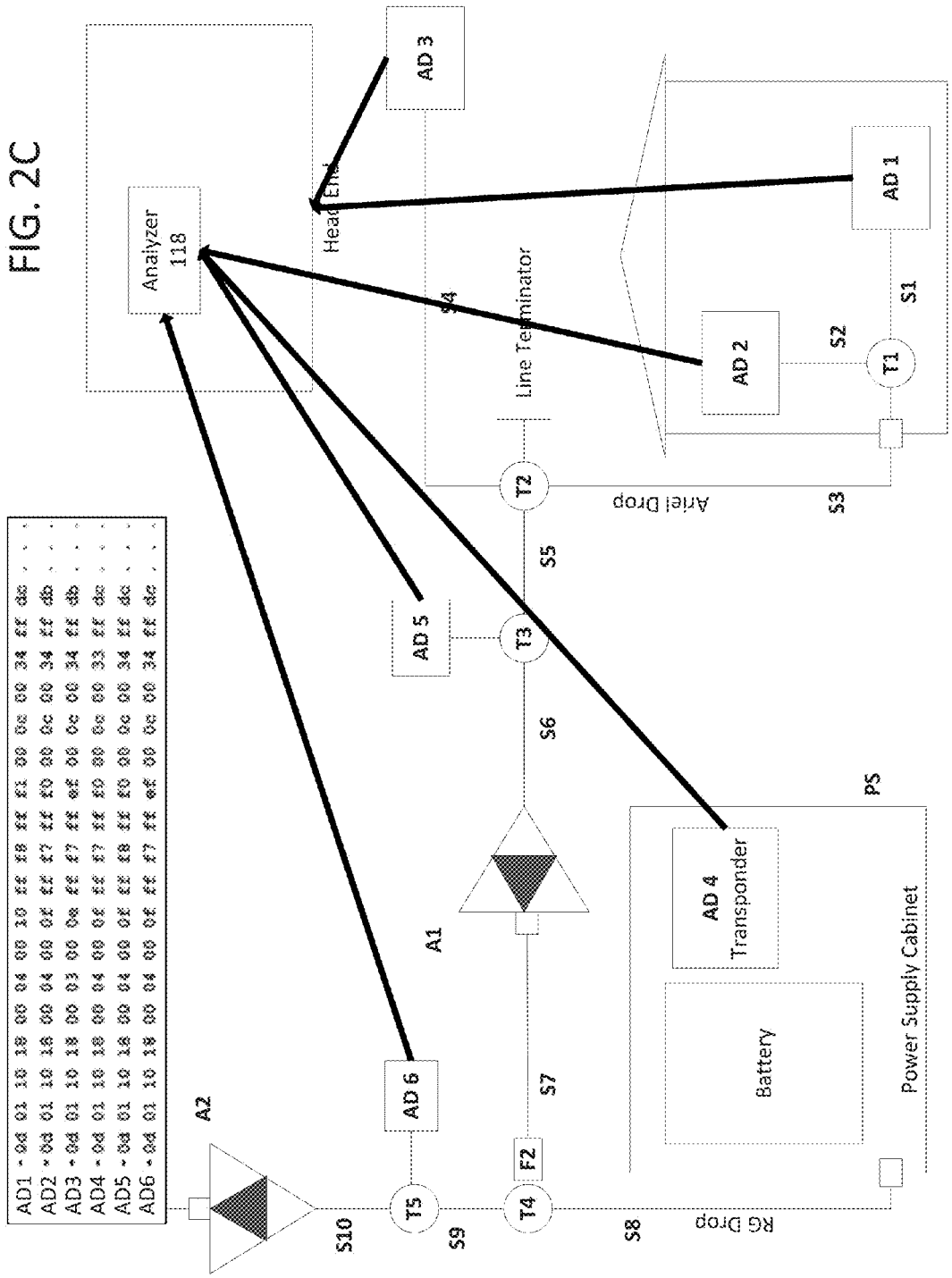

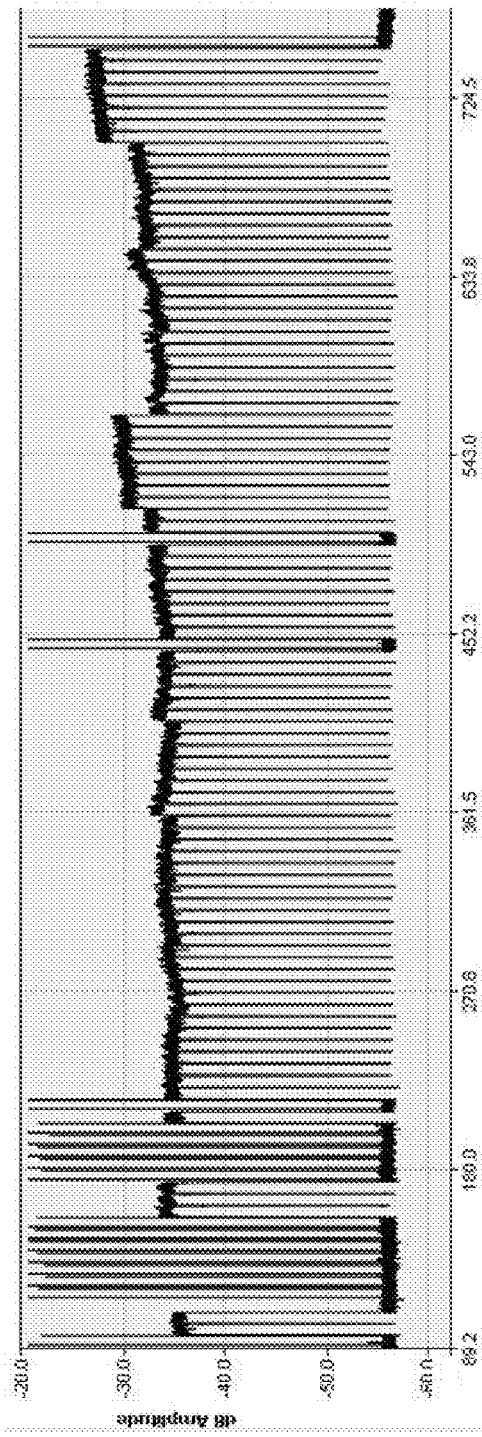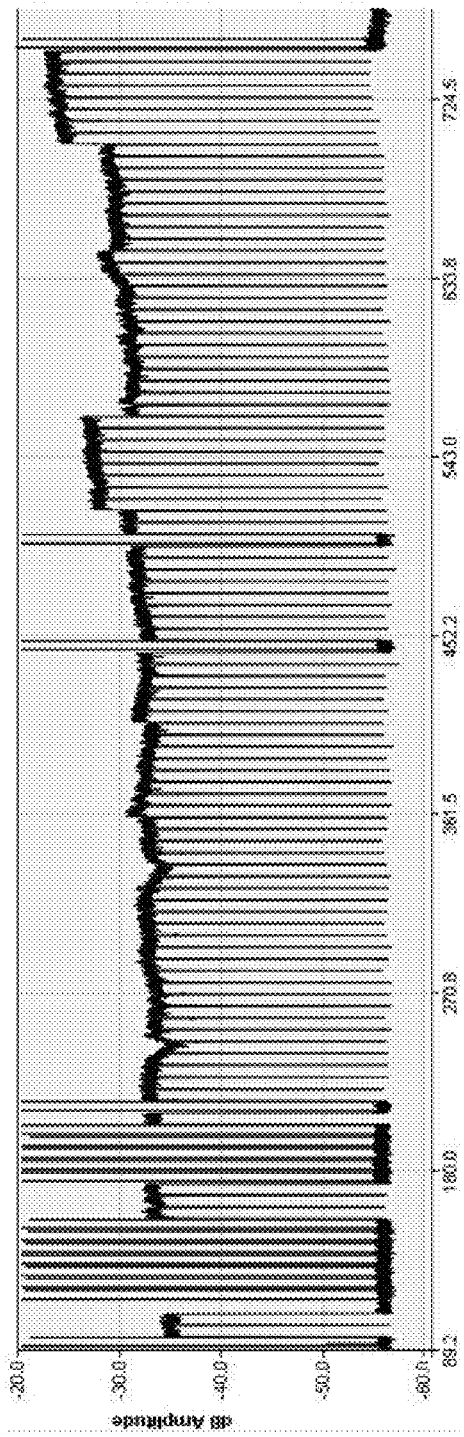

| Index | AD Identifier | f 1 | | f 2 | | ... | f N | | ... |
|---|---|---|---|---|---|---|---|---|---|
| | | r | i | r | i | | r | i | |
| 00001 | <MAC addr. for AD1> | <r> | <i> | <r> | <i> | ... | <r> | <i> | ... |
| 00002 | <MAC addr. for AD2> | <r> | <i> | <r> | <i> | ... | <r> | <i> | ... |
| 00003 | <MAC addr. for AD3> | <r> | <i> | <r> | <i> | ... | <r> | <i> | ... |
| ⋮ | ⋮ | ⋮ | ⋮ | ⋮ | ⋮ | | ⋮ | ⋮ | |
| N | <MAC addr. for ADn> | <r> | <i> | <r> | <i> | ... | <r> | <i> | ... |

FIG. 6A

| Index | AD Identifier | Iteration 1 | | Iteration 2 | | ... | Iteration T | |
|---|---|---|---|---|---|---|---|---|
| | | t | p | t | p | | t | p |
| 00001 | <MAC addr. for AD1> | <t> | <p> | <t> | <p> | ... | <t> | <p> |
| 00002 | <MAC addr. for AD2> | <t> | <p> | <t> | <p> | ... | <t> | <p> |
| 00003 | <MAC addr. for AD3> | <t> | <p> | <t> | <p> | ... | <t> | <p> |
| ⋮ | ⋮ | ⋮ | ⋮ | ⋮ | ⋮ | | ⋮ | ⋮ |
| N | <MAC addr. for ADn> | <t> | <p> | <t> | <p> | ... | <t> | <p> |

FIG. 6B

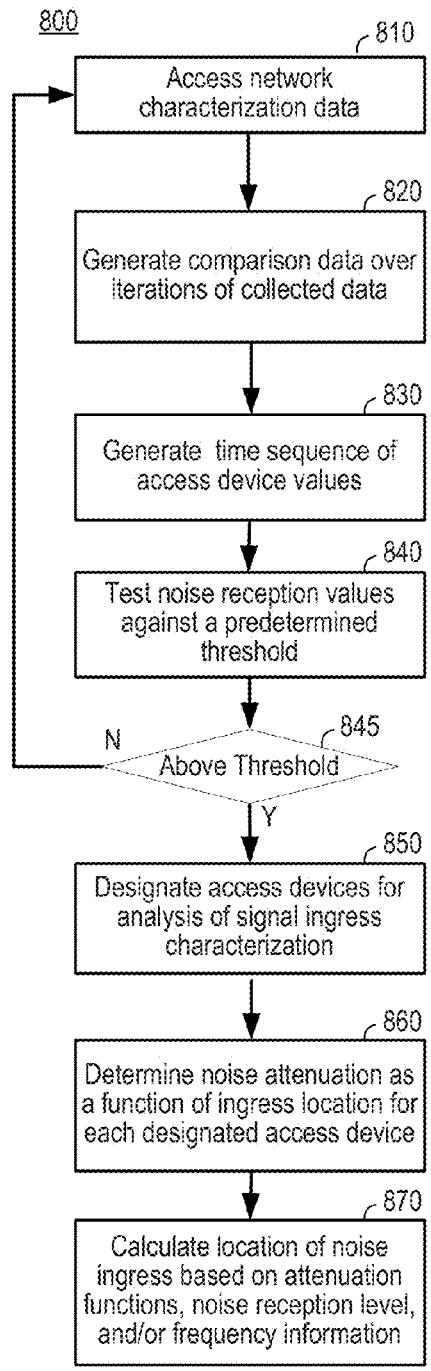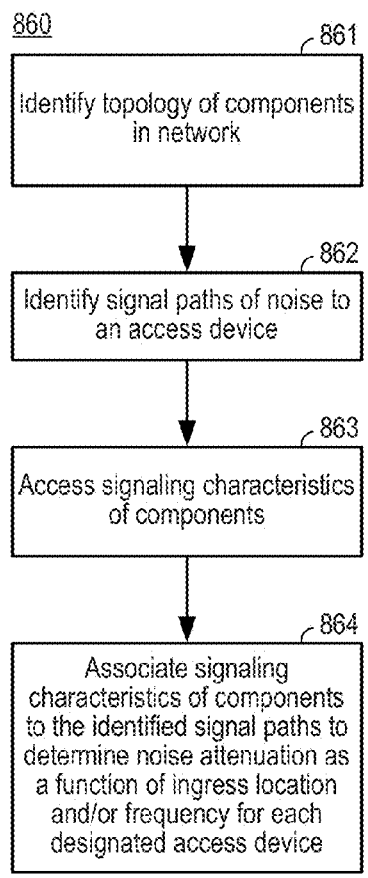
FIG. 8A
FIG. 8B

| Index | AD Identifier | f 1 | f 2 | ... | f N | ... | Sum | Freq. |
|---|---|---|---|---|---|---|---|---|
| 00001 | <MAC addr. for AD1> | <d> | <d> | ... | <d> | ... | <s> | <f> |
| 00002 | <MAC addr. for AD2> | <d> | <d> | ... | <d> | ... | <s> | <f> |
| 00003 | <MAC addr. for AD3> | <d> | <d> | ... | <d> | ... | <s> | <f> |
| ... | ... | ... | ... | ... | ... | ... | ... | ... |
| N | <MAC addr. for ADn> | <d> | <d> | ... | <d> | ... | <s> | <f> |

FIG. 9A

| Index | AD Identifier | Iteration 1 | | | Iteration 2 | | | ... | Iteration T | | |
|---|---|---|---|---|---|---|---|---|---|---|---|
| | | t | s | f | t | s | f | | t | s | f |
| 00001 | <MAC addr. for AD1> | <t> | <s> | <f> | <t> | <s> | <f> | ... | <t> | <s> | <f> |
| 00002 | <MAC addr. for AD2> | <t> | <s> | <f> | <t> | <s> | <f> | ... | <t> | <s> | <f> |
| 00003 | <MAC addr. for AD3> | <t> | <s> | <f> | <t> | <s> | <f> | ... | <t> | <s> | <f> |
| ... | ... | ... | ... | ... | ... | ... | ... | ... | ... | ... | ... |
| N | <MAC addr. for ADn> | <t> | <s> | <f> | <t> | <s> | <f> | ... | <t> | <s> | <f> |

FIG. 9B

| Index | Id. | Attenuation Factor |
|---|---|---|
| 1 | AD1 | AF1(location, frequency) |
| 2 | AD2 | AF2(location, frequency) |
| 3 | AD3 | AF3(location, frequency) |
| 4 | AD4 | AF4(location, frequency) |
| 5 | AD5 | AF5(location, frequency) |
| 6 | AD6 | AF6(location, frequency) |

FIG. 9C

| Node | Device 1 | | Device 2 | |
|---|---|---|---|---|
| | Device | Terminal | Device | Terminal |
| 1 | ON | 1 | S11 | 1 |
| 2 | S11 | 2 | A2 | 1 |
| 3 | A2 | 2 | S10 | 1 |
| 4 | S10 | 2 | T5 | 1 |
| 5 | T5 | 2 | AD6 | 1 |
| 6 | T5 | 3 | S9 | 1 |
| 7 | S9 | 2 | T4 | 1 |
| 8 | T4 | 2 | S8 | 1 |
| 9 | T4 | 3 | F2 | 1 |
| 10 | F2 | 2 | S7 | 1 |
| 11 | S8 | 2 | PS (AD4) | 1 |
| 12 | S7 | 2 | A1 | 1 |
| 13 | A1 | 2 | S6 | 1 |
| 14 | S6 | 2 | T3 | 1 |
| 15 | T3 | 2 | AD5 | 1 |
| 16 | T3 | 3 | S5 | 1 |
| 17 | S5 | 2 | T2 | 1 |
| 18 | T2 | 2 | S4 | 1 |
| 19 | T2 | 3 | S3 | 1 |
| 20 | S4 | 2 | AD3 | 1 |
| 21 | S3 | 2 | T1 | 1 |
| 22 | T1 | 2 | S2 | 1 |
| 23 | T1 | 3 | S1 | 1 |
| 24 | S2 | 2 | AD2 | 1 |
| 25 | S1 | 2 | AD1 | 1 |

FIG. 9D

| Index | Id. | Parameter 1 | | Parameter 2 | | Parameter 3 | | Parameter 4 | |
|---|---|---|---|---|---|---|---|---|---|
| | | Para. | Value | Para. | Value | Para. | Value | Para. | Value |
| 1 | AD1 | Type | AD | sig. loss | 0dB | | | | |
| 2 | AD2 | Type | AD | sig. loss | 0dB | | | | |
| 3 | AD3 | Type | AD | sig. loss | 0dB | | | | |
| 4 | AD4 | Type | AD | sig. loss | .5dB | | | | |
| 5 | AD5 | Type | AD | sig. loss | .5dB | | | | |
| 6 | AD6 | Type | AD | sig. loss | .5dB | | | | |
| 7 | S1 | Type | RG-6 | 5-42MHz | 1dB/100ft | .6-.75 GHz | 5dB/100ft | length | 10ft |
| 8 | S2 | Type | RG-6 | 5-42MHz | 1dB/100ft | .6-.75 GHz | 5dB/100ft | length | 10ft |
| 9 | S3 | Type | RG-6 | 5-42MHz | 1dB/100ft | .6-.75 GHz | 5dB/100ft | length | 200ft |
| 10 | S4 | Type | RG-11 | 5-42MHz | .5dB/100ft | .6-.75 GHz | 2dB/100ft | length | 100ft |
| 11 | S5 | Type | RG-11 | 5-42MHz | .5dB/100ft | .6-.75 GHz | 2dB/100ft | length | 100ft |
| 12 | S6 | Type | RG-11 | 5-42MHz | .5dB/100ft | .6-.75 GHz | 2dB/100ft | length | 100ft |
| 13 | S7 | Type | RG-11 | 5-42MHz | .5dB/100ft | .6-.75 GHz | 2dB/100ft | length | 100ft |
| 14 | S8 | Type | RG-11 | 5-42MHz | .5dB/100ft | .6-.75 GHz | 2dB/100ft | length | 100ft |
| 15 | S9 | Type | RG-11 | 5-42MHz | .5dB/100ft | .6-.75 GHz | 2dB/100ft | length | 100ft |
| 16 | S10 | Type | RG-11 | 5-42MHz | .5dB/100ft | .6-.75 GHz | 2dB/100ft | length | 500ft |
| 17 | S11 | Type | RG-11 | 5-42MHz | .5dB/100ft | .6-.75 GHz | 2dB/100ft | length | 500ft |
| 18 | A1 | Type | amp | 5-42MHz | 10dB(up), -60dB(dn) | .6-.75 GHz | -60dB(up), 10dB(dn) | | |
| 19 | A2 | Type | amp | 5-42MHz | 10dB(up), -60dB(dn) | .6-.75 GHz | -60dB(up), 10dB(dn) | | |
| 20 | T1 | Type | splitter | ins. loss | 4dB | tap iso. | 20dB | | |
| 21 | T2 | Type | splitter | ins. loss | 4dB | tap iso. | 20dB | | |
| 22 | T3 | Type | tap | ins. loss | 1dB | tap iso. | 20dB | | |
| 23 | T4 | Type | tap | ins. loss | 1dB | tap iso. | 20dB | | |
| 24 | T5 | Type | tap | ins. loss | 1dB | tap iso. | 20dB | | |
| 25 | F2 | Type | filter | ins. loss | 0dB | | | | |

FIG. 9E

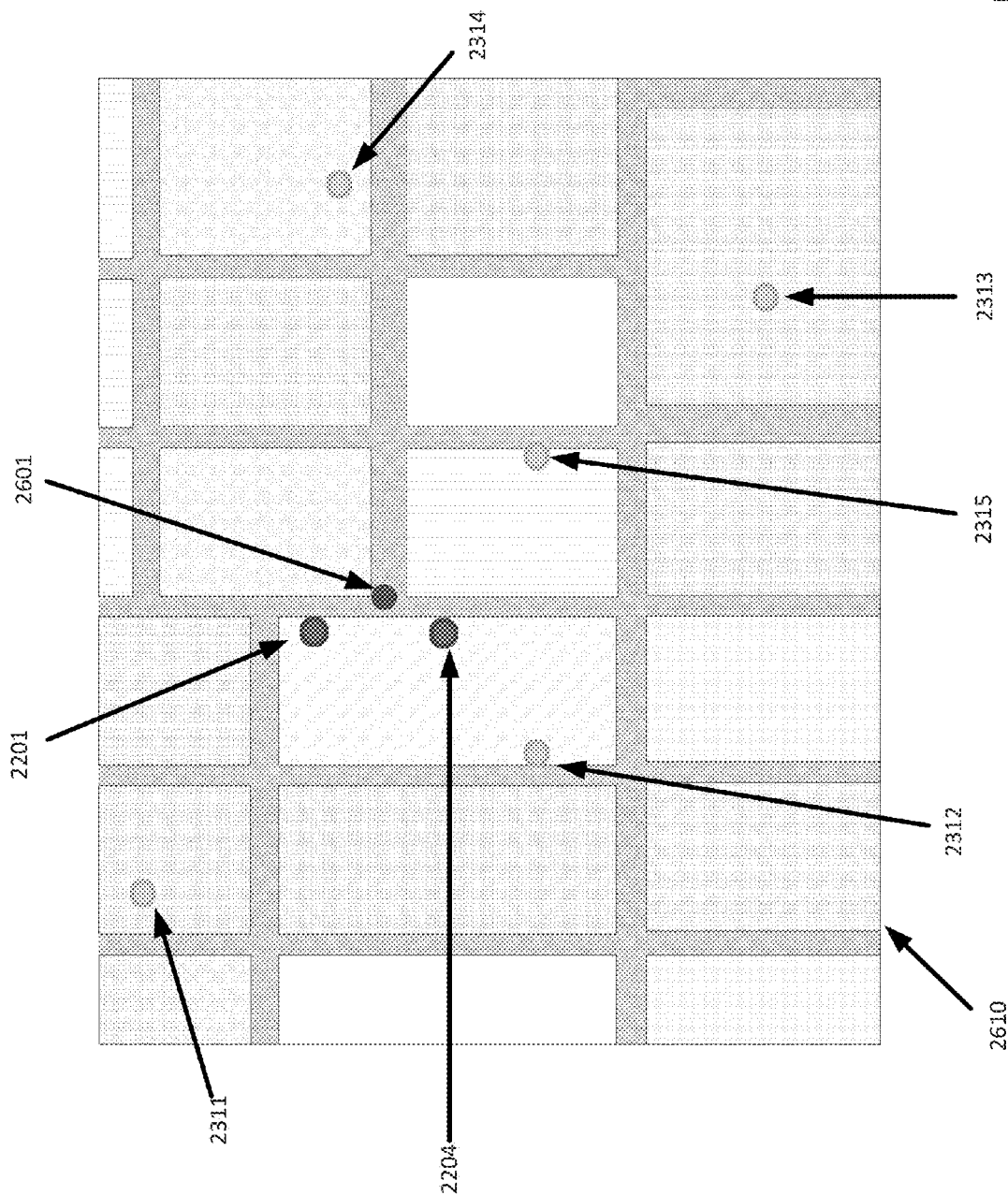

REMOTE DETECTION AND MEASUREMENT OF DATA SIGNAL LEAKAGE

RELATED APPLICATIONS

This application is a continuation-in-part of and claims the benefit of priority from U.S. Non-Provisional patent application Ser. No. 13/834,962 filed Mar. 15, 2013, which claims priority from U.S. Provisional Application No. 61/773,138, filed Mar. 5, 2013 and entitled "Network Implementation of Spectrum Analysis." The content of the aforementioned applications are hereby incorporated by reference in their entirety.

BACKGROUND

Content providers use a series of interconnected communication links, such as coaxial cables and optical fibers, to transmit signal frequencies for providing television and data services to consumers. Many communication networks include multiple access devices communicating with a hub device. Over time, anomalies in a communication channel between an access device and the hub may induce signal distortions in the channel. Additionally, signals may begin to leak from the communication channel due to a variety of reasons (e.g., loose connectors, damaged or unterminated cables, etc.). Communication links or channels such as coaxial cables and/or optical fibers may include an outer sheath that encloses and/or surrounds a center conductor which carries the intended communication frequency signal. The outer sheath of the communication link may be configured to protect the inner center conductor of the link and to reduce signal leakage outside the sheath, and conversely, reduce signal ingress onto the link. The outer sheath may degrade, corrode, or become worn down due to external elements, such as friction, weather, and the like.

The wearing down of the outer sheath may lead to a break and/or tear of the sheath, which may expose the inner conductor of the communication link. Once exposed, signal frequencies other than the intended communication frequency, such as wireless transmissions, may ingress onto the communication link. Conversely, the large volume of constant downstream signals transmitted over the communication link may cause signal leakage at points in the communication link where the inner conductor has been exposed.

Such leaks can interfere with any over-the-air services that use a similar range of frequencies as the content provider. As a result, content providers must continuously inspect, locate, and repair leaks within their systems to maintain their signal integrity, as well as to adhere to regulatory requirements governing wireless signal interference. There is an ever present need to assist content providers to improve the effectiveness and efficiency of detecting signal leaks in a network.

SUMMARY

The following summary is for illustrative purposes only, and is not intended to limit or constrain the detailed description. The following summary merely presents various described aspects in a simplified form as a prelude to the more detailed description provided below.

As disclosed herein, the inventors have determined that certain network faults have specific characteristics that can be used to identify the type of fault and to identify the location of the fault. Examples of such anomalies may include micro-reflections due to impedance discontinuities and the ingress of noise from external sources. Features herein further relate to systems and methods for remotely detecting and measuring signal leaks in a network. For example by measuring the amplitude and frequencies of signal levels received at a downstream device, the receive signal level attributable to over-the-air signal ingress onto a communication link (e.g., coaxial cable) may be calculated for a plurality of user premises devices, thus permitting a network operator (or content provider) to determine and/or triangulate the location and amount of ingress of an over-the-air signal onto a communication link, and conversely, determine the location and amount of signal egress (or leakage) from the communication link based on signal data obtained from the plurality of user premises devices. Such signal data may be utilized to more efficiently detect, locate, and repair signal leaks on a network.

In some aspects, apparatus, systems, and methods are disclosed for detecting, identifying, and locating the source of anomalies in a communication network. In various embodiments, access devices may time-sample communication signals received over the network, and from the time-sampled data, calculate frequency characteristics (e.g., spectrum analysis data) of the network, portions of the network, particular or groups of devices, etc. The frequency characteristics may include in-band or out-of-band characteristics associated with one or more communication channels in the network and/or include characteristics related to status, health, or performance of the network.

An analyzer may collect from access devices, for example, data indicative of spectrum analysis data calculated at each of the access devices. In some aspects, the analyzer may then detect and locate various anomalies and determine anomaly sources. Such anomalies may include malfunctioning amplifiers, impedance cavities, excessive signal loss/egress, noise ingress, wideband interference/noise, arcing, incorrect plant setup, excessive tilt and leveling, frequency selective RF attenuations and notches, excessive attenuation, automatic gain control errors in amplifiers, etc. Detection may be made by comparing and characterizing the frequency data over time, across several access devices, and/or over different frequency spectrums that include multiple communication channels and/or non-channel bands. The network topology and frequency response may be determined, and with the characterized frequency data, identify and locate the anomalies.

According to additional aspects of the disclosure, a leakage detection system may detect downstream devices located at one or more user premises, and may obtain spatial information for one or more of the downstream devices, such as a geographic location of the downstream device. The downstream devices may be equipped with a spectrum analyzer, which may be configured to detect signal frequencies transmitted on a communication link from a content provider to a user premises. The leakage detection system may also query or communicate with databases containing information relating to various broadcasters and/or broadcast stations operating in a particular geographic area. These databases may also provide information relating to various transmission devices (e.g., transmitters) associated with and/or utilized by broadcasters to transmit signal frequencies.

According to further aspects, the leakage detection system may query a plurality of downstream devices for frequency spectrum data indicating the amplitude of downstream signals received at each device as it varies by signal frequency. The leakage detection system may process the frequency spectrum data to determine the one or more devices that have detected signal ingress onto the communication link (e.g., frequencies on the communication link other than the intended communication frequencies transmitted from the content provider). For one or more of the downstream devices detecting signal ingress, the leakage detection system may calculate expected amplitude of signal frequencies transmitted by one or more transmitters, and compare the expected amplitude with frequency spectrum data obtained by the downstream device. Based on these comparisons, the system may process and analyze frequency spectrum data obtained from the one or more downstream devices to determine a location and/or amount (e.g., amplitude, level, etc.) of the signal ingress, and conversely, determine a location and amount of the signal egress According to additional aspects, the leakage detection system may determine and/or confirm the location of signal ingress (or egress) by comparing a probable area or location of the signal ingress with the location of communication links within the network. The system may also determine and/or confirm the location of signal ingress (or egress) by identifying expected signal boundaries associated with transmitters that have been identified by the system as emitting over-the-air signals that are entering the communication link. The system may utilize the expected signal boundaries to determine the location of the signal ingress (or egress).

The summary here is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

FIGS. 2A-2C include illustrative diagrams of a branch of the network in FIG. 1 in accordance with various embodiments.

FIGS. 4A-4L illustrate user interfaces presenting frequency spectrum data of computing devices that indicate noise caused by different types of breaks or faults in a network according to various embodiments.

FIGS. 6A-6B illustrate various data structures in accordance with one or more embodiments.

FIGS. 8A-8B illustrate operations in flow charts that may be performed in accordance with one or more embodiments.

FIGS. 9A-9E illustrate various data structures in accordance with one or more embodiments.

FIG. 26 illustrates an example layout of user premises and signal transmission devices according to one or more illustrative aspects of the disclosure.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
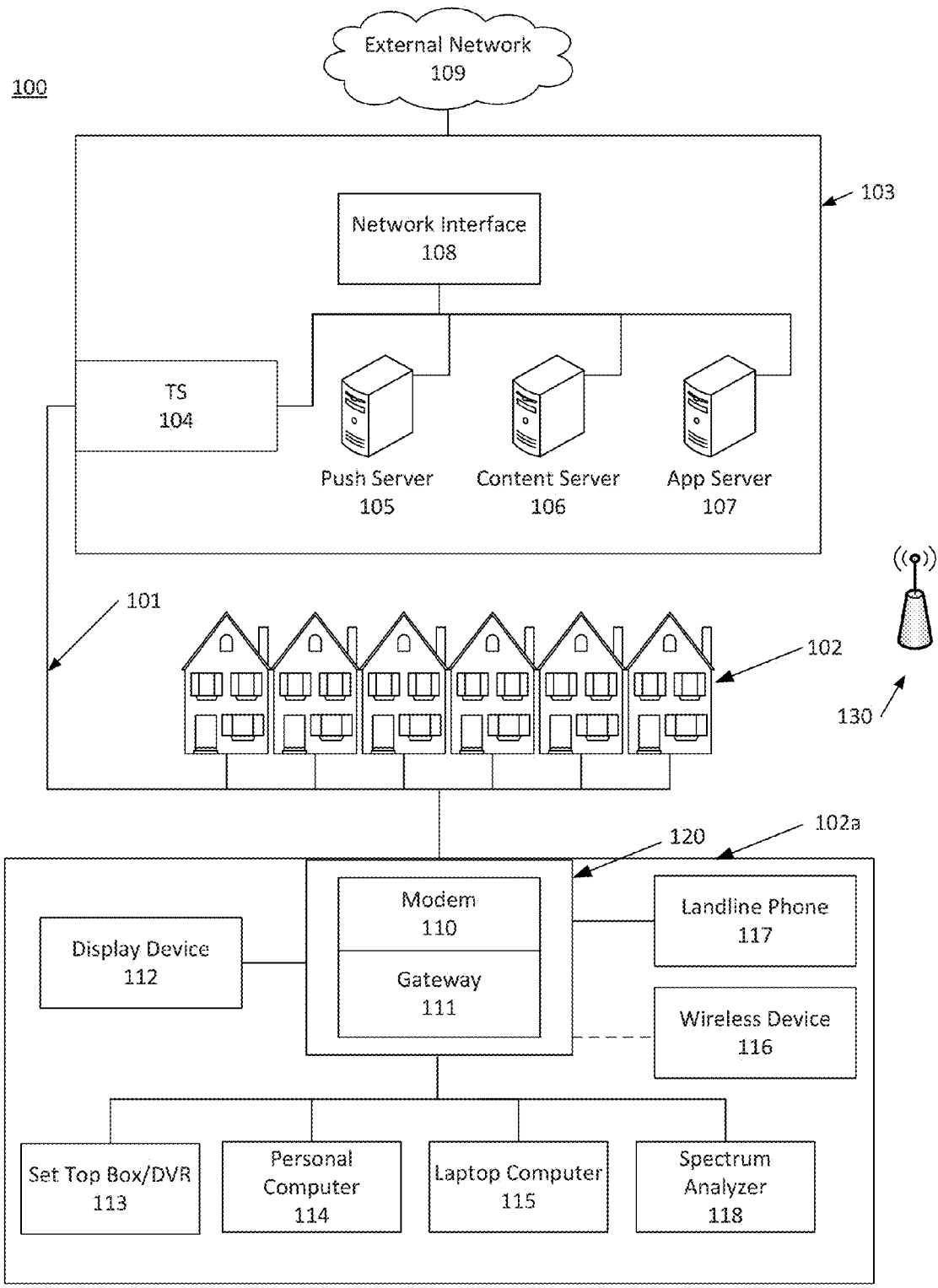
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. In yet other embodiments, network 100 may include a Fiber to the Home (FTTH) network, Fiber to the Premises (FTTP) network, passive optical network (PON), RF over glass (RFOG) network, Digital Subscriber Line (DSL) network, multimedia over coax access (MOCA) network, etc. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface, such as a termination system (TS) 104. In a hybrid fiber-coaxial network, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others. Consumer premises equipment ("CPEs") (e.g., modems, gateways, and the like) may include or be operatively connected to an analyzer (e.g., spectrum analyzer device), which detects and measures signal frequencies received at the analyzer. Interface 120 may include or be operatively connected to spectrum analyzer device 118. The spectrum analyzer device 118 may detect and measure the frequency and amplitude (e.g., magnitude, strength, etc.) of downstream signals transmitted over links 101 to a user premises as it varies by signal frequency within a defined range of frequencies. Spectrum analyzer 118 may also include a software based tuner that permits analyzer 118 to detect a wider frequency spectrum than may be detected by digital tuners.

Analyzer 118 may retrieve from local office 103 (or directly from devices located at user premises 102 via network 100) data that indicates signal characteristics in communication paths between access devices located at the various user premises (e.g., modems, gateways, etc.), and between the access devices and local office 103. In some embodiments, this data includes in-band and out-of-band (e.g., guard intervals) frequency data of signals received at devices (e.g., consumer premises equipment). According to some embodiments, Analyzer 118 may process the retrieved data to characterize consumer premises equipment ("CPEs"), to identify CPEs that share communication paths or portions of paths, and to diagnose and locate network problems such as noise/interference ingress, attenuation, malfunctioning network elements, and other anomalies. Although FIG. 1 shows analyzer 118 communicating with local office over link 101, analyzer 118 could alternatively be connected to (or be a part of) local office 103, or may alternatively be connected to network 100 itself At various times, a noise source (NS) 130 may be present that introduces noise into the system at one or more CPEs and/or at a location within network 100. As will be discussed in more detail below, noise source 130 may include an external signal, such as an over-the-air signal or wireless transmission from a transmission device, or may result from an anomaly that distorts signals present on the network FIGS. 2A-2C include illustrative diagrams of a branch of the network of FIG. 1, in which noise, interference, and/or other anomalies may be detected according to various embodiments. For providing a non-limiting example using components relative to a particular network, FIGS. 2A-2C are described with respect to a hybrid coax/fiber network, though other networks and components may be used.

Figure 2A:
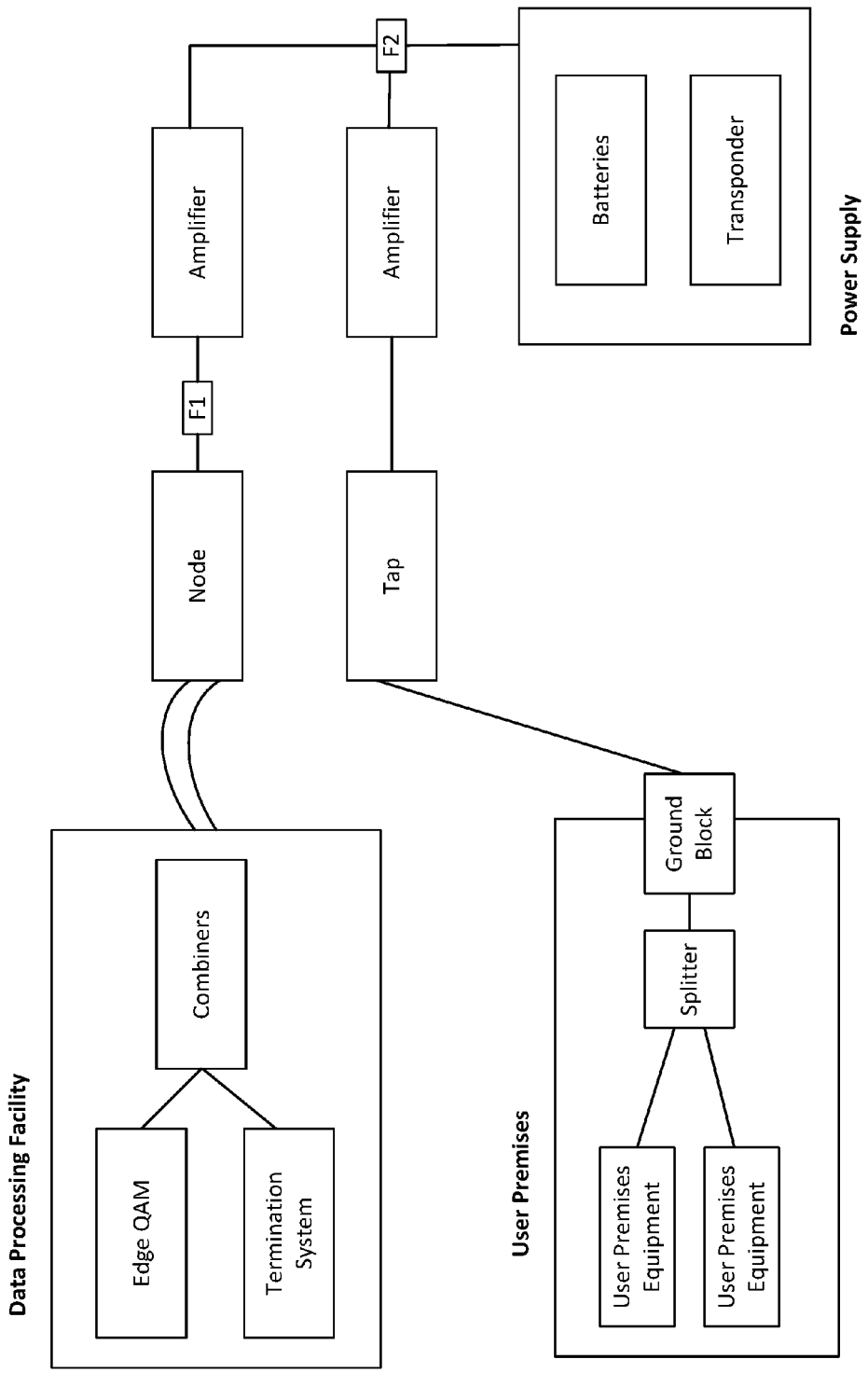

Referring to FIG. 2A, at a first end, the network branch may begin at a data processing facility (e.g., headend) that includes a termination system TS (e.g., a cable modem termination system (CMTS)), a modulator and/or demodulator (e.g. an edge quadrature amplitude modulator and demodulator), a computing device such as analyzer 118 (not depicted), and combiners equipped to combine multiple signals onto the network. In some variations, the network may carry optical signals on optical strands between the data processing facility (e.g., headend) and an optical node. The optical node may include an optical combiner/splitter, which receives downstream optical signals at an optical/RF converter that re-modulates the downstream signals as RF signals onto a coaxial cable network beginning at a communication link (e.g., hardline trunk). The downstream signal may progress over the communication link to an amplifier and then across a feed (e.g., an RG coaxial cable). The feed may connect to one or more taps that may include communication links (e.g., drop lines) to customer premises equipment and/or network equipment, such as power supply cabinets (e.g., a unit comprising batteries and a transponder). In an example, the power cabinet may provide back-up power to a subset of the network active elements (e.g., amplifiers). The network may continue across additional coaxial cables, amplifiers, and feeder taps, and filters (not illustrated). The feeder taps may connect to customer premises via a communication link (e.g., drop line) cable and/or a ground block. The signal may enter the customer premises through the ground block, pass through one or more splitters, and connect to a plurality of customer premises equipment (e.g., a cable modem, a set top box, etc.). In an example, an upstream signal may traverse the network in a similar fashion from the customer premises and/or network equipment to the termination system at the data processing facility (e.g., head end). The optical node may receive upstream RF signals from the communication link (e.g., hardline trunk) and re-transmit the upstream signals as optical signals.

FIG. 2B illustrates a block diagram of a branch of a network similar to FIG. 2A according to various embodiments. The network branch may begin at a headend or other termination point that may for example include a termination component (e.g. a cable modem termination system (CMTS)), the analyzer 118, and a bidirectional interface (e.g., an optical transmitter/receiver). The termination point may be coupled to the remainder of the branch via the bidirectional interface through a bidirectional fiber-optic communication path connecting the termination system to a fiber node (e.g., fiber-optic/coax node). The optical node may include an optical combiner/splitter, which receives downstream optical signals at an optical/RF converter, which drives a modulator, which then transmits RF signals onto the coax network beginning at communication link (e.g., hardline trunk) segment S11.

The optical node may also include a de-modulator, which demodulates RF signals received from the coax network and transmits the demodulated signals to an RF/optical converter. The RF/optical converter may then transmit the converted upstream signals to the combiner/splitter, which then transmits the upstream signals to the termination system via the optical fiber path.

The coaxial branch may include a plurality of communication paths S1-S11 interconnected by a plurality of amplifiers A1 and A2, taps T3, T4, and T5, power supply cabinet PS, filters F1 and F2, and combiner/splitters T1 and T2. The network also includes a plurality of CPEs (e.g., AD1-AD6), such as modems, set-top boxes, transponders, etc. Although not illustrated, groups of CPEs located in different facilities (e.g., apartments, condominiums, single-family homes, duplexes, offices, plants, etc.) may be connected through taps and splitter/combiners. For example, each facility may include multiple CPEs connected to a single tap. While the coaxial branch of the network in FIG. 2B illustrates one topology, other illustrative networks may include additional amplifiers, combiners/splitters, taps, and communication paths, which may connect hundreds, thousands, or tens of thousands of CPEs to the network. Additionally, the network may include other optical nodes supporting other coaxial branches, which are not shown for convenience.

Figure 3A:
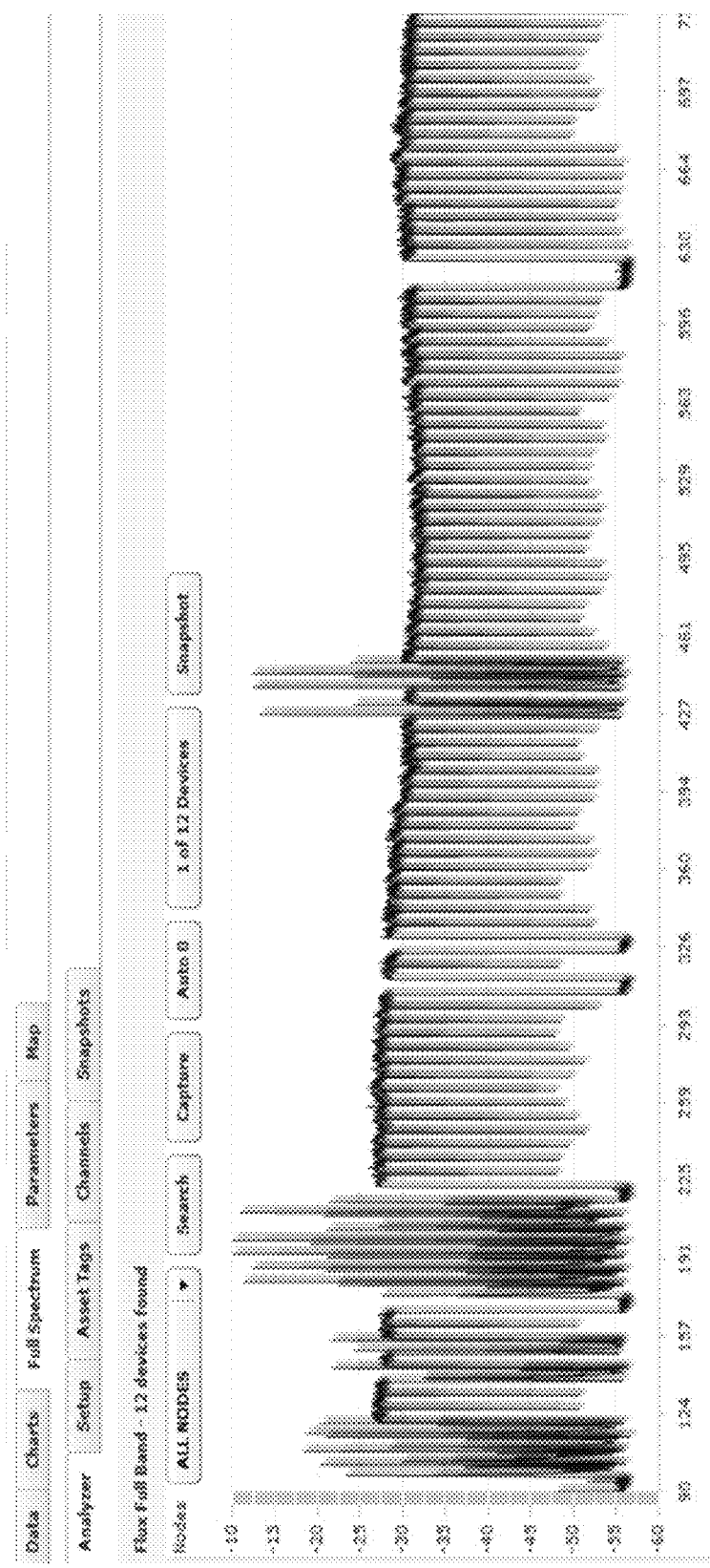
FIGS. 3A-3C illustrate frequency spectrum data of a network at a computing device according to various embodiments.

In an embodiment, each CPE (e.g., AD1-AD6) may include and/or be operatively connected to a spectrum analyzer device (e.g., analyzer 118), and configured to time sample the signals received on the network and perform a spectral analysis of the time-sampled data. For example, CPE AD1 may comprise a cable modem and may perform spectral analysis of a signal received at AD1. In an example, the spectral analysis may include performing a fast Fourier transform (FFT) on the received signal that results in data representative of the signal in the frequency domain. In some embodiments, the spectral analysis may output frequency spectrum data (e.g., spectral analysis data) in the form of minimum values, maximum values, average values, instantaneous values, or a combination of these. For example, FIG. 3A illustrates a frequency spectrum calculated for a signal received at one CPE. In various examples, the time-sampled signals may be over a specific bandwidth. For example, the sampling may be over a single channel (e.g., 6 MHz channel), or over a set of channels (e.g., 1 GHz including channels, guard bands, and unallocated out-of-band frequencies).

FIG. 2C illustrates the network branch shown in FIG. 2B, according to various embodiments, in which analyzer 118 obtains data regarding signal characteristics in each of multiple communication links or paths within the network. Each path may be associated with an individual CPE (e.g., access device) and can represent a physical path from that individual CPE to the fiber node or other signal termination. In some embodiments, one or more CPEs (e.g., cable modems, set-top-boxes, etc.) include a MAC address used to communicate with analyzer 118. As illustrated in FIG. 2C, the data acquired by the analyzer 118 may include frequency spectrum data of the signals received by each CPE connected to the communication path (e.g., a frequency spectrum of signals received at the CPE). The analyzer 118 may collect the data by communicating with each of the CPEs through the communication paths. For example, the analyzer 118 may poll each CPE for data. In other examples, each CPE may report its data to analyzer 118 periodically and autonomously. In other aspects, analyzer 118 may acquire the data from another device that communicates with the CPEs to collect the data. As will be discussed further below, in some aspects of the disclosure, a leakage detection system may communicate with the CPEs to collect the data. Additionally, or alternatively, each CPE may include an analyzer that obtains frequency spectrum data of the signals received at that particular CPE, and may transmit the data to the leakage detection system.

In various examples, a communication branch may include one or more sources of noise distortion. FIGS. 3A-3C and 4A-4L illustrate various graphical depictions of frequency spectrum data generated from signals sampled by a CPE (e.g., access device). While the data is shown graphically in the figures, the data may be stored/represented in other forms, such as in a database, table, etc.

Figure 3B:
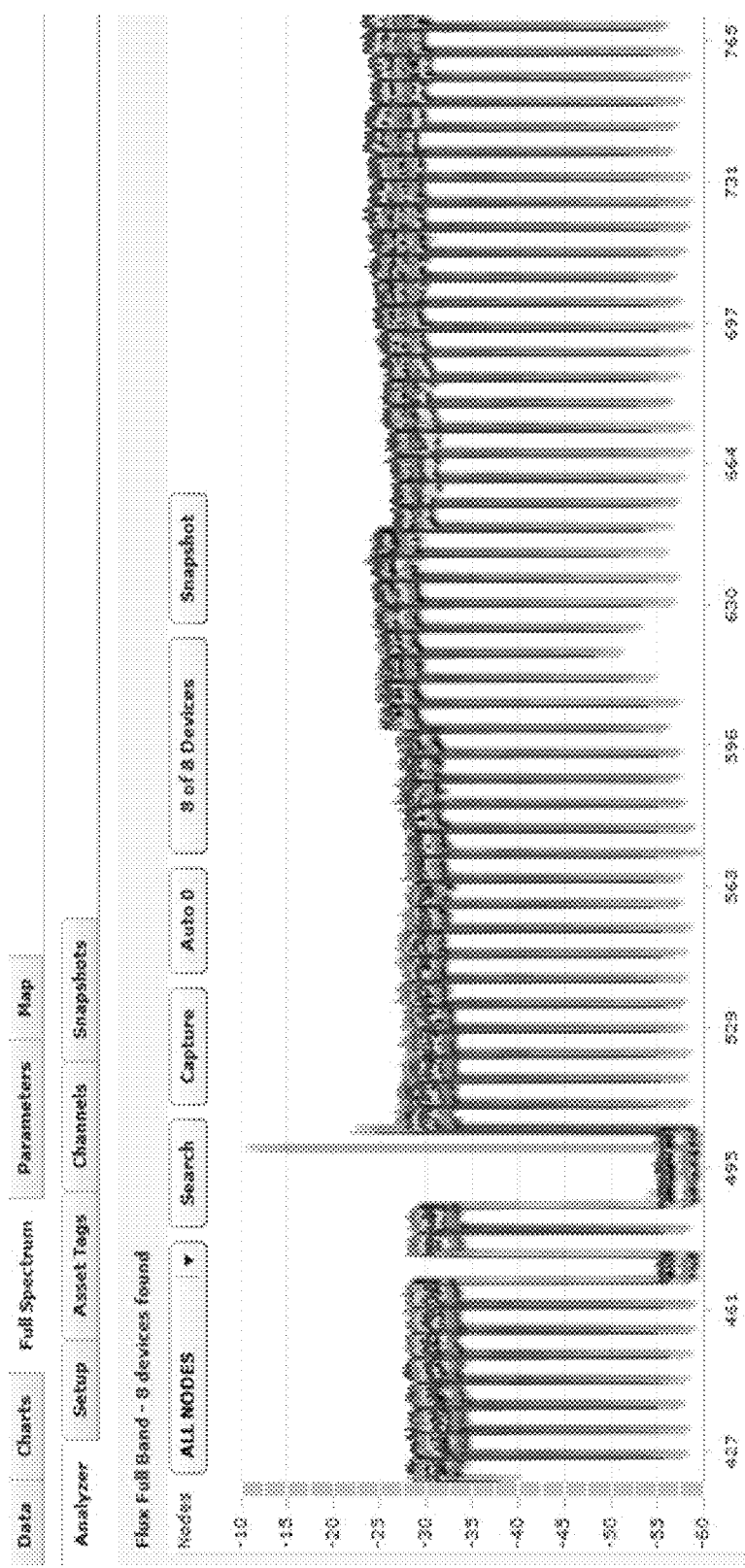

FIG. 3A illustrates example frequency spectrum data from a single CPE in which the data spans a plurality of communications channels under nominal conditions (e.g., no anomalies). FIG. 3B illustrates example frequency spectrum data from multiple CPEs in which the frequency spectrum data spans a frequency band including a plurality of communications channels under nominal conditions (e.g., no anomalies). As can be seen, each device may receive the same signals (e.g., exemplified by the spectrum of each device having similar profiles), but with different amplitudes, which depend upon the different attenuations of the different network paths to each CPE (e.g., access device). The frequency spectrum may include, for example, a number of 6 MHz audio/visual channels (e.g., ATSC channels), a number of 6 MHz data communication channels (e.g., DOCSIS), analog video and audio carriers.

Figure 3C:
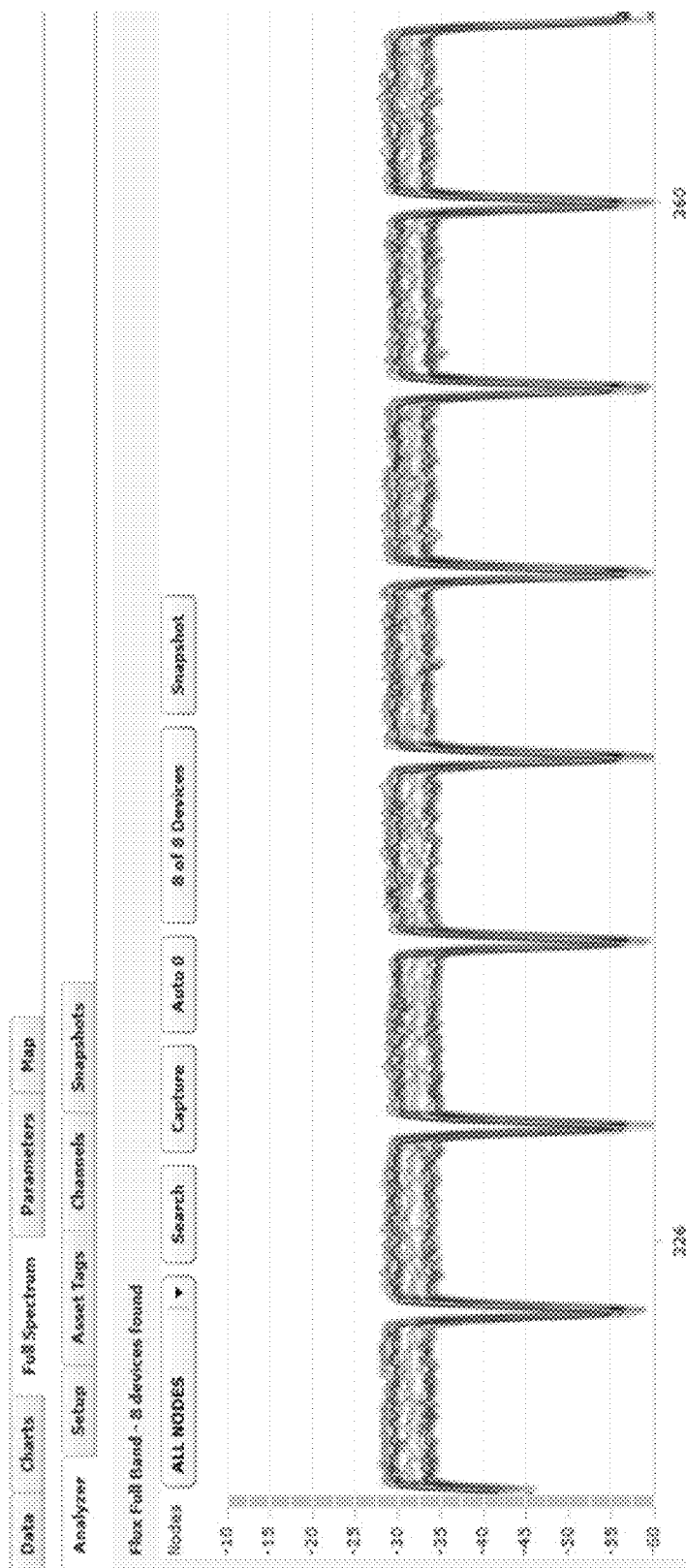

FIG. 3C illustrates in more detail a portion of the frequency data of FIG. 3B for a frequency band including eight 6 MHz channels. In addition to frequency data of each in-band signal (e.g., approximately. 5.4 MHz signal), the frequency spectrum between the in-band signals (e.g., the out-of-band signals at approximately 0.6 MHz width) may also be captured.

Figure 4A:
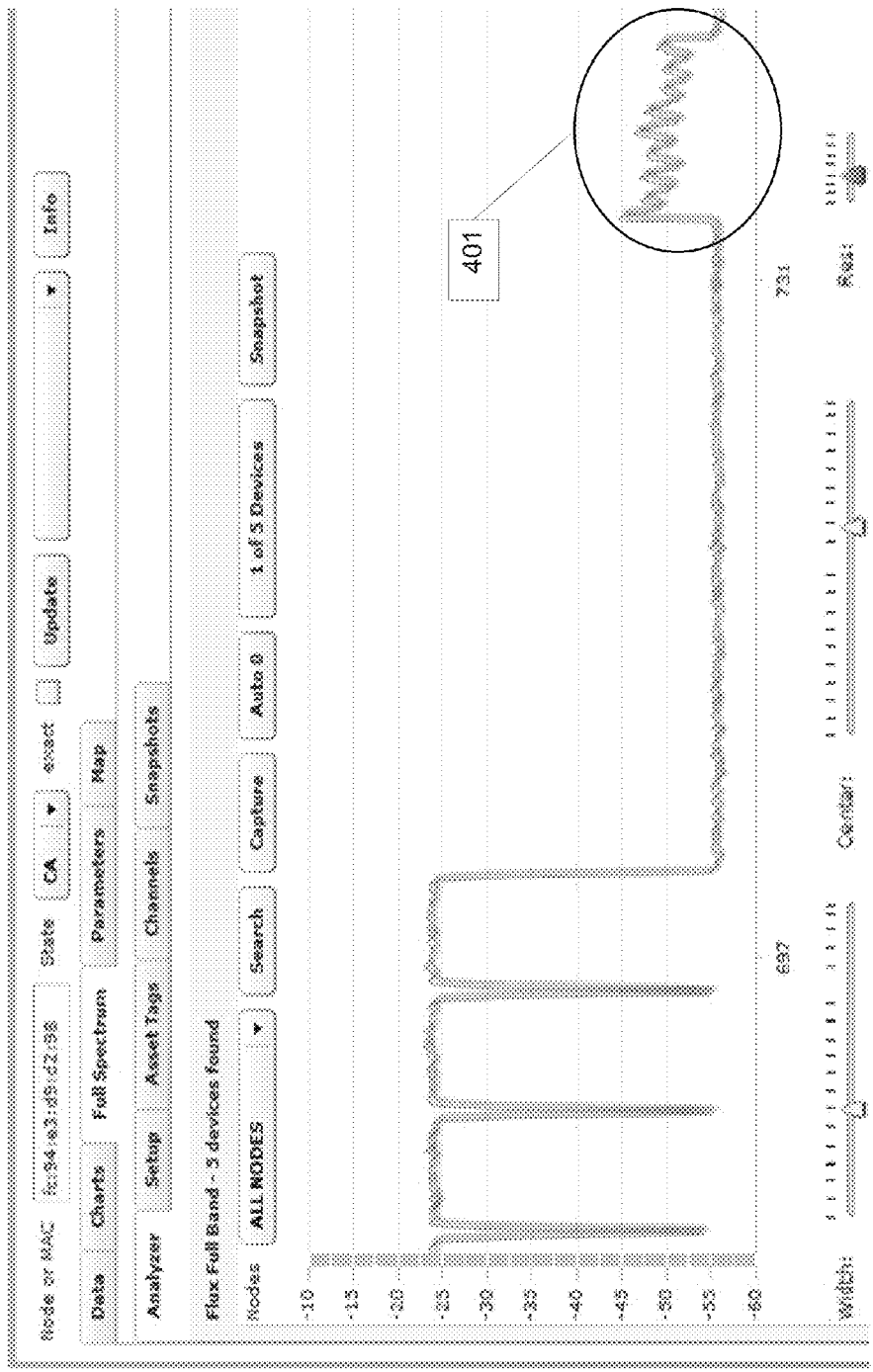

FIG. 4A illustrates example frequency spectrum data from a CPE receiving a signal over the network from an external source (e.g., RF transmitter, Long Term Evolution (LTE) wireless standard, 8VSB transmission, etc.), where the signal has ingressed into a network branch through a network fault or break such as a broken cable shield. Such anomalies may be induced, for example, by the momentary operation of a motor or transformer next to an unshielded signal path, or by an external transmitter outside of the communication system (e.g., cellular phone, television transmitter, wireless transmitter, etc.). Such anomalies may be momentary and dynamically change over time.

Figure 4B:
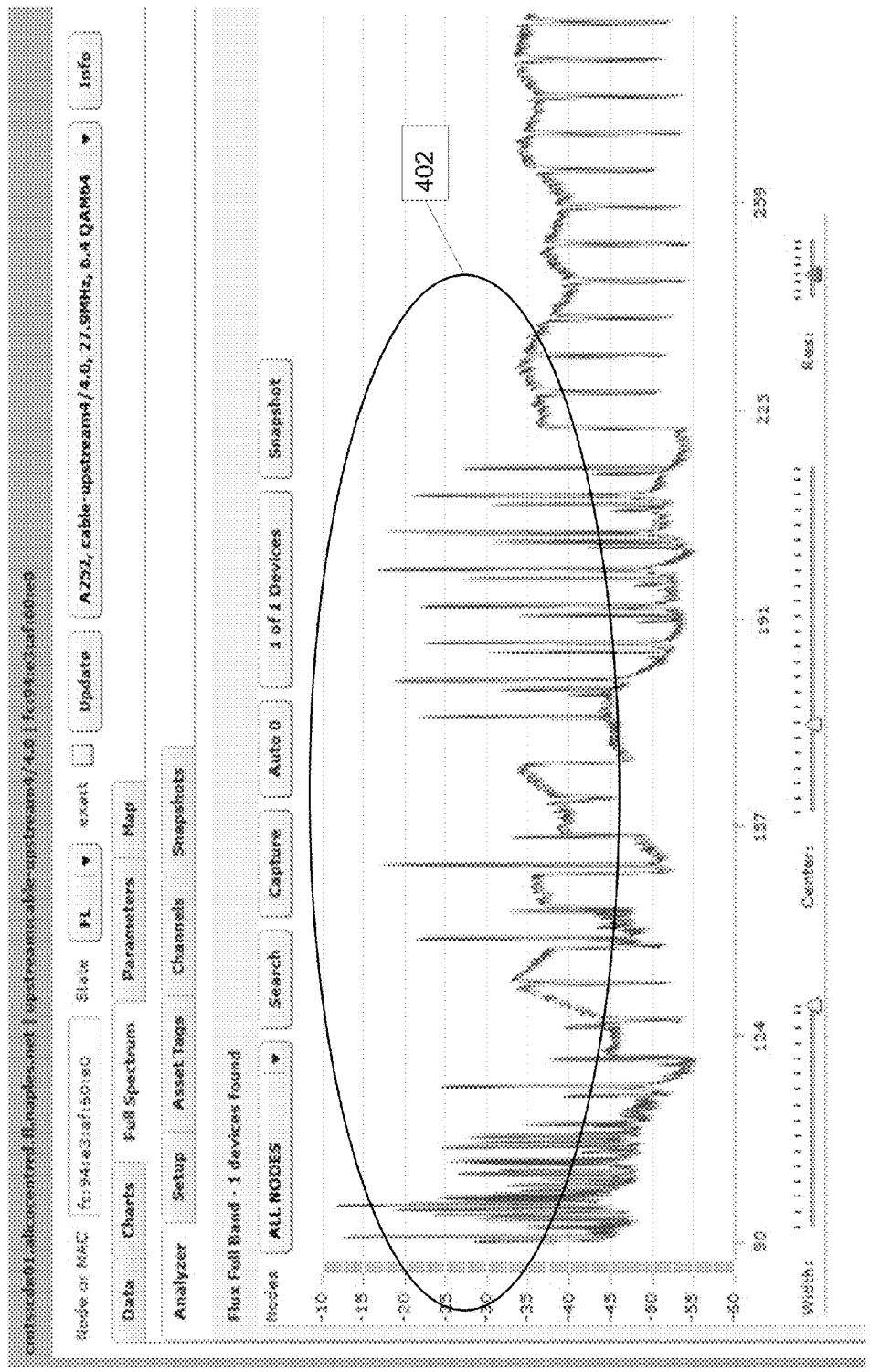

FIG. 4B illustrates example frequency spectrum data from a CPE in the presence of wideband interference, such as power arcing, within the network branch. For example, short between the shield and the signal wire or between the shield and a power wire may induce interference over a wide bandwidth (e.g., several channels) with high amplitude that is above the transmitted signals allocated for that bandwidth. Such interference is indicated by the oval 402 in FIG. 4B.

With respect to FIGS. 4A and 4B, the noise may be characterized from the frequency spectrum data as originating from a specific type of source (e.g., arcing, LTE transmitter, electric motor, etc.). For example, in FIG. 4A, the oval 401 identifies an ingressing signal that is above the allocated frequency spectrum in the network (e.g., above 700 MHz). The specific frequency range of approximately 735 MHz to 745 MHz of the ingress signal may be known (e.g., stored in a database) to be within the standard frequency band of an LTE channel transmitted from a cellular phone in a cellular wireless system. The signal may also be momentary (e.g., only present when the cellular phone is transmitting and near the unshielded cable.) From these characteristics, the analyzer may determine that the signal is generated from a cellular phone transmitting in the LTE band near a break in a communication link within the network (e.g., an unshielded cable). FIGS. 8A-B and 21A-B illustrate operations according to various aspects for detecting and identifying noise (or signal) source such as those in FIGS. 4A-B and 15 and for locating the fault or break at which the noise (e.g., over-the-air signals, wireless transmissions, etc.) enters the network.

Figure 4C:
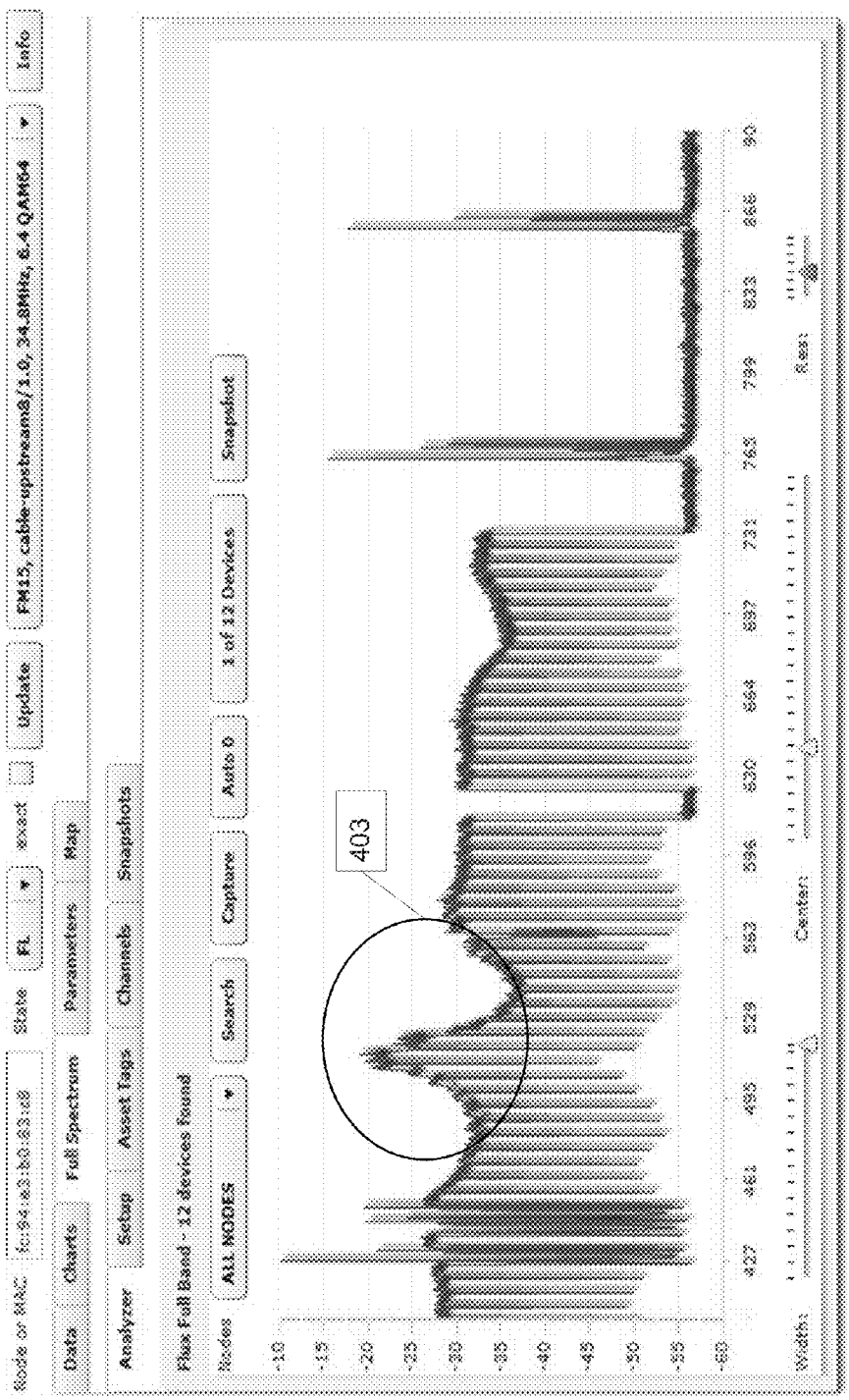
Figure 4D:
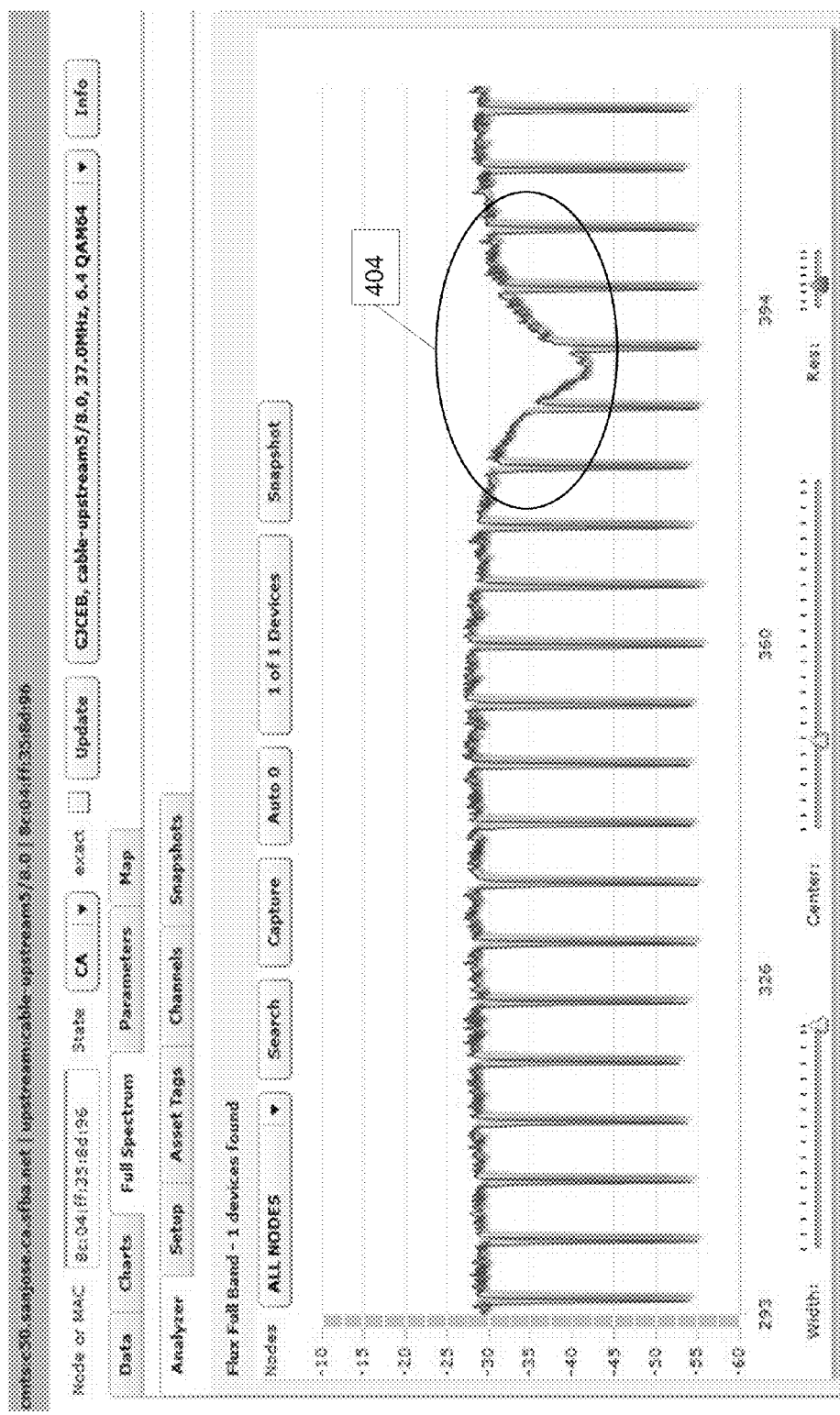
Figure 11:
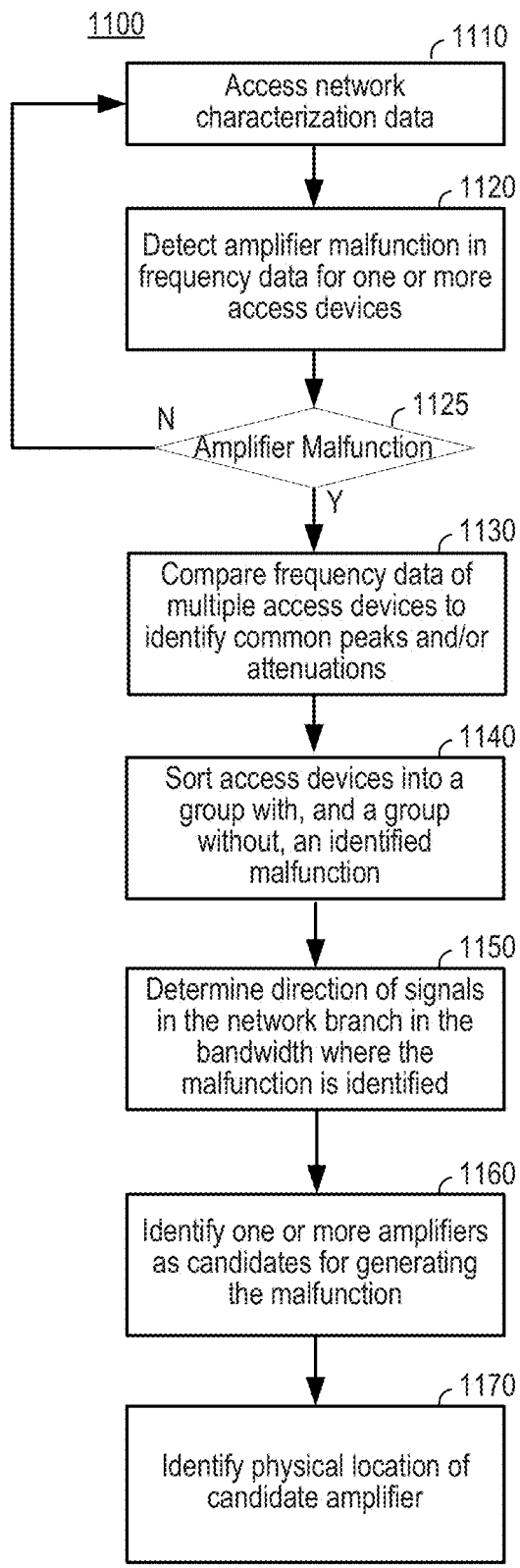
FIGS. 11-14 illustrate operations in flow charts that may be performed in accordance with one or more embodiments.

FIGS. 4C and 4D illustrate example frequency spectrum data from a CPE (e.g., access device) that receives signals from a malfunctioning amplifier (e.g., A1). The malfunctioning amplifier may cause frequency selective resonant peaking and/or attenuation (e.g., a suck out) within a network branch. Under some amplifier failure conditions, network amplifiers exhibit a frequency selective peak 403 or attenuation 404 that can be characterized by their shapes as highlighted by the ovals in FIGS. 4C and 4D. In other amplifier failure conditions, network amplifiers exhibit temperature dependent automatic gain control failures as shown in FIGS. 4K and 4L. FIG. 11 includes operational steps of a process for detecting and locating malfunctioning amplifiers that cause a resonant peak or attenuation.

Figure 4E:
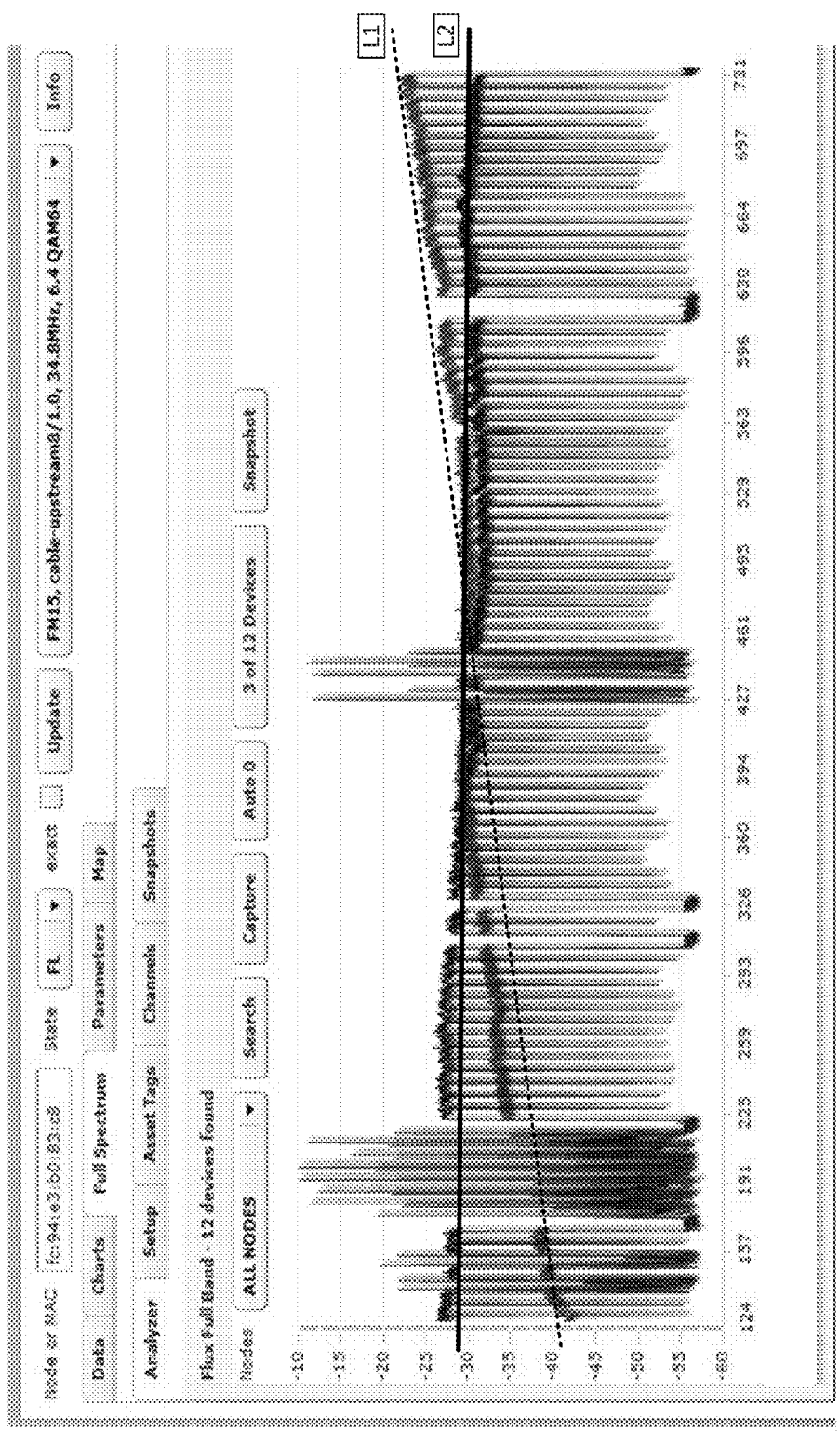

FIG. 4E illustrates example frequency spectrum data from multiple CPEs in the presence of incorrect plant setup such as excessive frequency tilt and/or leveling, within the network branch. In the network, certain components may exhibit a characteristic or specific frequency response that is not constant (e.g., flat over the operating frequency band). For example, coaxial cable may have a frequency response that exhibits signal attenuation that linearly increases or decreases with frequency (resulting in decreasing or increasing signal amplitude, respectively, with frequency). Such attenuation, sometimes referred to as frequency tilt, is illustrated by the frequency data sets shown in FIG. 4E from two respective CPEs. One CPE (e.g., access device) shows a signal that has linearly increasing amplitude over the frequency range of 300 MHz to 731 MHz. A line, L1, illustrates a linear approximation of the frequency data exhibiting frequency tilt. While certain components, such as coaxial cable exhibit a linear frequency response, other components may exhibit other linear or non-linear frequency responses.

To adjust for these frequency dependent variations introduced into the network by the network components, the plant may be set up with one or more correction devices (e.g., filters F1, F2) distributed throughout the network to correct for such variations. For example, a filter (e.g., F2) may be inserted in-line in a network branch, with the filter having a frequency response that cancels the frequency dependent attenuation/amplifications for signals traversing that branch (e.g., a filter having an inverse response of the frequency tilt of a coaxial cable). By doing so, the frequency response may be leveled as shown by the frequency data of the second CPE shown in FIG. 4E. Line L2 illustrates a linear approximation of the frequency data from signals received by the second CPE, after the signals have been corrected by a correction device such a filter. As shown, the slope of L2 is closer to zero than the uncorrected slope of L1.

Figure 12:
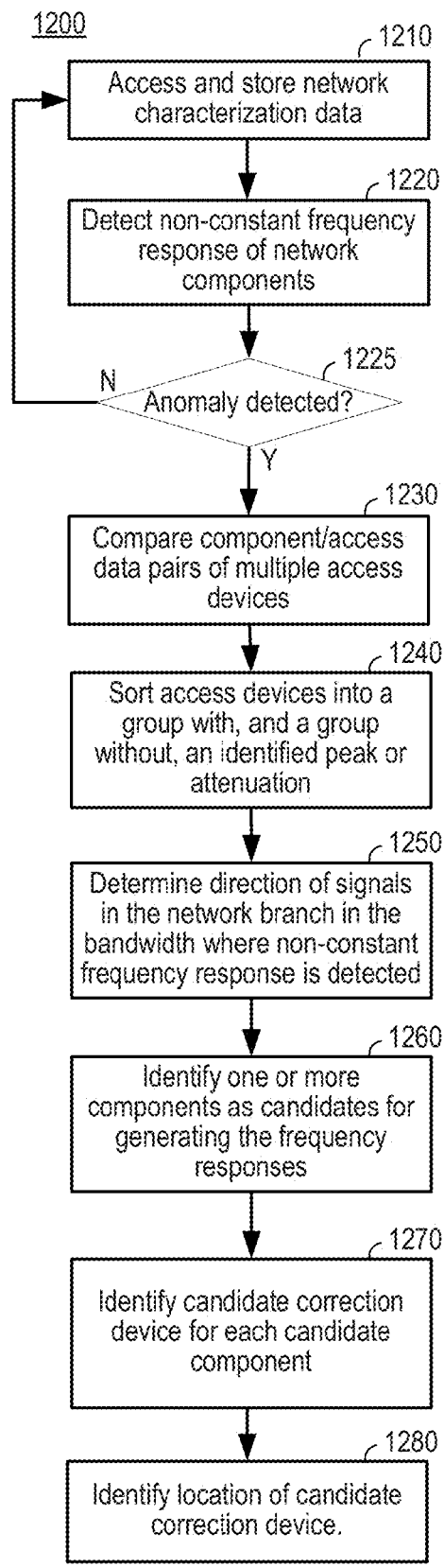

The filters or other correction devices may be included at various points in the network, such as at the input of one or more amplifiers, at taps, or in-line between coaxial segments. Frequency data that exhibits a non-constant response beyond a predetermined threshold (e.g., having an approximate linear slope beyond a threshold or equal to a predetermined slope within a predetermined margin of error), may indicate incorrect plant setup. For example, a filter may be needed, or a filter may exist but is failing, or a filter otherwise exhibits an insufficient response to correct the non-constant attenuation/amplification by the network components. FIG. 12 described herein provides a process for identifying network components exhibiting a non-constant frequency response that has not been corrected for by a correction device, and for locating a malfunctioning correction device or a place where a correction device is needed to be added.

Figure 4F:
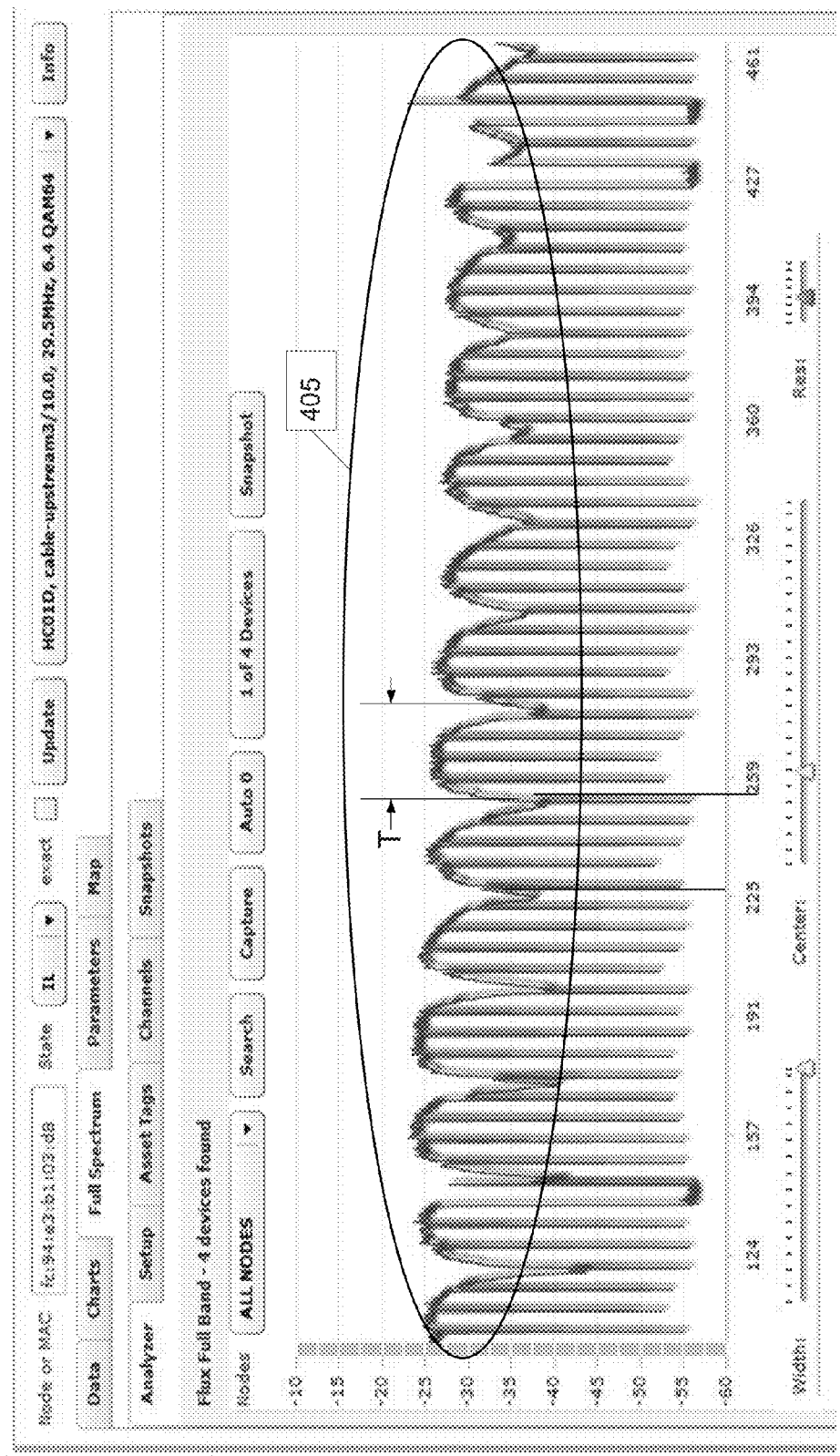
Figure 13:
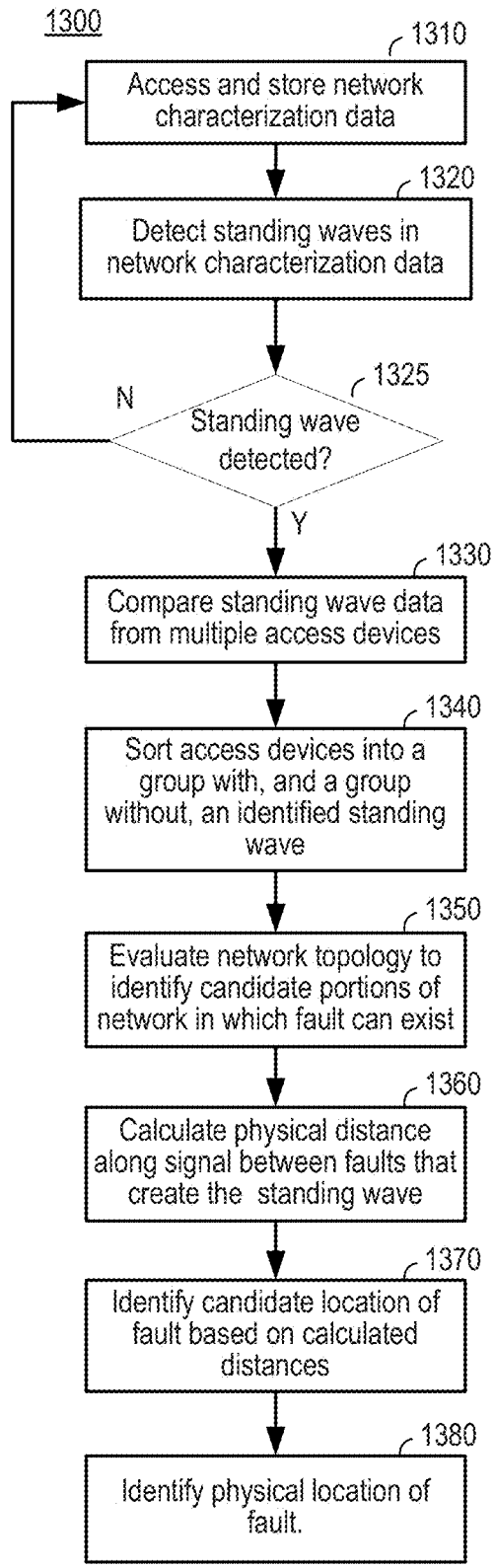

FIG. 4F illustrates example frequency spectrum data from a CPE in the presence of an impedance cavity anomaly that causes a standing wave 405 on the network branch. The impedance cavity may result from the network including multiple impedance mismatches that cause a signal to be reflected back and forth in the network between the two mismatches. A period of the standing wave, T, illustrated in FIG. 4F may be equal to the time the reflected signal takes to propagate from a first impedance mismatch to a second impedance mismatch and back to the first impedance mismatch. Based on known velocities of propagations of signals within the different components (e.g., coaxial cable), a distance between the two mismatches may be determined. FIG. 13 described below provides a process for detecting impedance cavities, detecting the distance between the impedance mismatches, and locating the impedance mismatch in the network based on the distance and other network data.

Figure 4G:
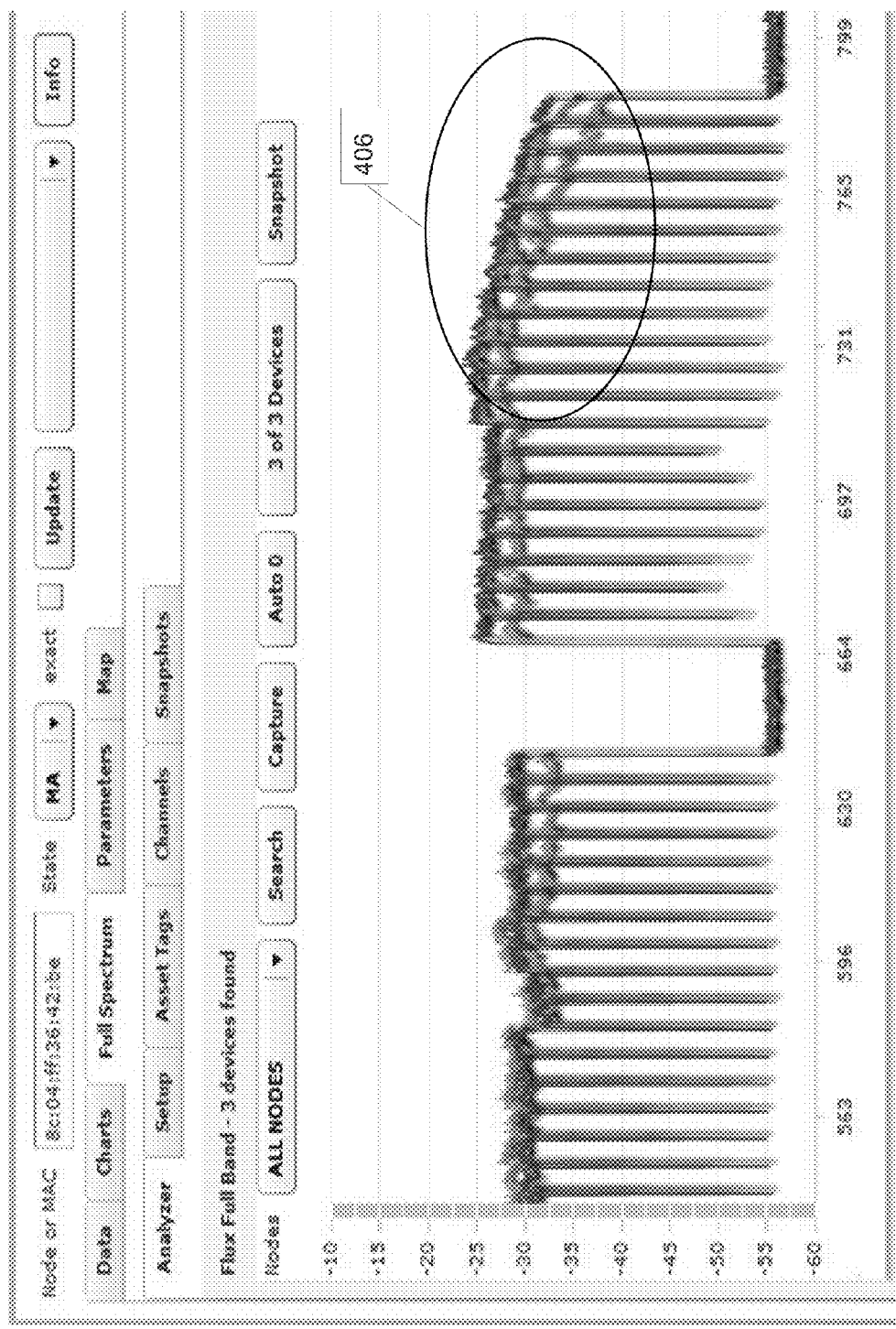

FIG. 4G illustrates example frequency spectrum data from multiple CPEs in the presence of high-end roll-off 406 within the network branch. High-end roll-off may be caused by a network failure that attenuates signals at high frequency. One example could be a wet or damp conductor (e.g., a tap, coaxial cable). For example, water damage at a network connection point could inadvertently cause attenuation at high frequencies as a result of moisture entering a connection point between two components (e.g., between a tap and a coaxial cable).

Figure 4H:
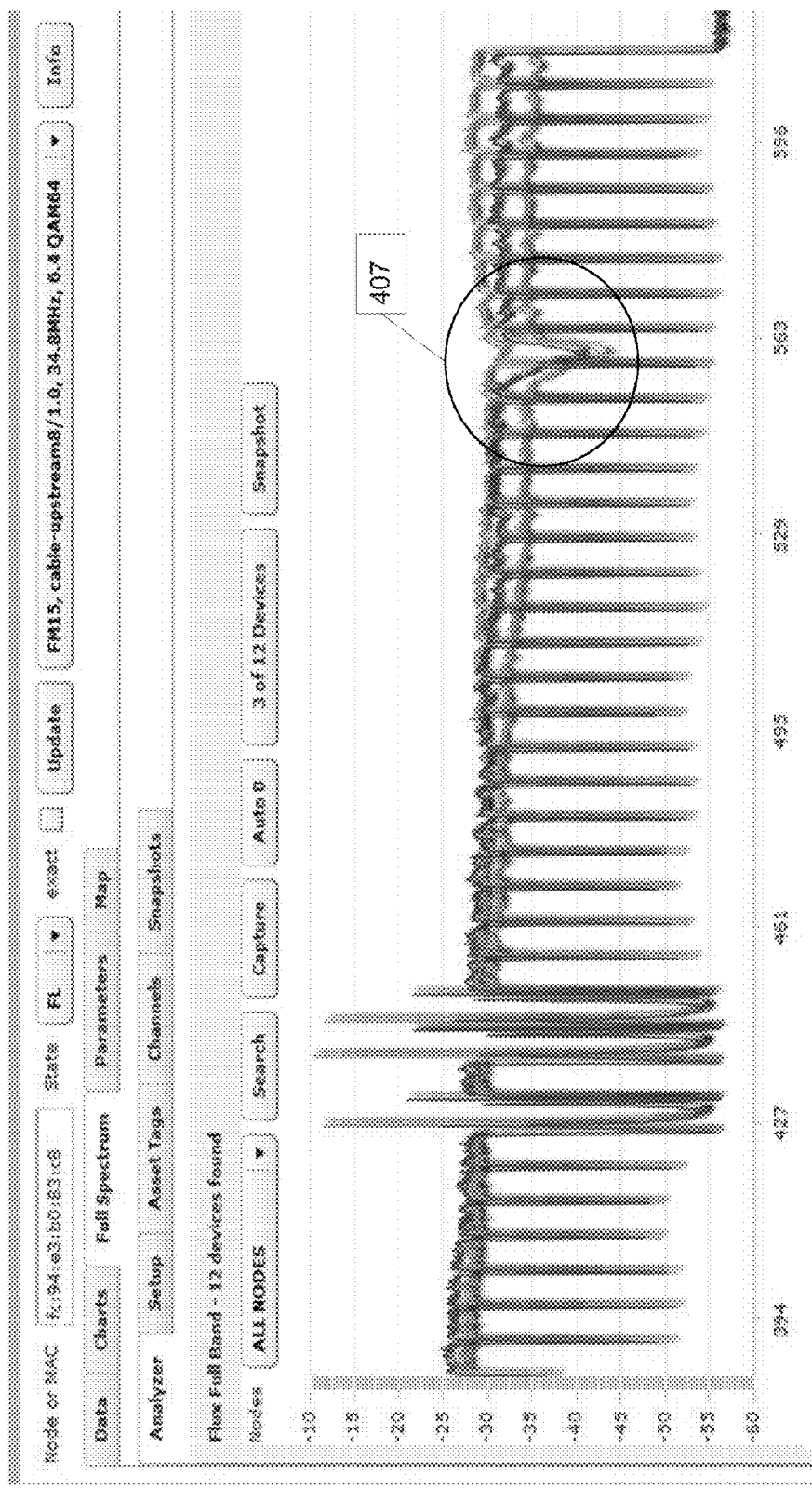

FIG. 4H illustrates example frequency spectrum data from multiple CPEs in the presence of passive device (e.g., inductors, capacitors) failures in the network branch. The device failures may result in frequency selective notches 407 (e.g., attenuations). Such notches appear similar to the attenuations caused by amplifier failures in FIG. 4D, but may be distinguished based on shape, with the notches in FIG. 4H having more linear slopes.

Figure 4I:
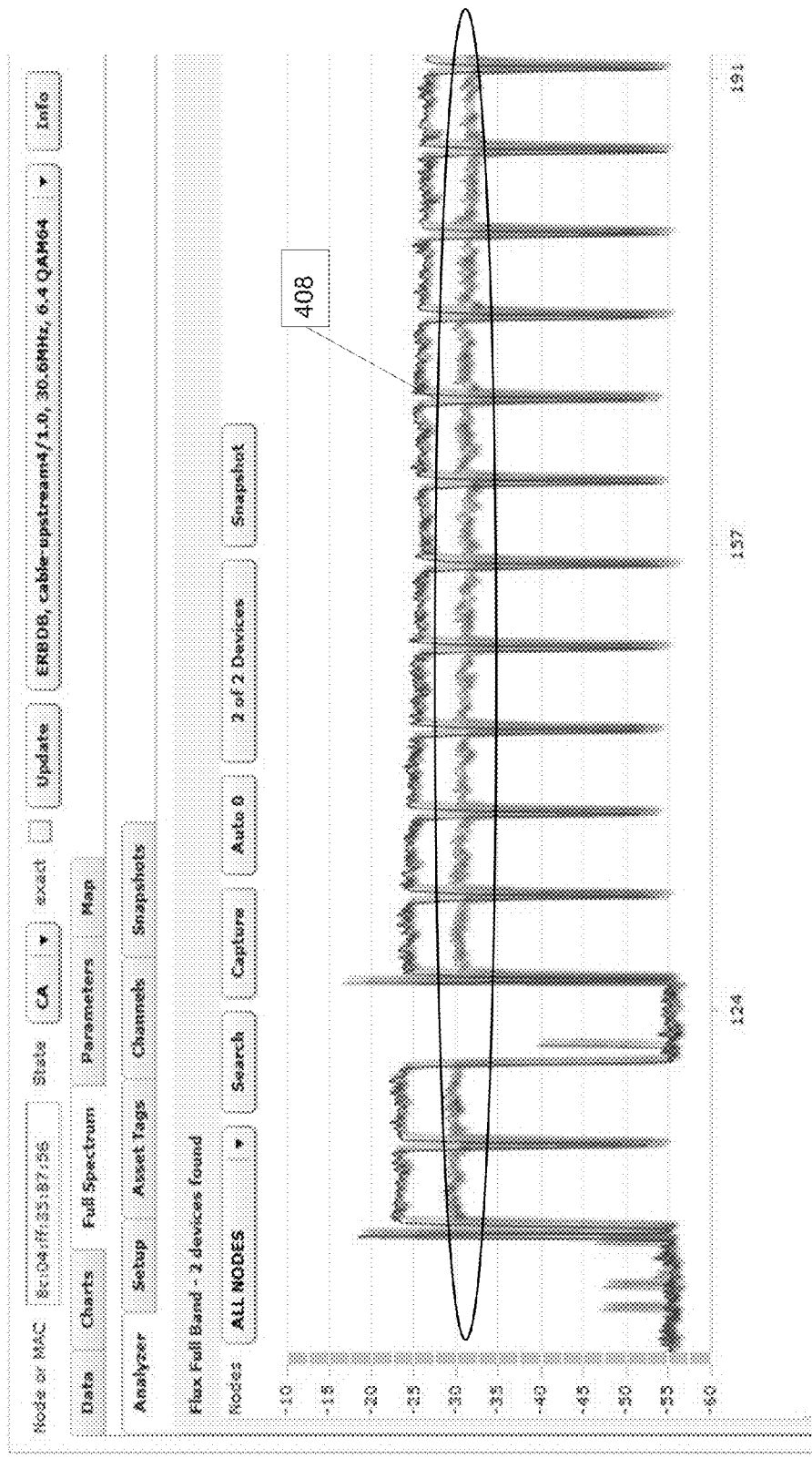

FIG. 4I illustrates example frequency spectrum data from multiple CPEs in the presence of excessive attenuation 408 in the network branch. Such attenuation may be caused, for example, by additional network components, e.g., splitters, being inserted into a network on a client premise.

Figure 4J:
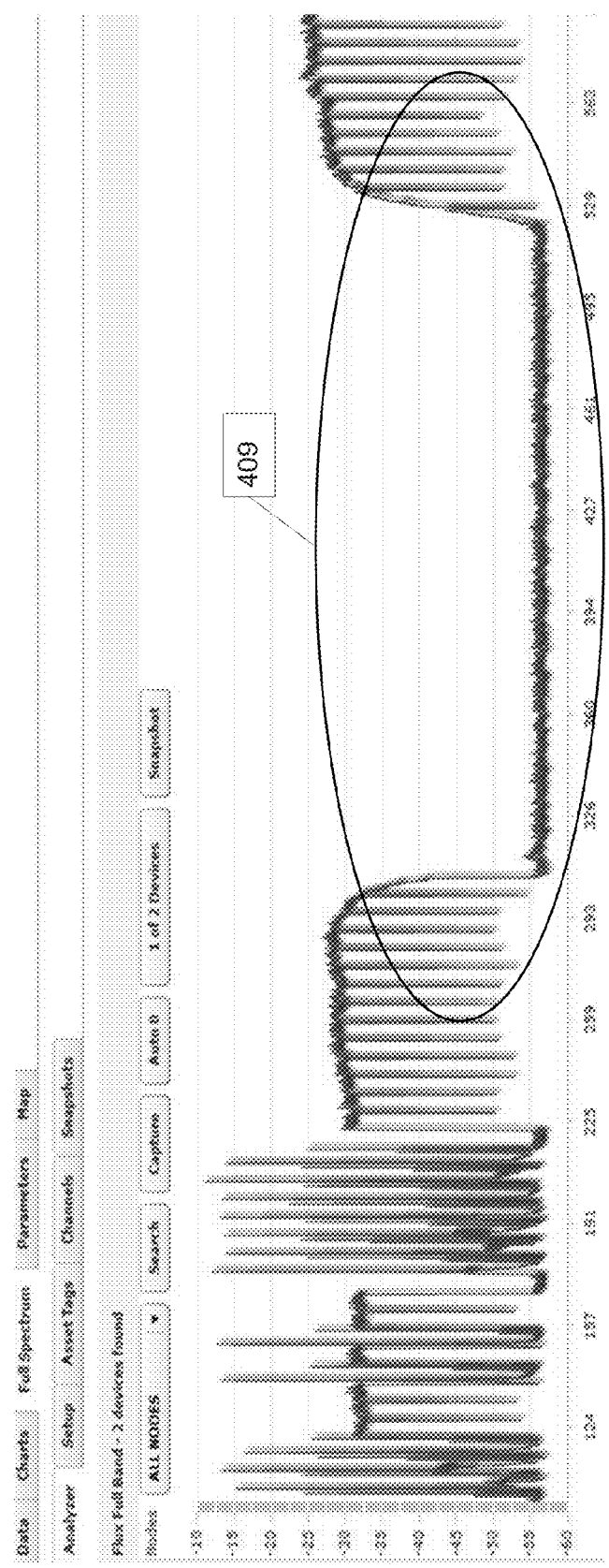
Figure 14:
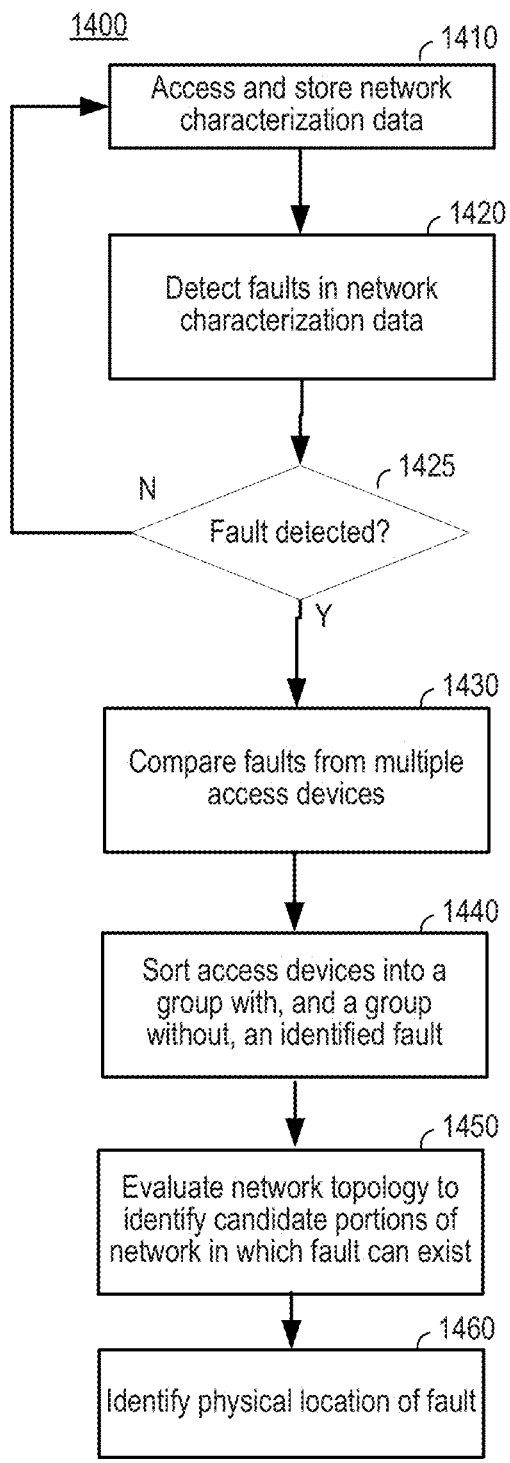

FIG. 4J illustrates example frequency spectrum data from a CPE (e.g., access device) in the presence of a band-pass filtering 409. Band pass filters may be used in a network to inhibit certain signals from traversing particular network paths. One example where such filters may be used is selectively providing particular services to a customer, e.g., providing only data services without providing audio/visual services. A filter may for example be installed between a tap and a communication link to a customer's premise to filter out the audio/visual services (e.g., television content) to the premise, while permitting data services (e.g., DOCSIS based network services) to pass through the communication link or channel. Filters may be installed in some instances in incorrect locations, causing unintentional filtering of particular channels. FIG. 14 described herein provides a process for detecting, identifying and locating the anomalies shown by the frequency spectrum data in FIGS. 4G-4J FIG. 5 illustrates process 500 that may be performed in accordance with one or more embodiments to identify and/or locate a noise (e.g., over-the-air signal, wireless transmission, etc.) or a noise source in a network. The process begins at step 510 in which a computing device, such as analyzer 118, accesses (e.g., retrieving from a memory, receiving over the network, etc.) and optionally store (for immediate or future use) data that characterizes the communication paths between one or more of CPEs (e.g., AD1 through AD6) and the termination device (e.g., fiber node) at the beginning of the network branch. Such data may include the time-sampled data of signals received over the network at each access device, or may include frequency spectrum data calculated based on the time sampled data.

In some embodiments, step 510 may further include the computing device (e.g., analyzer 118) accessing and/or storing time-sampled and/or frequency spectrum data retrieved from the data processing facility, optical node, or other intermediate device within a network branch. For example, a spectral analysis (e.g., an FFT) may be performed on time-sampled data of the downstream signal captured at the data processing facility before the signal traverses the network. Step 510 may include multiple iterations of the frequency spectrum data being retrieved and stored, and each iteration may be stored with a timestamp and other metadata indicating the source of the data (e.g., data processing facility, AD1, PS, optical node, etc.).

FIGS. 6A-6B shows a portion of a database 150 and 160 generated in step 510 by analyzer 118 and stored in a memory (e.g., 1702 described below). For convenience, FIGS. 6A-6B show data in a simple table. The table of FIGS. 6A-6B is merely one example of how data can be arranged in accordance with various embodiments. The actual format of data and/or of the tables or other data structures used to organize that data will vary among different embodiments. Each row in table 150 corresponds to a specific one of the CPEs AD1 through ADn. The cells of each row contain data related to the corresponding access device and to the communication path used by the corresponding access device to communicate with the fiber node or other termination device. Cells in a first column 151 contain index numbers for the rows of table 150. In the present example, row 00001 corresponds to device AD1, row 00002 corresponds to device AD2, etc. Fields in column 152 contain identifying data for an access device on a particular row. In some embodiments, this identifying data may include a media access control (MAC) address of the access device. Each of columns 153-1 through 153-P represents frequency data of the signal(s) received from the network by that respective CPE. A cell in a particular row and column contains frequency spectrum data (e.g., spectral analysis data) for CPE corresponding to that row and the frequency corresponding to that column. For each frequency f1-fN, the spectral analysis data may have a real ("r") and imaginary ("i") component, with those components represented as "<r>" and "<i>". The embodiment displayed in Table 6A illustrates spectral analysis data as real and imaginary parts of the frequency response. Other embodiments may represent similar data in some other manner. For example, in some embodiments, the spectral analysis data may be stored as the phase and amplitude values determined (e.g., calculated from an FFT of the received signal) from the time sampled signal data. In other embodiments, only amplitude or phase is stored. At the end of step 510 (FIG. 5), each row of table 150 may contain an identifier and spectral analysis data for up to N frequencies for one or more of the CPEs AD1 through ADn.

Analyzer 118 may repeat step 510 collecting and storing table 150 for multiple iterations. The iterations may be periodic, occurring at a predetermined rate, or may occur on a varying rate basis (e.g., as fast as data can be collected). Analyzer 118 may store every iteration of data, or may store only the most recently collected data (e.g., the most recent 2, 3, 4, etc. iterations). During each iteration, analyzer 118 may retrieve frequency spectrum data for one or more CPEs AD1 through ADn and generate a time sequence of the retrieved data in step 520.

In some embodiments in step 520, the computing device (e.g., analyzer 118) stores the time sequence of values in a database 160, such as the one illustrated in FIG. 6B. For convenience, FIG. 6B shows data in a simple table. The table of FIG. 6B is merely one example of how data can be arranged in accordance with various embodiments. The actual format of data and/or of the tables or other data structures used to organize that data will vary among different embodiments. In some variations, database 150 is a portion of database 160. In each row of database 160, an index 161 and CPE identifier 162 is included similar to those of FIG. 6A. Columns 163-1 through 163-T may include a set of data items for each time iteration. In an embodiment, one data item is a value labeled <t> and may include a start, end, medium, or other time at which the iteration is captured and calculated within a margin of error (e.g., delta t). In alternative embodiments, each column may include only one value <t> associated with all of the values <p> in that column, instead of storing a separate <t> value for each <p> value. The number of iterations T may be any value and will depend on the available resources. In some variations, the columns 163-1 to 163-T may operate as a circular buffer (e.g., FIFO) storing the most recent T iterations. In an embodiment, the other data item may include a pointer <p> that points to a changeable data element depending on a particular use for the spectral analysis data.

In one embodiment, pointer <p> may point to a data table that stores frequency spectrum data (e.g., spectral analysis data) retrieved from a particular CPE (e.g., AD1 thru AD6) in an iteration at a time (e.g., a time <t>), where that data table includes columns 153-1 to 153-P from FIG. 6A. As discussed above, columns 153-1 to 153-P store spectral analysis data (e.g., amplitude and phase) with respect to frequencies f1-fN for a particular CPE. In this example, the data table pointed to by pointer <p> may store the spectral analysis data for frequencies f1-fN retrieved at time <t> from a CPE identified by the CPE identifier (e.g., MAC address) for the row. In some embodiments, pointer <p> may be replaced by one or more actual data values. For example, the data table illustrated in FIG. 9B includes data values <s> and <f> instead of data item <p>. Data items <s> and <f> will be further explained below with reference to FIG. 9B and a particular example for identifying/locating ingress noise and/or wideband interference.

At step 530 the computing device (e.g., analyzer 118) may analyze the retrieved spectral analysis data (e.g., amplitude and phase) to identify an anomaly in the network (e.g., noise ingress, wideband interference, resonant cavity, etc.). In some embodiments, the iterations of retrieved spectral analysis data stored in the data table illustrated by FIG. 6B may be analyzed. The analysis may include, for example, identifying and/or distinguishing between one or more anomalies from amongst a plurality of different types of anomalies (e.g., the anomalies of FIGS. 4A-4L) exhibited in the frequency data. This may include performing portions of the processes shown in FIGS. 8A, 8B, and 11-14, to identify different anomalies.

In step 540, a method of analysis may be selected based on the type of anomaly that is detected, and in step 550, the computing device (e.g., analyzer 118) may determine the existence and/or location of the anomaly in the network using the analysis selected in step 540. In step 560, the anomaly may be correlated to specific services based on a predetermined service allocation database (e.g., a map of video and data services to specific channels), and based on the impact of the anomaly on particular channels (e.g., decreasing signal to noise ratio on a channel). In step 570, analyzer 118 may determine a course of action to be taken by a network operator (e.g., service technician) or by a customer. Such action may include for example, repairing or reconfiguring the network components to correct the anomaly. Another action may be to adapt the signal transmissions, such as pre-filtering signals before being transmitted or reassigning a signal to a different carrier frequency so at to avoid using the frequencies that are adversely effected by the anomaly. (e.g., move a carrier away from an LTE transmission frequency).

A number of particular variations of the process of FIG. 5 will be further described below with respect to FIGS. 8A-8B, 11-14, and 21A-21B. The processes may be used together, with portions of each process first identifying respective types of anomalies as in steps 510-530, and based on the identified anomalies, deciding which of the processes to continue in step 540 to determine the location of the anomaly as in step 550.

Figure 7:
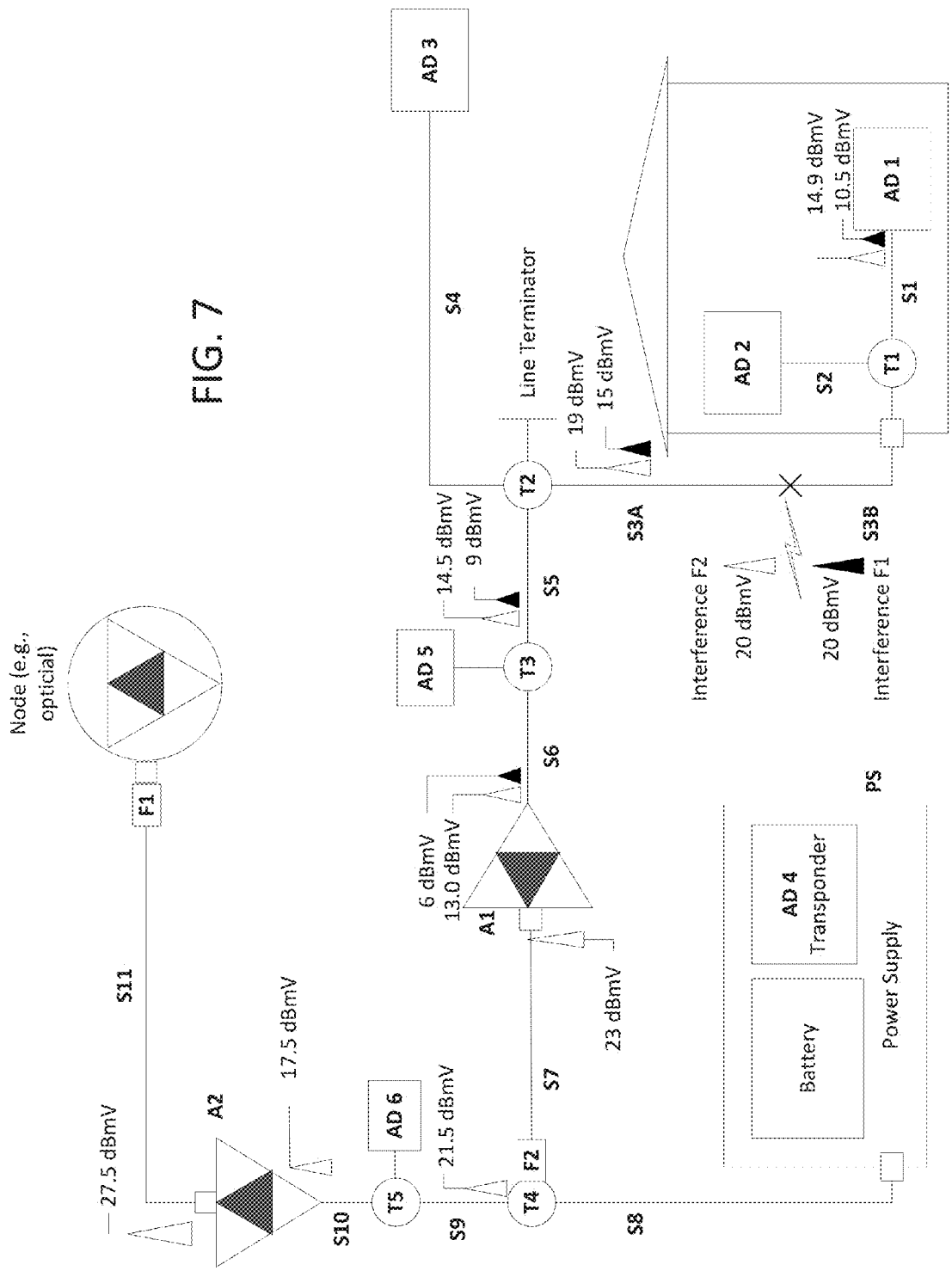
FIG. 7 includes the network branch of FIGS. 2A-2C with illustrative attenuations of a noise or signal source according to various embodiments.

As one example variation, FIG. 7 illustrates a network diagram similar to FIGS. 3A and 3B that includes an ingress noise or wideband interference source and FIGS. 8A-8B illustrate a method for identifying and/or locating the noise/interference source in the network.

FIG. 7 depicts the network branch of FIGS. 3A-3B including an example of noise ingress (e.g., signal ingress) such as that depicted in the frequency spectrum data as shown in FIG. 4A or 4B. In FIG. 7, segment S3 may be damaged or otherwise configured to permit the ingress of an external signal into the network. This could be, for example, a damaged coaxial line connecting splitter T1 to splitter T2. The ingress of noise sources may occur at different times, and the noise sources may have different levels of power and may have different frequency components at the point of ingress. While the sources are described in the following examples as noise ingress as illustrated in FIG. 4A, the sources may alternatively be from a wideband interference source as previously described with respect to FIG. 4B.

FIG. 7 depicts two illustrative sources of noise ingress in segment S3. A first noise source (the black triangle), may for example have a first frequency F1 (e.g., 600-750 MHz) and induce a 20 dBmV level signal onto segment S3 at the point of ingress. A second noise source (the white triangle), may for example have a second frequency F2 (e.g., 5-42 MHz) and induce a 20 dBmV level signal onto segment S3 at the same point of ingress. For ease of explanation, various embodiments are described herein with respect to one point of ingress as illustrated in FIG. 7. In various other embodiments, multiple noise sources through multiple points of ingress may be detected.

A noise source (e.g., over-the-air signal, wireless transmission, etc.) may traverse the network from a point of ingress and reach the receiver of a CPE or a receiver of another device connected to the network (e.g., a fiber node, test equipment, etc.). The received noise may cause interference with the intended downstream and upstream communications between the CPEs and the fiber node/termination system.

In various embodiments, analyzer 118 may acquire frequency spectrum data (e.g., spectral analysis data) from the CPEs at different moments of time (e.g., different sampling time periods). By analyzing the spectral analysis data, various embodiments may identify and/or locate noise ingress along one or more paths in the network. Various examples include the analyzer 118 obtaining multiple samples of spectral analysis data from one or more CPEs and detecting changes in the spectral analysis data over time in order to determine the presence and/or location of noise ingress.

As a noise source propagates through the network, the noise will be attenuated, amplified, and/or distorted through line loss and through network components such as splitters, taps, amplifiers, etc. As such, different access devices having different physical paths to the noise source will receive varying degrees of interference with the modulated signal. Various aspects compare differences between spectral data received from the CPEs to identify a type of noise source and/or to determine a location of noise ingress.

FIG. 7 depicts the network with illustrative attenuations of the two noise sources F1 (e.g., 600-750 MHz) and F2 (e.g., 5-42 MHz) at various points along the communication path (e.g., communication link) The attenuation by each component may depend on the component function, structure, electrical properties, signal frequency, signal propagation direction, other signal properties, and combinations thereof. For example, a cable (e.g., RG6 coaxial cable) may attenuate a 5-42 MHz signal by approximately 1 dB for every 100 feet of cable length and attenuate a 600-750 MHz signal by approximately 5 dB for every 100 feet of cable length. A tap may have an approximate insertion loss of 1 dB and a tap isolation of 20 dB for signals in the range of 5-750 MHz. A splitter may have an approximate 4 dB insertion loss and 20 dB tap isolation for signals in the range of 5-750 MHz. An amplifier may be configured to amplify signals in both directions, but the direction of amplification may be frequency selective. For example, in a coaxial system compliant with Data Over Cable Service Interface Specification (DOCSIS) standards, amplifiers A1 and A2 may be designed to block upstream signals in the frequency range of 600-750 MHz, but amplify signals by a gain factor G (e.g., 10 dB) in the 5-42 MHz range. These attenuation and gain values are illustrative only, and other values may be applied based on the characteristics of the specific network of the various embodiments.

Based on the example attenuation values above, the levels of F1 having a frequency in the 600-750 MHz range and F2 having a frequency range of 5-42 MHz are depicted propagated on different segments of FIG. 7. F1 for example propagates to amplifier A1 attenuated by 14 dBmV (e.g., −5 dBmV from S3A, −4 dBmV from T2, −2 dB from S5, −1 dB from T3, −2 dB from S6). Beyond S6, however, F1 may be blocked by amplifier A1 from propagating to segment S7, because F1's frequency is outside the upstream operating frequency of A1. F2 in contrast may propagate to S7 with a 13 dBmV attenuation plus an amplification of 10 dBmV, the gain of A1 in the upstream direction (e.g., −1 dBmV from S3A, −4 dB from T2, −0.5 dB from S5, −1 dB from T3, −0.5 dB from S6, and +10 dBmV from A1, −0.5 dB from S7).

FIG. 8A illustrates process 800 that may be performed in accordance with one or more embodiments to identify and/or locate an ingress noise in a network. Process 800 describes one variation (e.g., identifying/locating ingress noise or wideband interference) of process 500 from FIG. 5. The process begins at step 810 in which a computing device, such as analyzer 118, obtains and stores data that characterizes the communication paths between one or more CPEs (e.g., AD1 through AD6) and the fiber node (or other termination device) at the beginning of the network branch. Step 810 includes the retrieval steps described above for step 510 of FIG. 5. For example, at the end of step 810 (FIG. 8A), each row of a table 150 (e.g., table 150 from FIG. 6A) may contain an identifier and spectral analysis data for up to P frequencies for one CPEs AD1 through ADn.

Figure 5:
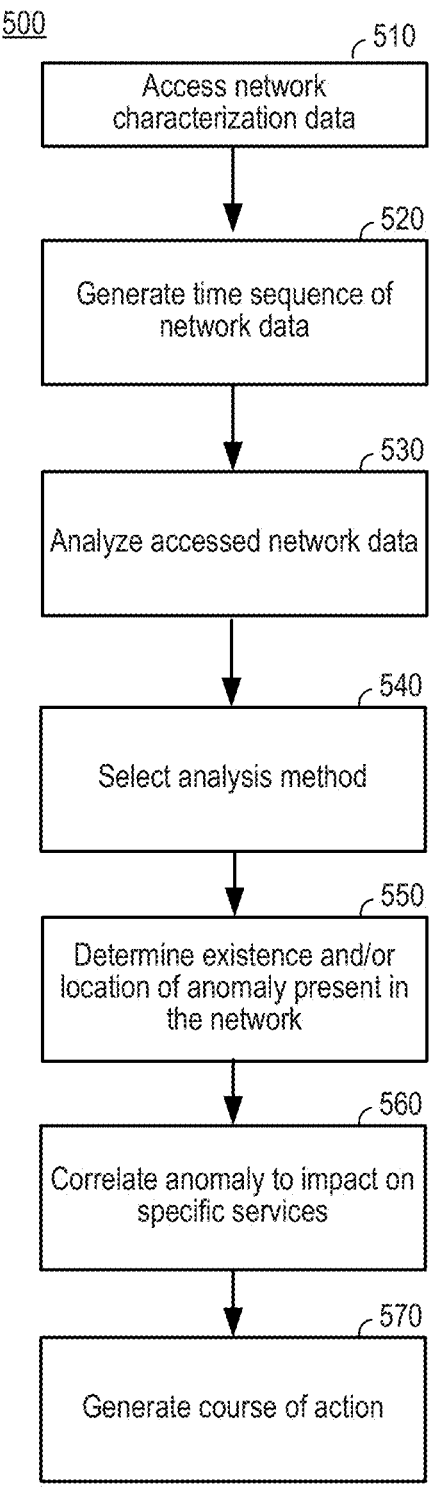
FIG. 5 illustrates operations in a flow chart that may be performed in accordance with one or more embodiments.

As in step 510 of FIG. 5, analyzer 118 may repeat step 810 to collect and store table 150 for multiple iterations. The iterations may be periodic, occurring at a predetermined rate, or may occur on a varying rate basis (e.g., as fast as data can be collected). Analyzer 118 may store every iteration of data, or may store only the most recently collected (e.g., the most recent 2, 3, 4, etc. iterations).

Table 150 may store in each row a time (not illustrated) at which the iteration was captured, which may be an absolute time, or may be a time relative to a prior iteration. In an example, for two different iterations of collected frequency spectrum data at different moments in time, analyzer 118 in step 820 may generate comparison data for each frequency (e.g., f1 at time 1 is compared to f1 at time 2) of the received signal at each CPE (e.g., AD1 through And). For example, as illustrated in FIG. 9A, columns 174-1 through 174-P include the comparison value, <d>, for each frequency f1 through fN respectively, for each CPE 172. The comparison data may be calculated from consecutive iterations, may be calculated from two non-consecutive iterations, or may be calculated from more than two consecutive or non-consecutive iterations. In some embodiments, the comparison data may be derived using complex division values calculated between two iterations of spectral analysis data (e.g., amplitude and phase). Additional data (not shown) may be included for each row, such as the difference in time(s) between the iterations on which columns 174-1 through 174-P are based. In step 820, a single value for each CPE may be calculated from the comparison values (e.g., delta values) of the respective set of frequencies (e.g., frequencies f1-fN) for the CPE (e.g., access device). The single value may be representative of noise received at the CPE. Column 175 illustrates the single values, <s>, for each CPE, which may represent a noise reception level at that CPE. The single value of an access device could be, for example, the absolute value of the RMS sum of the difference values <d> for that CPE.

In certain variations, step 820 may include characterizing frequency components of the noise source based on the frequency values 153-1 to 153-P or comparison values 174-1 to 174-P. The frequency data may be stored for each CPE as <f> in column 176 of FIG. 9A. In some embodiments, one or more frequency peaks may be detected based on an analysis of the frequency values 153-1 to 153-P or the comparison values 174-1 to 174-P. A center value for each frequency peak may be determined and these values may be stored in column 176.

Analyzer 118 may repeat step 820 periodically as new data is collected based on the iteratively collected data in step 810. Analyzer 118 may store every iteration of data in 174-1 through 174-P, 175, and/or 176, or may store only the most recently collected (e.g., the most recent 2, 3, 4, etc. iterations).

During each iteration, analyzer 118 may retrieve data for one or more CPEs AD1 through ADn, generate comparison (e.g., <d>) and summed (e.g. <s>) values for those CPEs, and generate a time sequence of values in step 830. In some embodiments in step 830, the computing device (e.g., analyzer 118) may optionally store the time sequence of values in a database 180, such as the one illustrated in FIG. 9B. For convenience, FIG. 9B shows data in a simple table. The table of FIG. 9B is merely one example of how data can be arranged in accordance with various embodiments. The actual format of data and/or of the tables or other data structures used to organize that data will vary among different embodiments. In some variations, database 180 is a portion of database 150. In this embodiment, FIG. 9B may be based on the data table depicted in FIG. 6B, except the <p> column of FIG. 6B may be replaced with the <s> column and the <f> column in FIG. 9B. In each row of database 180, an index 181 and CPE identifier 182 is included similar to those of FIG. 9A. Columns 183-1 through 183-T include a set of values for each time iteration. One value, labeled <t> includes a start, end, medium, or other time at which the iteration is captured and calculated within a margin of error (e.g., delta t). The other value in each column may include the single value <s>, e.g., noise (or signal) reception level, and frequency data <f> as calculated in columns 175 and 176 of FIG. 9A. In alternative embodiments, each column may include only one value <t> for all of the rows in that column, instead of storing a separate <t> value for each row. The number of iterations T may be any value and will depend on the available resources. In some variations, the columns 183-1 to 183-T may operate as a circular buffer (e.g., FIFO) storing the most recent T iterations.

In step 840 in FIG. 8A, one or more noise (or signal) reception levels <s> of column 175 in FIG. 9A and/or in columns 183-1 to 183-T of FIG. 9B may be compared to a predetermined threshold value. A comparison of a noise reception level <s> above the threshold may indicate the momentary ingress of noise at some point in the network branch as shown in FIG. 7. The predetermined threshold value may be the same or different for each CPE, and may be autonomously adapted based on a previous comparison or previous values of <s> for one or more CPEs. For example, noise reception levels for one or more CPEs on a network branch may be averaged over a period of time to determine and average value at a CPE, and the threshold value for detecting a momentary noise source may be adjusted based on the average value. In certain variations, for a particular CPE, one or more comparisons of <s> to the threshold value over several iterations may be used to detect the ingress of a momentary noise source (e.g., 3 out of 5 positive comparisons).

In response to at least one noise reception level <s> being determined to be above the threshold, noise ingress or wideband interference is determined to exist in step 845, and the process continues to step 850.

In response to the noise reception levels <s> being determined to not be above the threshold, noise ingress or wideband interference is determined not to exist in step 845, and the process loops back to step 810. Steps 810-840 may be a specific example of steps 510-530 in FIG. 5 and step 845 may be a specific example of step 540, in which the analysis method selected includes the remainder of the steps of FIGS. 8A and 8B, which are performed as a specific example of step 550.

In step 850, one or more noise (or signal) reception levels <s> from respective multiple CPEs for the same time interval <t> are designated for use in detecting the noise ingress location (e.g., break in the communication link). In some variations, only CPEs with noise reception levels <s> above the threshold are designated for detection of a noise ingress location. In other variations, CPEs with noise reception levels <s> below the threshold, but near a CPE with a noise reception level <s> above the threshold are also included for the analysis. In further variations, all CPEs on a network branch having at least one CPE with a noise reception level <s> above the threshold are designated for analysis.

For one or more of the CPEs designated in step 850, noise attenuation as a function of the location of noise ingress in the network branch may be determined in step 860. For example in FIG. 7, for each physical location along a communication channel or link in the network at which the ingress of noise may occur into the network branch, an attenuation factor AF may be calculated for a given CPE. The attenuation factor AF may be a multiplier or non-linear formula that indicates the attenuation of the noise signal when it reaches the CPE. As illustrated in FIG. 7, for example, a noise source F1 entering between S3A and S3B may be attenuated by 10 dBmV when received by AD2. For a given CPE (e.g., ADn), an attenuation factor AFn may be expressed as a function of physical location of the noise ingress on the network branch and/or a function of frequency of the noise source (e.g., AFn[location, frequency]). The measure of noise (e.g., noise reception level <s>), at a particular CPE (e.g., n), for a particular noise source (e.g., F1), may be determined by the noise level (e.g., N) at the point of ingress multiplied (or added in decibels) by the attenuation factor AFn (e.g., <s>=N dBmV+AFn dB). In various embodiments, the noise level at the point of ingress, N, and noise reception levels <s> may represent power, voltage, or current, and may be a maximum, peak, RMS, or other average value. Further, while AFn is expressed as a multiplication factor above, <s> may be determined as a non-linear function of N, position, and frequency.

In step 860, the attenuation factor AFn for the CPEs may be stored in a database 190 as illustrated in FIG. 9C. For convenience, FIG. 9C shows data in a simple table. The table of FIG. 9C is merely one example of how data can be arranged in accordance with various embodiments. The actual format of data and/or the tables or other data structures used to organize that data will vary among different embodiments. For each CPE, a row entry is included that contains an index 191 uniquely identifying the entry, a CPE identifier 192, and an attenuation factor AFn. One example of determining an attenuation factor for each CPE in step 860 is shown in FIG. 8B.

In step 861 of FIG. 8B, interconnection of all of the components in the network branch are identified, mapped, and/or stored in a database generated by analyzer 118 or other computing device (e.g., FIG. 2). One example of such interconnect data is illustrated in the database 200 illustrated in FIG. 9D. For convenience, FIG. 9D shows data in a simple table. The table of FIG. 9D is merely one example of how data can be arranged in accordance with various embodiments. The actual format of data and/or of the tables or other data structures used to organize that data will vary among different embodiments. In database 200, one or more points of interconnection (i.e., nodes) between two components that affect noise transmission and/or attenuation of noise to an access device is listed as a node in column 201. For each node, the associated row in the database 200 includes connection information for one or more devices connected to the node. The devices are listed in columns across the rows. In column 202-1, the first device for each node is listed along with a terminal of that device that is connected. For example, in the Node 1 row, the first device ON represents the optical node illustrated in FIG. 7, with the terminal 1 (i.e., terminal connected to S11) of the optical node ON listed as connected to Node 1. Column 202-2 lists a second device (if one exists) connected to the node. In the Node 1 row, for example, column 202-2 lists the first terminal of branch segment S11 connected to Node 1. Although not shown, additional columns may be included to illustrate additional devices connected to each node. Although illustrated as a table, the interconnection data may be represented in other forms, such as a schematic or wiring diagram.

From database 200, noise signal paths from one or more locations (e.g., every location) in the network to a CPE may be identified and/or mapped in step 862. For example, from the location marked by an X between S3A and S3B in FIG. 7, a signal path can be mapped to AD5 as traversing 100 feet of S3 (e.g., S3B), through T2, through the entire length of S5, through T3, and to AD5.

In step 863, signaling characteristics for one or more components in the network branch are retrieved from a database 210 that is shown in FIG. 9E. For convenience, FIG. 9E shows data in a simple table. The table of FIG. 9E is merely one example of how data can be arranged in accordance with various embodiments. The actual format of data and/or of the tables or other data structures used to organize that data will vary among different embodiments. In database 210, each row includes electrical characterization data for a different component. In the present example, the first row includes data for CPE AD1. In column 211, an index number is included in the cell that uniquely identifies each row, and in column 212, a component identifier associated with the respective component is included in each cell of the row. The cells in columns 213-1 to 213-4 include parameters for each component. While four columns are shown storing parameters, each row associated with each component may have more or less than four parameters. For example, in row 6 CPE AD6 is shown as having two parameters, each made up of a parameter name (e.g., sig loss) and an associated value (e.g., 0.5 dB). The first parameter, Type, indicates that AD6 is a CPE (e.g., access device). The second parameter represents the signal loss attributable due to the path between the CPE input and the next identified component in the network branch (e.g., T3).

In another example in database 210, row 7 illustrates signal characteristics of network branch segment S1 illustrated in FIG. 7. In this example, segment S1 includes four different parameters. The first parameter, Type, indicates that S1 is an RG-6 coaxial cable. The second and third parameters indicate signal attenuation through S1 as a function of length and frequency. In row 7 column 213-2, attenuation of signals in S1 is given as 1 dBmV per 100 feet of cable for signals in the 5 to 42 MHz range. In row 7 column 213-3, attenuation of signals in S1 is given as 5 dB per 100 feet of cable for signals in the 0.6 to 0.75 GHz range. The given frequency ranges and attenuations are only one example, and other embodiments may have other ranges, more or less ranges, and other attenuations. In row 7 column 213-4, the entire length of S1 is given as 10 ft. Rows 8-17 illustrate similar parameters for other segments in the network branch.

In rows 18 and 19 of database 210, FIG. 9E illustrates parameters for amplifiers A1 and A2. In these examples, amplification is given for each amplifier for two different frequency ranges in two different directions. Row 18 column 213-2, for example indicates that amplifier A1 amplifies signals in the 5 to 42 MHz range by 10 dBmV in the upstream direction, but attenuates signals in the same frequency band by 60 dBmV in the downstream direction. Row 18 column 213-3 indicates that amplifier A1 amplifies signals in the 0.6 to 0.75 GHz range by 10 dBmV in the downstream direction, but attenuates signals in the same frequency band by 60 dBmV in the upstream direction. In rows 20-24, insertion loss (column 213-2) and tap isolation (column 213-3) are illustrated for taps/splitters T1-T5. The cell entries of table 210 are only a few examples, and other components and other parameters may be specified. For example, further effects on signal frequency, such as phase shift, phase-frequency distortion, frequency tilt, etc., caused by each component may also be indicated as parameters.

Returning to FIG. 8B, in step 864 the signaling characteristics retrieved in step 863 are associated to the identified signal paths in step 862 to determine the noise attenuation as a function of noise (e.g., signal) ingress location and frequency. In various examples, step 864 results in the attenuation factors of FIG. 9C. In various examples, the attenuation factor AFn, may be represented as a piecewise function or pseudo-code, with different portions of the function/code given for various ranges of locations along the network branch and for various ranges of signal frequency. For example, for locations of noise (e.g., signal) ingress along S3, the function of AF5 may be:

If (noise ingress location=S3) AND (frequency=5-42 MHz), than

AF5=-C1 -C2 -C3 -C4 -C5; where,

C1=(length along S3 starting from T2)×1 dBmV/100 ft; (e.g., S3 attenuation loss)
C2=4 dBmV; (e.g., insertion loss of T2)
C3=100 ft×0.5 dBmV/100 ft; (e.g., S5 attenuation loss)
C4=1 dBmV; (e.g., insertion loss of T3)
C5=0.5 dB; (e.g., signal loss at AD5).

The terms C1 through C5 included in AF5 may be determined from connection information in FIG. 9D and the values of each term may be determined from the electrical characteristics in FIG. 9E.

As described above, attenuation (e.g., attenuation factor AFn) may be a function of noise ingress location and frequency. In various embodiments, the frequency data $<f>$ in the tables of FIGS. 9A and 9B may be used. For noise ingress location, various embodiments may use location data in different forms. In some examples, location could be expressed as the component where the ingress of noise occurs (e.g., S3, 100 ft from T2). In another example, position could be expressed as total physical distance from the fiber node where the ingress of noise occurs (e.g., 1200 ft). If the network branch includes more than one sub-branch, the sub-branch may also be identified (e.g., 1200 ft, branch S3).

Figure 10:
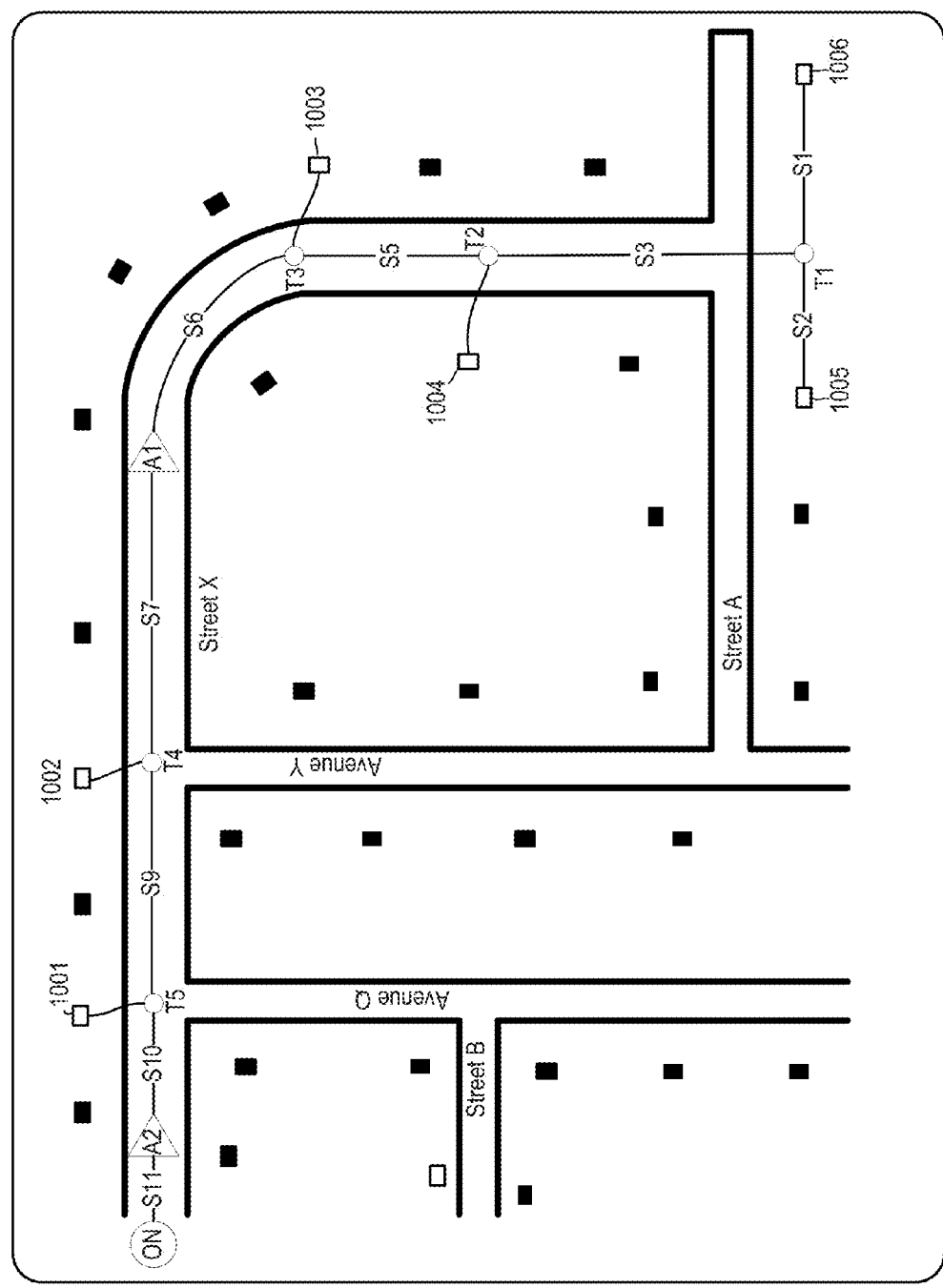
FIG. 10 illustrates a geospatial map in accordance with one or more embodiments.

In another example, location may be expressed as a geospatial location (e.g., latitude, longitude), which could then be mapped to a specific location within the network. In certain embodiments, database 210 in FIG. 9E may include additional parameters that describe the geospatial location (e.g., latitude and longitude) of the various components, or portions thereof. In another example, geospatial location information may be mapped to the network branch with a visual map. For example, FIG. 10 illustrates a map 1000 of a neighborhood with the geospatial locations of the network branch in FIG. 7 shown. In FIG. 10, several components of the network branch are shown in the physical location in which they exist within the neighborhood. Buildings and structures, e.g., 1001-1006, are shown which may contain some network branch elements such as CPEs. For example, building 1006 may include CPE AD1. Structure 1002 may include S8 and a power supply cabinet comprising AD4. Map 1000 may include textual information, icons, and/or other indicators (not shown), which indicate network branch components in particular structures. For example, a portion of the table in FIG. 9E may be included in map 1000, which describes the interconnection of CPE AD1 within structure 1006. In various embodiments, map 1000 may take the form of an interactive interface displayed on a monitor or other display device. When a component illustrated on the map is selected or hovered over with a pointing (e.g., mouse, stylus, finger), for example, information (e.g., information from the tables in FIGS. 9A-9E, longitude, latitude, etc.) may be displayed in the form of a pop-up window or other textual display or provided in the form of auditory feedback.

At the completion of step 864 in FIG. 8B, the process may return to step 870 in FIG. 8A. In step 870, the ingress location of a noise source is determined based on noise attenuation factors and the noise reception levels $<s>$ and/or frequency data $<f>$ for multiple CPEs over one or more time iterations. For example, for a given time iteration, for a designated CPE, the relationship between the noise reception level $<s>$ and noise ingress level N may be calculated as follows (in decibels).

$<s>=(N+\text{AFn}[\text{location}, <f>])=>N=(<s>-\text{AFn}[\text{location}, <f>])$ If multiple designated CPEs (e.g., AD1 and AD2) detect the same noise source N, than the relationships above can be used to calculate the location of noise ingress. For example, using AD1 and AD5, the following relationships may be established.

$(<s1>-\text{AF1}[\text{location}, <f1>])=N=(<s5>-\text{AF5}[\text{location}, <f5>])$ Given that the noise reception levels at AD1 (e.g., $<s1>$) and AD5 (e.g., $<s5>$), the frequency data at AD1 (e.g., $<f1>$) and AD5 (e.g., $<f5>$) and the attenuation factor functions at AD1 (e.g., AF1) and AD5 (e.g., AF5) have been determined and may be retrieved from the tables in FIGS. 9B-9C, and all terms of attenuation factors are known from the tables in FIGS. 9D-9E, location of the noise ingress may be solved from the above relationship. When using two designated CPEs (e.g., access devices), a single solution for location may be calculated. For example, formulas for AF1 and AF5 for a noise source in the location of segment S3 and in the frequency range of 5-42 MHz may be as follows:

$$AF1 = -(200 \text{ ft} - loc * 1 \text{ dB}/100 \text{ ft}) - 4 \text{ dBmV} - 0.1 \text{ dBmV};$$
$$= +(loc/100 \text{ ft}) * 1 \text{ dB} - 6.1 \text{ dB};$$
$$AF5 = -(loc * 1 \text{ dB}/100 \text{ ft}) - 4 \text{ dBmV} -$$
$$0.5 \text{ dBmV} - 1 \text{ dBmV} - .5 \text{ dBmV};$$
$$= -(loc/100 \text{ ft}) * 1 \text{ dB} - 6 \text{ dB};$$

where ($loc$ = location = distance along $S3$ from $T2$).

Given a noise reception level at AD1 of $<s1>=14.9$ dB, and a noise reception level at AD5 of $<s5>=13$ dB, then location can be calculated as follows:

14.9 dB−(loc/100 ft)*1 dB+6.1 dB=13 dB+(loc/100 ft)*1 dB+6.0 dB;

loc=location=100 ft. from T7 on S2.

In various embodiments, the formula above or other relationships may be used for more than two designated CPEs. In such a case, various known algorithms may be used to calculate the best-fit solution for a location that satisfies the relationships.

In the various examples above, the frequency data (e.g., $<f1>$ and $<f5>$) may be the same, since it is generated from the same noise source. In other embodiments, as previously noted with respect to FIG. 9E, various components may induce distortions in the frequency. In such cases, the frequency data at different CPEs may be different. Nonetheless, using frequency parameters from the table in FIG. 9E, the distortions may be accounted for in the formulation of the attenuation factors.

In certain variations, the determined location of noise ingress may be transmitted to a remote device and/or displayed on an interactive map (e.g., FIG. 10) on a display device that provides a geospatial location (e.g., latitude, longitude) of the point of ingress. For example, one or more servers (e.g., analyzer 118) may perform the steps of FIGS. 8A and 8B, and transmit the location to a technician in the field for troubleshooting and correcting the problem of noise (e.g., signal) ingress.

In some embodiments, one or more steps of FIG. 8A may be omitted or replaced. For example, steps 820 and 830 generate and store a time sequence of CPEs values (e.g., populate data structures such as those depicted in FIGS. 9A-9B). Step 840 then tests noise reception values against a predetermined threshold based on the values generated and stored (e.g., values from data structures depicted in FIGS. 9A and 9B). In some embodiments, steps 820-840 may be replaced by a comparison step that compares the network characterization data for a CPE with predetermined expected frequency spectrum data for that CPE. Frequency spectrum data for a particular CPE may be predetermined based on network characterization data measured at a data processing facility and expected attenuation based on the network structure. For example, referring to FIG. 2B, an expected frequency spectrum data for AD5 may be predetermined based on the signal measured at the data processing facility (e.g., downstream signal) and the expected attenuation of the signal based on the network elements between AD5 and the data processing facility (e.g., optical strands, optical node, S11, A2, S10, T5, S9, T4, S7, A1, S6, and T3). More generally, the data processing facility may be configured in such a way that AD5 has predetermined expected frequency spectrum data. Accordingly, the frequency spectrum data measured at AD5 may be compared in step 845 to the expected predetermined frequency spectrum data for AD5. If the difference between the measured frequency spectrum data at AD5 and the expected predetermined frequency spectrum data for AD5 is greater than a threshold, the process of FIG. 8 may move to step 850. From step 850, the process may continue as previously described.

In some embodiments, noise ingress may be experienced over an unassigned frequency range. For example, a signal sent from a data processing facility may carry information on one or more 6 MHz frequency channels (e.g., assigned frequency range). The information may be carried on a phase and/or amplitude modulated signal in the assigned frequency range. An example of an assigned frequency range can be seen in the plot illustrated in FIG. 4A. An amplitude-modulated signal can be seen in the frequency range from 664 MHz to 697 Mhz. In some embodiments, noise ingress may be measured in a signal in a frequency range that is unassigned (e.g., that is not phase and/or amplitude modulated). For example, in FIG. 4A, the amplitude measured above 731 MHz (circled) represents ingress noise 401 over an unassigned frequency range. Depending on the one or more CPEs that experience this ingress noise, a location for the noise may be located. For example, the process of FIGS. 8A and 8B may be used to locate the noise.

In some embodiments, noise ingress may be experienced over an assigned frequency range, but detection of the noise may be limited. For example, in the plot illustrated in FIG. 4A, an amplitude modulated signal can be seen in the frequency range from 664 MHz to 697 Mhz. In some embodiments, noise may be experienced in this assigned frequency range, but the noise may be undetectable (e.g., below a threshold) across each 6 MHz frequency channel. A guard interval may be placed between each 6 MHz channel. For example, in FIG. 4A, an interval is illustrated between each 6 MHz channel where little to no amplitude is measured (e.g., amplitude below a threshold). In some embodiments, the guard intervals between 6 MHz channels are used to detect noise that is otherwise undetectable across the 6 MHz channels. For example, if amplitude is measured across a guard interval (e.g., amplitude above a threshold) at a CPE, it may be determined that the signal received at the CPE has experienced noise ingress since little to no amplitude (e.g., amplitude below a threshold) is expected over the guard interval. Depending on the one or more CPEs that experience this ingress noise, a location for the noise or signal ingress may be located. For example, the process of FIGS. 8A and 8B may be used to locate the noise or signal ingress.

In some embodiments, the noise ingress as described above, may instead include wide band interference and/or power arching. For example, the plot illustrated in FIG. 4B depicts wideband interference over a frequency range. Wideband interference may be differentiated from noise ingress based on an energy level for the noise being above a predetermined threshold. Depending on the one or more CPEs that experience wideband interference, a location for the noise may be located. For example, the process of FIGS. 8A and 8B may be used to locate the noise due to wideband interference in the same manner as locating an external noise source.

As noted above, attenuation of noise ingress and wideband interference may be frequency dependent (e.g., different for different frequency bands). In various examples, wideband interference and noise ingress may have bandwidths that span frequencies (e.g., F1 and F2) that have different attenuations throughout the network. In such cases, the analysis above to locate a noise source may be performed separately for one or more different frequency bands in the noise/interference bandwidth. In the table in FIG. 9E, for example the network is shown to exhibit different attenuations in two different frequencies bands (e.g., 5-42 MHz and 0.6-0.75 GHz). For noise ingress or wideband interference spanning both of these frequency bands, the process of FIGS. 8A and 8B may be performed on the spectrum data from the CPEs over each of these frequency bands separately, with detection and location of the noise determined based on just one of the analyzed frequency bands, or based on the results of more than one band. For example, a location of a noise source may be determined separately for each frequency band, resulting in multiple identified locations of noise ingress. The determined locations may then be compared to determine if the detected noise is a common noise source, or different noise sources. In one example, if the distances (e.g., geographically or linearly along the network path) between the locations is less than a predetermined threshold, the noises may be determined to be from a single source. If the distances between the noise locations is above the predetermined threshold, the noises may be determined to be from different sources. If determined to be from a single source, the locations may be combined (e.g., averaged) to determine a more precise location of the noise source.

FIG. 11 illustrates a process 1100 for identifying and locating a malfunctioning amplifier in a network. The malfunctioning amplifier (e.g., A1 or A2 of FIG. 2B) may induce a frequency peak or attenuation (e.g., a suck out) as previously described with respect to FIGS. 4C and 4D, respectively. Process 1100 describes one variation (e.g., identifying/locating a malfunctioning amplifier) of process 500 from FIG. 5. The process begins at step 1110 in which a computing device, such as analyzer 118, accesses and, optionally, stores data that characterizes the communication paths between one or more of CPEs AD1 through AD6 and the fiber node (or other termination device) at the beginning of the network branch. Step 1110 may include the retrieval and storage steps described above for steps 510 and 520 of FIG. 5. For example, at the end of step 1110, each row of a table 150 (e.g., table 150 from FIG. 6A) may contain an identifier and frequency spectrum data for up to P frequencies for one of CPEs AD1 through ADn.

As in step 510 and 520 of FIG. 5, analyzer 118 may repeat step 1110 to collect and store table 150 for multiple iterations. The iterations may be periodic, occurring at a predetermined rate, or may occur on a varying rate basis (e.g., as fast as data can be collected). Analyzer 118 may store every iteration of data, or may store only the most recently collected (e.g., the most recent 2, 3, 4, etc. iterations). In certain variations, step 1110 may average or accumulate the collected data over time, which may include, for each frequency, accumulating and/or averaging the data over every iteration from a selected starting point in time, or may include a windowed average of a predetermined number of the most recent iterations of data. In some examples, only the accumulated or average values are stored in a memory.

In step 1120, analyzer 118 may retrieve the data stored in 1110 for one or CPEs AD1 through ADn, and analyze the data for indications of an amplifier malfunction. For example, the collected data from step 1110 may, when illustrated as a graph, appear as in FIG. 4C having a frequency peak or as in FIG. 4D having an attenuation at a particular frequency.

Step 1120 may detect a frequency peak in the data for a CPE by, for example, detecting a frequency band that exceeds a predetermined amplitude for a predetermined bandwidth as illustrated in FIG. 4C. The predetermined amplitude may be for example, an absolute amplitude (e.g., −20 dBmV), or may be a relative amplitude (e.g., +10 dBmV over the average amplitude) of a predetermined transmission band (e.g., 505 MHz to 517 MHz). The bandwidth could be, in various examples, a minimum width to distinguish the peak from transit noise. For example, the upper and lower limits of the frequency band having the peak could be specified as where the amplitude falls within −3 dBmV from the center frequency amplitude (or other predefined level). Detecting a frequency peak may further be based on instantaneous frequency measurements or average frequency measurements in which a number of frequency measurements are averaged over time. In some examples, a frequency peak may be detected by curve fitting the frequency data (e.g., to a multi-order polynomial) over a limited bandwidth (e.g., 20 MHz). For example, a window of a predefined frequency bandwidth may be swept over the frequency data (e.g., results calculated for the window positioned at different locations across the full bandwidth) of a particular CPE, and at each location of the window, a curve fit of the windowed data could be performed. The fitted curve could then be compared, within a predetermined margin of error, to predetermined curves (e.g., a signature) characteristic of frequency peaks of known amplifier errors. For example, the difference between the calculated curve and the predetermined curve could be integrated over the bandwidth of the window and compared to a threshold value.

Step 1120 may further detect frequency attenuation (e.g., a suck-out) in the data for a CPE by, for example, detecting a frequency band that is attenuated to a predetermined amplitude for a predetermined bandwidth as illustrated in FIG. 4D. The predetermined amplitude attenuation may be, for example, an absolute amplitude (e.g., −42 dBmV) within a bandwidth with an expected higher amplitude (e.g., −29 dBmV), or may be a relative amplitude (e.g., −10 dBmV over the average amplitude) of a predetermined transmission band (e.g., 386 MHz to 389 MHz). The bandwidth could be, in various examples, a minimum width to distinguish the peak from transit noise. For example, the upper and lower limits of the frequency band having the peak could be specified as where the amplitude falls within −3 dBmV from the center frequency amplitude (or other predefined level). Detecting frequency attenuation may further be based on instantaneous frequency measurements or average frequency measurements in which a number of frequency measurements are averaged over time. In some examples, a frequency attenuation may be detected by curve fitting the frequency data (e.g., to a multi-order polynomial) in the same manner as curve fitting a frequency peak as described above (e.g., comparing the curve fit data to a signature).

Step 1120 may include storing characterization data (e.g., center frequency, bandwidth, peak or attenuation, etc.) for the peaks and attenuations identified in the frequency data of the one or more CPEs.

If an amplifier malfunction is not detected in step 1120, the process may return to 1110 through decision block 1125. If an amplifier malfunction is detected, the process may proceed to step 1130 to locate the malfunctioning amplifier. Steps 1110-1120 may be a specific example of steps 510-530 in FIG. 5 and step 1125 may be a specific example of step 540, in which the analysis method selected includes the remainder of the steps of FIG. 11, which are performed as a specific example of step 550.

In step 1130, the detected frequency peaks and/or attenuations from step 1120 in the frequency data of multiple CPEs may be compared to identify peaks and/or attenuations that are common to multiple CPEs, or unique to one CPE. The comparison may done, for example by comparing the characterization signature data (e.g., center frequencies, bandwidths, fitted curves, etc.) of two peaks or attenuations identified in the data of two different CPEs, or by comparing the fitted curves.

In step 1140, for an identified peak or attenuation, CPEs on a common network branch are sorted into two different groups: 1) CPEs with frequency data that include the identified peak or attenuation, and 2) CPEs with frequency data that does not include the identified peak or attenuation. Step 1140 may be repeated for each different peak or attenuation.

For an identified peak or attenuation, step 1150 identifies the direction of signals on the network in the bandwidth where the peak or attenuation is located. Amplifiers in the network branch may be designed to transmit upstream (e.g., from CPEs to a terminating device) and downstream (e.g., from the terminating device to the CPEs) at different frequency ranges. For example, a frequency band of 90 MHZ to 800 MHZ may be allocated to 6 MHz wide broadcast channels (e.g., high definition television channels), which would be transmitted from the terminating system to the CPEs, and a frequency band of 30 MHZ to 89 MHz may be allocated for back channel communications from the CPEs to the terminating system. In such an example, the peak and attenuation illustrated in FIGS. 4C and 4D, respectively, would both be in frequency bandwidth for signals transmitted from the terminating system to the CPEs.

In step 1160, one or more amplifiers may be identified in the network as candidates for generating the peak or attenuation based on the amplifiers' relative position to the group of CPEs that include the peak or attenuation, based on the amplifiers' relative position to the group of CPEs that do not include the peak or attenuation, and/or based on the direction of the signals in the frequency band of the peak or attenuation.

For example, a candidate amplifier may be identified by determining that the amplifier is along the signal path in the network between the group of amplifiers that includes the peak or attenuation and the group that does not include the peak or attenuation. For example, referring to FIG. 2B, if AD4 and AD6 do not include the anomaly, but AD1, AD2, AD3, and AD5 do exhibit the anomaly, amplifier A1 may be determined to be a candidate amplifier that is causing the peak or attenuation.

In another example, a candidate amplifier may be identified by determining which amplifiers transmit to at least one of the CPEs that include the anomaly and based on the direction of signals in the frequency band where the anomaly is located. For example, if AD6 has data that includes a peak in a frequency band where signals are transmitted from the terminating system to the CPEs, amplifier A2 may be determined to be the only possible amplifier that transmits such signals to AD6, and thus be included as a candidate amplifier. Step 1160 may be repeated for each identified peak or attenuation.

In step 1170, each candidate amplifier may be geospatially located based on stored data that correlates network components to physical locations. For example, candidate amplifiers may be located on the map in FIG. 10, by latitude and longitude, by street address, etc. The map in FIG. 10 may be generated and presented as a user interface. Step 1170 may include outputting the location on a display (e.g., on a displayed map output by analyzer 118 or a display of a remote device). Step 1170 may be repeated for each identified peak or attenuation.

Process 1100 may also be used to detect other anomalies known to occur at amplifiers, such as automatic gain control error as illustrated in FIGS. 4K and 4L. FIGS. 4K and 4L show frequency data of the same access device, but at two different temperatures, 95 degrees Fahrenheit and 55 degrees Fahrenheit, respectively. As shown in the figures, the amplitude of the signals are higher in FIG. 4L, where the temperature is lower. Such variation may be indicative of faulty automatic gain control in an amplifier.

To detect such an error, step 1120 may compare amplitude (e.g., integrated over a predefined bandwidth) for a CPE at two different temperatures. Temperature data may be acquired for example, based on public weather reports, and the frequency data may be collected in step 1110 when the temperatures are within predetermined ranges (e.g., above a threshold first temperature and below a threshold second temperature that is lower than the first temperature). In step 1140, when the comparison results in a difference that is greater than a predetermined threshold (e.g., stored in a memory), the CPEs (E.g., access devices) may be grouped into a group designated as exhibiting this particular temperature dependent fault. Likewise, CPEs having a comparison less than the predetermined threshold may be grouped into a group designated as not exhibiting this particular temperature dependent fault. Once the CPEs are grouped, steps 1150 to 1170 proceed as previously described.

FIG. 12 illustrates a process 1200 that may be performed in accordance with one or more embodiments to identify and/or locate incorrect plant setup, such as detecting a missing or malfunctioning component (e.g., a filter) that is designed to correct a predetermined non-constant frequency response (e.g., frequency tilt) introduced by one or more components in the network. The incorrect plant setup may be as described herein with respect to FIG. 4E.

Process 1200 describes a variation of process 500 from FIG. 5 for identifying/locating incorrect plant setup. The process begins at step 1210 in which a computing device, such as analyzer 118, obtains and, optionally, stores data that characterizes the communication paths between one or more of CPEs AD1 through AD6 and the fiber node (or other termination device) at the beginning of the network branch. Step 1210 may include the retrieval and storage steps described herein for steps 510 and 520 of FIG. 5. For example, at the end of step 1210, each row of a table 150 (e.g., table 150 from FIG. 6A) may contain an identifier and frequency spectrum data for up to P frequencies for one of CPEs AD1 through ADn.

Analyzer 118 may repeat step 1210 to collect and store table 150 for multiple iterations in the same manner as described herein with respect to step 510 of FIG. 5.

In step 1220, analyzer 118 may retrieve the data stored in 1210 for one or more CPEs AD1 through ADn, and analyze the data for indications of incorrect plant setup, such as a missing or malfunction filter that would cause the frequency tilt as illustrated in FIG. 4E. For example, the collected data from step 1210 may, when illustrated as a graph, appear as in FIG. 4E having frequency tilt as indicated by line L1.

Step 1220 may detect frequency tilt or other non-constant frequency responses of a network component by, for example, linear approximating, or curve fitting to a polynomial, the frequency data of an CPE, and then comparing the approximation/curve fit to predetermined known frequency responses (e.g., signatures) of network components. The comparison could, in one example include comparing (within a predetermined margin of error) the slope of a linear approximation of the frequency data to a known slope (e.g., tilt) introduced by a specific type of coaxial cable (e.g., RG6) within a particular frequency band. In other examples, the comparison could include an integrated difference, a cross-correlation, etc., between the approximated curve and the known curve (e.g., a signature) associated with particular components in the network. If the comparison indicates a match to a particular network component (e.g., the integrated difference being below a threshold value, the cross-correlation being above a threshold value) the type of component and the CPE at which the match was detected may be stored as an associated pair of data. Step 1220 may be repeated for multiple CPEs in the network.

If a component malfunction or incorrect plant setup is not detected in step 1220, the process may return to 1210 through decision block 1225. If an amplifier malfunction is detected, the process may proceed through block 1225 to step 1230 to locate the component malfunction or incorrect plant setup location. Steps 1210-1220 may be a specific example of steps 510-530 in FIG. 5 and step 1225 may be a specific example of step 540, in which the analysis method selected includes the remainder of the steps of FIG. 12, which are performed as a specific example of step 550.

The detected component/CPE data pair from step 1220 of multiple CPEs may be compared in step 1230 to identify CPEs having frequency data indicative of the same network components having the non-constant frequency response (e.g., tilt).

In step 1240, CPEs on a common network branch are sorted into two different groups: 1) CPEs with frequency data that includes the non-constant frequency response of a particular component (e.g., tilt from a coaxial cable), and 2) CPEs with frequency data that do not include the non-constant frequency response of the identified component. Step 1240 may be repeated for each different identified component.

For each identified component, step 1250 may identify the direction of signals on the network in the bandwidth where the non-constant frequency response was identified. For example, the frequency tilt detected in FIG. 4E is in the bandwidth from 125 MHz to 731 MHZ, which may be allocated for downstream transmissions (e.g., from the termination system to the CPEs).

In step 1260, components having a characteristic frequency response that matches the detected non-constant frequency response are identified as possible sources of the anomaly. Of the possible source components, those in the signal paths (based on the determined signal direction) of the CPEs in the group having the frequency response, but not in the signal paths of the access devices in the group not having the frequency response are identified as candidate components that generate the non-constant frequency response.

For example, in FIG. 2B, CPEs AD1 and AD2 may exhibit the frequency tilt corresponding to L1 in FIG. 4E for downstream signals, and CPEs AD3-AD6 may exhibit relatively lower tilt as indicated by L2 in FIG. 4E. The tilt of L1 may be determined to correspond to coaxial cable segments S1-S10 as possible sources. Of S1-S10, only S1-S3 are determined to be in the downstream signal path of AD1 and AD2, which exhibit the tilt, and not in the signal paths of AD3-AD6, which do not exhibit the tilt. Based on the determination, S1-S3 are identified as candidate components. Step 1260 may be repeated for each identified non-constant frequency response known to correspond to a network component.

In step 1270, for each candidate component, candidate correction devices and their locations in the network are identified for correcting the non-constant frequency response. The candidate correction devices (e.g., filters) could be already present, but not tuned or operating correctly, or could be missing and required to be added. Already present correction components, in step 1280, may be geospatially located based on stored data that correlates network components to physical locations. For example, candidate filters may be located on the map in FIG. 10, by latitude and longitude, by street address, etc. Step 1280 may include outputting the location on a display (e.g., on a displayed map output by analyzer 118 or other remote device). Similarly, for candidate correction devices that do not exist, appropriate locations (network path or geospatial) for correcting the non-constant response may be identified and/or displayed. Step 1280 may be repeated for each different candidate component. Based on the identified locations, already present or new correction devices may be tested within the network at the identified locations.

FIG. 13 illustrates a process 1300 that may be performed in accordance with one or more embodiments to identify resonant cavities within the network and to locate a network fault that is causing the resonant cavity (e.g., an impedance mismatch). The resonant cavity may be as described herein with respect to FIG. 4F. Process 1300 describes a variation of process 500 from FIG. 5 applied to resonant cavities.

The process begins at step 1310 in which a computing device, such as analyzer 118, obtains and, optionally, stores data that characterizes the communication paths between one or more of CPEs AD1 through AD6 and the fiber node (or other termination device) at the beginning of the network branch. Step 1310 may include the retrieval and storage steps described herein for step 510 of FIG. 5, which may result in the data in table 150 illustrated in FIG. 6A. Analyzer 118 may repeat step 1310 to collect and store table 150 for multiple iterations in the same manner as described herein with respect to step 510 of FIG. 5.

In step 1320, analyzer 118 may retrieve the data stored in step 1310 for one or more CPEs AD1 through ADn, and analyze the data for indications of a standing wave caused by an impedance cavity. For example, the collected data from step 1310 may, when illustrated as a graph, appear as in FIG. 4F with a periodic standing wave across the frequency spectrum (e.g., a periodic increase and decrease in signal amplitude across frequency).

Step 1320 may detect a standing wave by, for example, detecting local minimum or maximum amplitudes at multiple frequencies in the frequency data of an AD. For example, local minimum amplitudes may be found by scanning the data across frequency bands, and detecting frequency bands where amplitudes at adjacent frequencies above and below the frequency band have greater values than the amplitude at the frequency band being evaluated. To avoid detecting spurious minimums and maximums, the frequency data may be filtered to remove frequency components in the data that are above or below an expected or designated frequency at which the standing wave is to be detected. Local maximum amplitudes may be found in a similar way by detecting frequency bands where amplitudes at adjacent frequencies above and below the frequency band have lower values than the amplitude at the frequency band being evaluated. Once local minimum or maximum amplitudes are detected, a standing wave is detected by measuring periodicity of the local maximum or minimum amplitude to within a threshold tolerance.

In other examples, a standing wave may be detected by performing a Fourier Transform (e.g., a Fast Fourier Transform (FFT)) on the frequency data. Standing waves will be shown by a peak in the Fourier Transform, with the amplitude and time of the peak being respectively representative of the amplitude and time period of the standing wave. Step 1320 may be repeated for multiple CPEs in the network.

If a standing wave is not detected in step 1320, the process may return to 1310 through decision block 1325. If a standing wave is detected, the process may proceed through block 1325 to step 1330 to locate the fault causing the standing wave. Steps 1310-1320 may be a specific example of steps 510-530 in FIG. 5 and step 1325 may be a specific example of step 540, in which the analysis method selected includes the remainder of the steps of FIG. 13, which are performed as a specific example of step 550.

In step 1330, the detected standing waves from step 1320 of multiple CPEs may be compared to identify CPEs having frequency data indicative of the same impedance cavity, e.g., having the same periodicity and/or amplitude.

In step 1340, CPEs on a common network branch are sorted into two different groups: 1) CPEs with frequency data that include the detected standing wave, and 2) CPEs with frequency data that does not include the detected standing wave. Step 1340 may be repeated for each different standing wave (e.g., different period T1).

For each identified standing wave, step 1350 evaluates the topology of the network to identify candidate portions of the network on which the fault(s) may exist, based on one or more factors, including the groups of CPEs that do/do not exhibit the standing wave, and based on the transmission and isolation properties of the network components for signals in the frequency range in which the standing wave is detected (e.g., tap isolation, amplifier directionality, etc.). Step 1350 may include identifying each network segment (e.g., S1, S2, and S3) that connects access devices in the group of CPEs that exhibit a particular standing wave, and identifying each network segment that connects access devices in the group of CPEs that do not exhibit the standing wave. For example, referring to FIG. 2B, assuming the frequency data from AD1-AD3 and AD5 exhibited a standing wave having the same period, and the frequency data from AD4 and AD6 did not exhibit the standing wave, segments S1-S6 would be identified as possibly including the faults causing the standing wave, and segments S7-S11 would be excluded from those segments possibly including the fault.

Step 1350 may further include identifying network components (e.g., taps, amplifiers, filters), that would prevent the standing wave from propagating from one segment to another in the frequency range in which the standing wave is detected. For example, referring to FIG. 4F, the standing wave is shown in the range of approximately 100 MHZ to 460 MHZ. According to the component data in table 9E, for example, the amplifiers A1 and A2 exhibit high attenuation (−60 dB) in the upstream direction for signals in that frequency range, and thus, any standing wave signal would not propagate past an amplifier in the upstream direction. As another example, splitters and taps T1-T5 exhibit 20 dB of tap isolation (e.g., −20 attenuation from tap to tap), which may effectively prevent a standing wave signal from propagating from one tap to another tap. Continuing with the example above, amplifier A1 would prevent the standing wave from propagating from the group of segments S1-S6 to the segments S7-S10, This would confirm that the fault is within segments S1-S6. In other examples, where both faults between which the standing wave reflects lie between two amplifiers, the standing wave may be prevented from propagating in one direction (e.g., past the upstream, amplifier), but may propagate in the opposite direction (e.g. past the downstream amplifier).

In the example above, the segments on which the faults exist may further be narrowed based on the tap to tap isolation of T2, which would effectively prevent a standing wave generated on S4 to propagate to S1-S3, and likewise prevent a standing wave generated on S1-S3 from propagating to S4. Because in the example above, the frequency data of AD1, AD2, and AD3 exhibit the standing wave equally, the faults that generate the standing wave may be located within S6 and S5. These are the only segments from which the standing wave would propagate to segments S3 and S4 equally.

For each identified standing wave, step 1360 includes calculating a distance between the faults creating the standing wave based on the period of the standing wave, and based on the velocity of propagation of the signals on the segments of the network identified in step 1350. As previously indicated, the period T of a standing wave is representative of the time a signal takes to propagate from a first impedance mismatch to a second impedance mismatch and reflect back to the first impedance mismatch. Electromagnetic waves travel in free space at a known rate of 983,571,056 feet per second (ft./sec), but in a different medium, the waves propagate only at a faction of the free space velocity of propagation. A coaxial cable may carry RF signals, for example, at 87% of the velocity of propagation in free space. As another example, a single mode optical fiber carrying a light pulse at 1310 nm wavelength may have a characteristic velocity of propagation of 68% of the free space velocity of propagation.

For each of the possible propagation paths identified in step 1350, a velocity of propagation is determined in step 1360. The velocity of propagation will depend on the components in the network through which the standing wave propagates. Values for a velocity of propagation for different components may be stored as predetermined values in a memory. For example, the component parameters illustrated in FIG. 9E may include additional velocity of propagation values stored for particular components (e.g., RG6 and RG11 cables). Based on a velocity of propagation of the possible paths of the standing wave signal as determined in step 1350 (e.g., S5 and S6), the distance between the faults may be determined by multiplying the velocity of propagation along the signal path by the standing wave period T to determine a round trip reflected signal distance, which may be divided by two to determine the distance between faults.

In step 1370, candidate locations of faults creating the standing wave are determined based on the candidate network segments that may include the standing wave, and based on the calculated distance between faults (e.g., impedance mismatches). In one example, one fault from which the standing wave is reflected is assumed to be a component in the network, such as an output of an amplifier. A location may then be identified as a fault location based on the calculated distance from the assumed component having the impedance mismatch.

For example, in FIG. 4F, the period T is shown to be approximately 41.7 nS (1/24 MHz). Assuming a velocity of propagation in segments S5 and S6 of 0.87 times the free space velocity of propagation, the distance between faults can be determined to be approximately 0.87*983,571,056 ft./sec,*41.7 nS/2=17.8 ft. In this example, the fault location would be identified as 17.8 ft from the location of amplifier 1 along S6. While in this example, the amplifier A1 was assumed to be the location of one fault, other devices may be assumed to be a fault location, e.g., taps, splitters, etc.

In some embodiments, more than one standing wave may be detected for a set of CPEs. For example, performing an FFT on frequency data from a CPE may exhibit two peaks, indicating two standing waves. In such a case, signals may be reflected in a first impedance cavity between a fault and an impedance mismatch at a first device (e.g., amplifier A1), and a second impedance cavity may be formed between the same fault and a second device (e.g., tap T3). In such a case, respective distances may be calculated using the process 1300 for each cavity. In variations where the distances add to the length between two components (e.g., amplifier A1 and tap T3), it can be determined that the fault lies between the two components at a first calculated distance from the first component and a second calculated distance from the second component. Step 1370 may be repeated for each different standing wave detected.

Step 1380 may include outputting the location(s) to a memory or on a display (e.g., on a displayed map output of FIG. 10 by analyzer 118 or other remote device). Step 1380 may be repeated for each different fault or break location.

FIG. 14 illustrates a process 1400 that may be performed in accordance with one or more embodiments to identify various other anomalies, such as signal roll off as illustrated in FIG. 4G, frequency notches as illustrated in FIG. 4H, excessive attenuation as illustrated in FIG. 4I, and incorrectly inserted band pass filters as illustrated in FIG. 4J. Process 1400 describes a variation of process 500 from FIG. 5 as applied to the above faults.

The process begins at step 1410 in which a computing device, such as analyzer 118, obtains and, optionally, stores data that characterizes the communication paths between one or more of CPEs AD1 through AD6 and the fiber node (or other termination device) at the beginning of the network branch. Step 1410 may include the retrieval steps described herein for steps 510 and 520 of FIG. 5, which may result in the data in table 150 illustrated in FIG. 6A. Analyzer 118 may repeat step 1410 to collect and store table 150 for multiple iterations in the same manner as described herein with respect to step 510 of FIG. 5.

In step 1420, analyzer 118 may retrieve the data stored in 1410 for one or more CPEs AD1 through ADn, and analyze the data for indications of signal roll off, frequency notches, excessive attenuation, and band pass filters. For example, the collected data may be curve fit to polynomials indicative of each of the faults above.

If no faults are detected in step 1420, the process may return to 1410 through decision block 1425. If one of the faults is detected, the process may proceed through step 1425 to step 1430 to locate the fault. Steps 1410-1420 may be a specific example of steps 510-530 in FIG. 5 and step 1425 may be a specific example of step 540, in which the analysis method selected includes the remainder of the steps of FIG. 14, which are performed as a specific example of step 550.

In step 1430, the detected faults or breaks from step 1420 of multiple CPEs may be compared to identify CPEs having frequency data indicative of the same faults ore breaks in the network.

In step 1440, CPEs on a common network branch are sorted into two different groups: 1) CPEs with frequency data that includes the same fault, and 2) CPEs with frequency data that does not include the same fault. Step 1440 may be repeated for each different fault.

For each identified fault, step 1450 evaluates the topology of the network to identify candidate portions of the network on which the fault(s) may exist. Identifying the candidate network portions may be based on one or more factors, including the groups of CPEs that do/do not exhibit the fault, and based on the transmission and isolation properties of the network components for signals in the frequency range in which the fault is detected (e.g., tap isolation, amplifier directionality, etc.). Step 1450 may include identifying each network segment (e.g., S1, S2, and S3) and/or service group that connects CPEs in the group of CPEs that exhibits a particular fault, and identifying each network segment and/ or service group that connects CPEs in the group of CPEs that do not exhibit the fault. For example, referring to FIG. 2B, assuming the frequency data from AD1-AD3 and AD5 exhibited the same fault, and the frequency data from AD4 and AD6 did not exhibit the fault, segments S1-S6 would be identified as possibly including the fault, and segments S7-S11 would be excluded from those segments possibly including the fault.

Step 1450 may further include identifying network components (e.g., taps, amplifiers, filters), that would prevent the fault from propagating from one segment to another in the frequency range in which the fault is detected. For example, referring to FIGS. 4G, 4H, 4I, and 4J the faults are shown in the range of approximately 100 MHZ to 460 MHZ. According to the component data in the table in FIG. 9E, for example, the amplifiers A1 and A2 exhibit high attenuation (−60 dB) in the upstream direction for signals in that frequency range, and thus, any fault signal would not propagate past an amplifier in the upstream direction. As another example, splitters and taps T1-T5 exhibit 20 db of tap isolation (e.g., −20 attenuation from tap to tap), which may effectively prevent a fault signal from propagating from one tap to another tap. Continuing with the example above, amplifier A1 would prevent the fault from propagating from the group of segments S1-S6 to the segments S7-S10, and thus indicate that the fault is within segments S1-S6. In other examples, where the fault is between two amplifiers, the fault may be prevented from propagating in one direction (e.g., past the upstream, amplifier), but may propagate in the opposite direction (e.g. past the downstream amplifier).

In the example above, the segments on which the faults exist may further be narrowed based on the tap to tap isolation of T2, which would effectively prevent a fault generated on S4 to propagate to S1-S3, and likewise prevent a fault generated on S1-S3 from propagating to S4. Because in the example above, the frequency data of AD1, AD2, and AD3 exhibit the fault equally, the components that generate the fault may be located within S6 and S5. These are the only segments from which the fault would propagate to segments S3 and S4 equally.

Step 1460 may include outputting the components on which the fault may exist to a memory or on a display (e.g., on a displayed map output by analyzer 118). Step 1460 may be repeated for each different fault location. In some embodiments, a display that represents the frequency spectrum data (e.g., spectral analysis data) for one or more CPEs may be generated. For example, analyzer 118 may generate such a display. FIG. 3A illustrates an example display representing spectral analysis data received from a single CPE. The plot illustrated in FIG. 3A shows amplitude (measured in dB on the y-axis) of a signal received at the CPE at various frequencies (measured in MHz on the x-axis). The plot may be generated based on a single iteration of frequency spectrum data received from a CPE or may be based on an average of a plurality of iterations of spectral analysis data received from the CPE.

In some embodiments, a display that represents frequency spectrum data (e.g., spectral analysis data) received from a plurality of CPEs may be generated. For example, FIG. 3B illustrates a plot similar to FIG. 3A where the plot shows the amplitude (y-axis) of signals received at a plurality of CPEs at various frequencies (x-axis). In an example, the plot may be color coded such that each AD has a particular color that indicates the depicted spectral analysis data in that color represents the signal received at that particular AD. In some embodiments, the display includes a zoom feature that enables a portion of the plot to be zoomed. For example, FIG. 3C illustrates a plot of spectral analysis data received from a plurality of CPEs zoomed over a frequency range between 320 MHz and 366 Mhz.

In some embodiments, the frequency spectrum data from one or more CPEs displayed, for instance, in a plot, may be selected based on one or more parameters. For example, the CPEs may be selected based on a geographic proximity (e.g., located on the same street, within a predetermined radius of a geographical location, within predetermined geographical boundaries, etc.). The CPEs may also be selected based on their location on a network. For example, CPEs AD1-AD6 may be selected based on one or more of the CPEs sharing a common network path from a data processing facility, the CEPs sharing a common optical node, the CPEs experiencing a common signal distortion, a combination of these, or any other suitable network architecture commonality.

Figure 15:
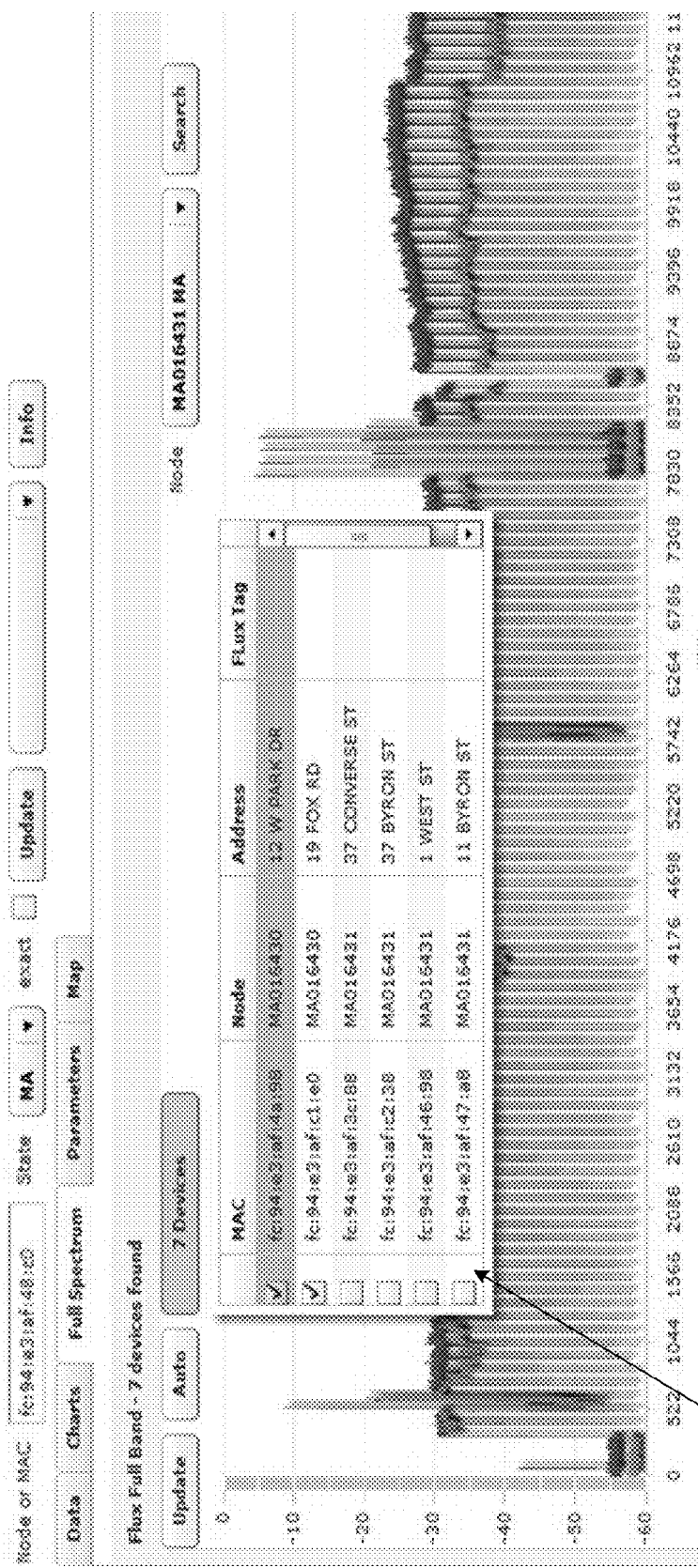
FIG. 15 illustrates a user interface in accordance with one or more embodiments.

As an example, FIG. 15 illustrates a graphical user interface display where one or more CPEs may be selected and subsequently displayed on a plot, such as a plot similar to that illustrated in FIG. 3B. The CPEs may be selected using a dialog box such as box 1501. The dialog box may be populated with CPEs by performing a search based on one or more of a geographic location, a network path, a combination of these, or any other suitable parameter, as described above. The CPEs may then be selected for display from dialog box 1501. Which CPEs are displayed in the dialog box may be based on the CPEs connection to a common node (e.g., an optical node), a MAC address for the CPE, a location (e.g., street address) for the CPE, or other suitable criteria.

In some embodiments, the analyzer may identify one or more signal distortions experienced at one or more CPEs based on the displayed frequency spectrum data (e.g., spectral analysis data). For example, an analyzer may generate a display such as the plots illustrated in FIGS. 4A-4L and FIG. 25 which exhibit one or more signal distortions (e.g., noise (e.g., signal) ingress, wideband interference, resonant peaking, RF suckout, tilt, high-end roll-off, a standing wave, a notch, attenuation beyond a threshold, weather related distortion, a band-pass filter, etc.) based on the display. In some embodiments, one or more CPEs may be selected autonomously for display based on the CPEs experiencing a common signal distortion (e.g., a notch), which is detected in the frequency data of each of the displayed CPEs. For example, the steps of 1120, 1220, 1320, and 1420 may each identify CPEs having frequency data that exhibits a fault, and the user interface may automatically display the frequency data for just those access devices on the user interface. In other aspects, the analyzer may automatically identify (e.g., highlight, label, draw a box, etc.) the specific network characteristic (e.g., tilt, peaking, etc.) that is detected.

Figure 16:
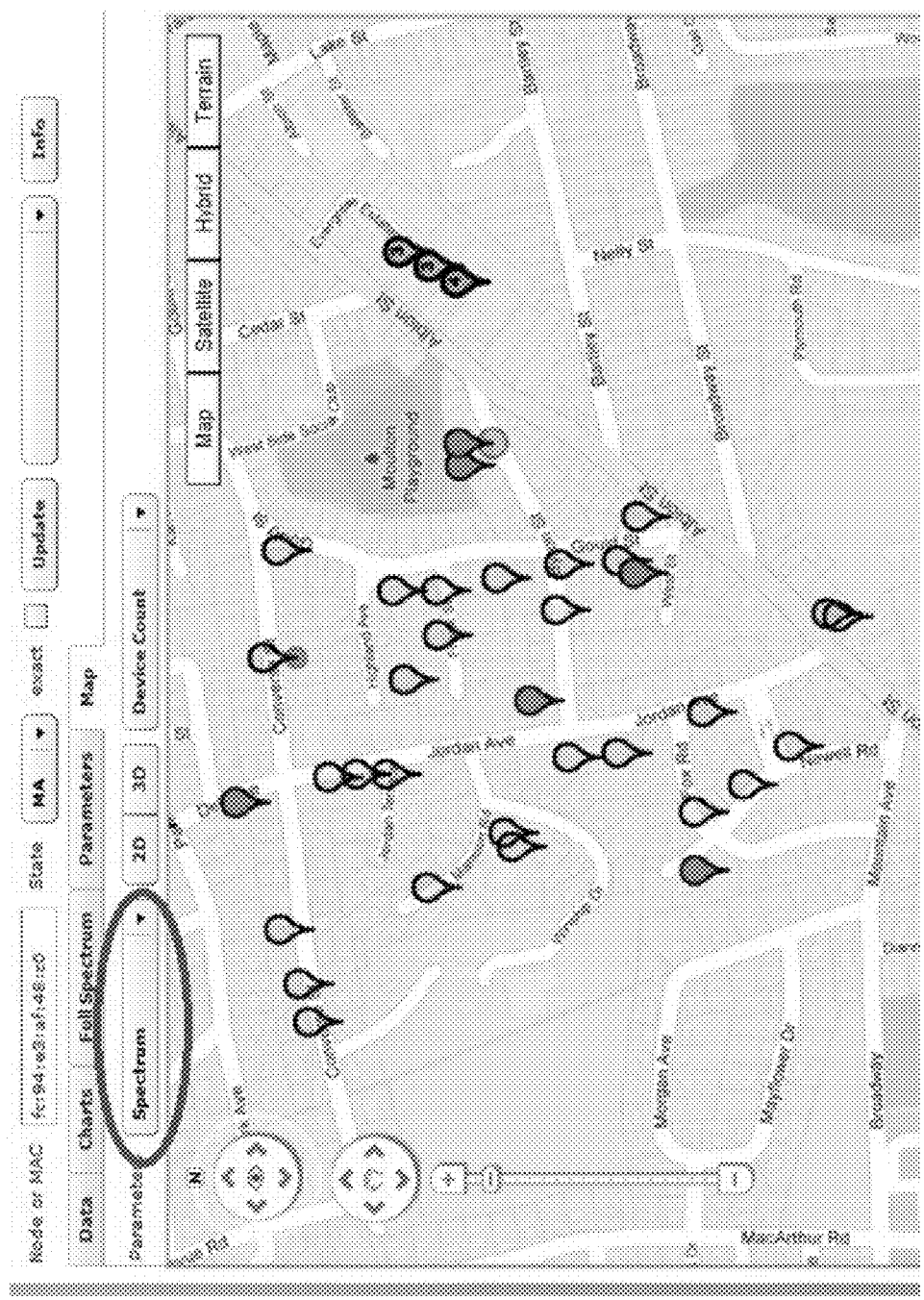
FIG. 16 illustrates an interactive map user interface according to one or more embodiments.

In some embodiments, the CPEs may also be displayed on a geographic map. For example, FIG. 16 illustrates a display where a plurality of selected CPEs is displayed on a geographic map. The map may be a street map, as illustrated, or any other geographical map. For instance, a street map may be displayed and the selected CPEs may be displayed as an overlay over the street map based on a location (e.g., street address) associated with the CPEs. In some embodiments, a user may locate one or more signal distortions experienced at the one or more CPE based on the displayed geographical map. For instance, a geospatial area may be delineated as containing a fault, based on a group of CPEs on the map being determined to have frequency data exhibiting the fault or break in a communication link within the network.

Figures 17, 18:
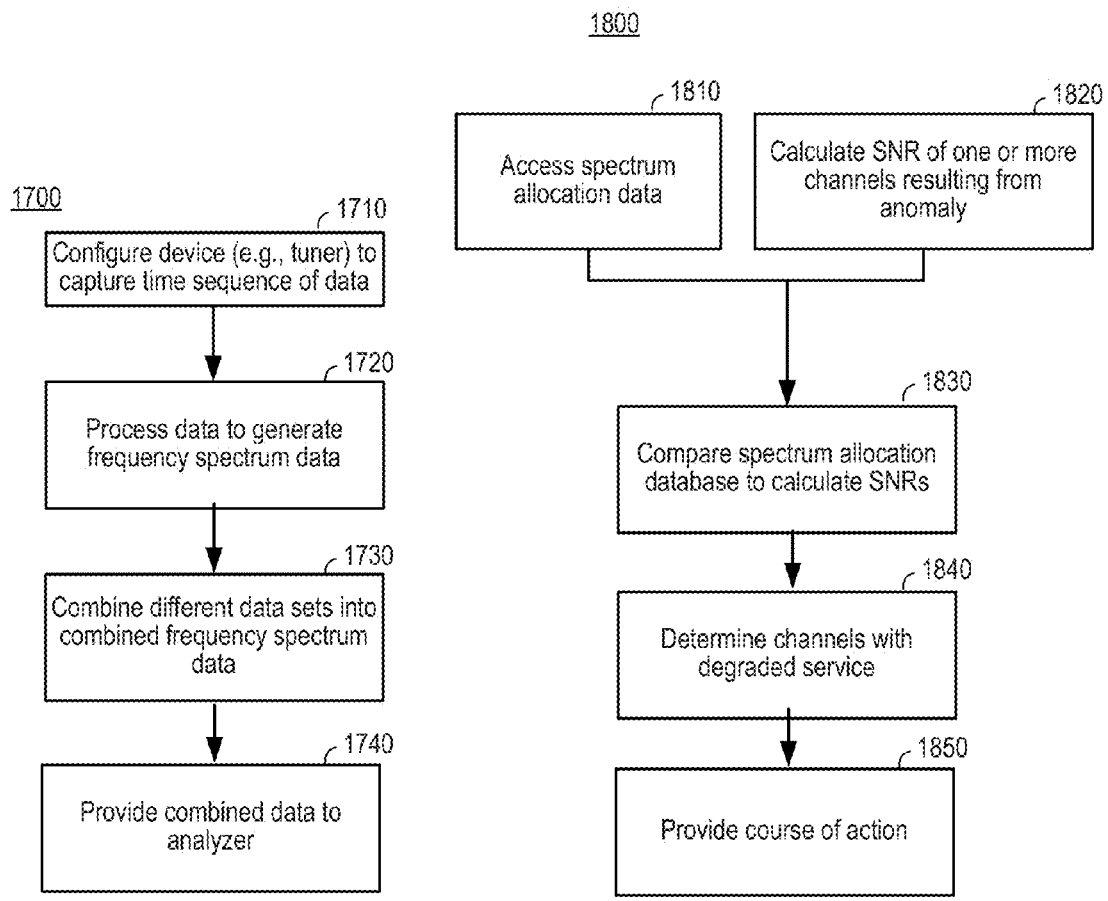
FIGS. 17-18 illustrate operations in flow charts that may be performed in accordance with one or more embodiments.

FIG. 17 illustrates a process 1700 that may be performed in accordance with one or more embodiments to generate the frequency spectrum data that is retrieved in for example, steps 510, 810, 1110, 1210, 1310, and 1410. Process 1700 may be performed by an access device entirely or with the analyzer 118. In step 1710, CPE may configure a tuner to capture frequency data over a predetermined window of time, and in step 1720, the captured data is processed (e.g., with an FFT) to generate a frequency spectrum of the captured data.

In some aspects, the tuner is a wideband tuner that samples the network at a high rate (e.g., the Nyquist rate) sufficient to capture a frequency band that includes several channels. For example, the tuner may sample at the Nyquist rate for an entire allocated bandwidth of the network (e.g., 0-750 MHz). Processing of this data in step 1720 results in a full spectrum as shown, for example in FIGS. 4A-4L that can be used in the processes described herein to detect the faults and/or the location of faults in the network.

In other aspects, the tuner is capable of only tuning to a single channel (e.g., a 6 MHz bandwidth), which is downconverted and then time sampled. In such a case, only a limited window of frequency data about the center frequency of the channel may be calculated. For example, in some variations, only the signal-to-noise ratio (SNR) of the channel may be determined by the CPE. The SNR of a single channel may be treated as a single 6 MHz wide frequency bin. The tuner may then be tuned to multiple different channels, with the SNR retrieved for each channel. The SNRs may then be ordered sequentially by frequency to represent a low-resolution frequency spectrum data that can be used in the processes disclosed herein for detecting and locating faults.

In other variations, pre-equalization coefficients of a CPE may be used to derive the in-channel frequency response (ICFR) of the network over a single channel. Various CPEs for example, will include a pre-equalizer and/or post equalizer that will pre and post equalize signals transmitted from and received at the CPE, respectively. The equalization coefficients of the equalizers may be adaptive and set in response to the frequency response of the channel to which the tuner is tuned. That is, the equalizers are configured to cancel out distortions induced by the network. By taking the inverse of the equalizer coefficients, the in-channel frequency response of the channel is obtained. The tuner can be tuned to multiple channels to obtain the in-channel frequency response of multiple channels.

In step 1730, the frequency data from the multiple different methods of capture for a CPE may be combined to provide a higher resolution spectrum. For example, the in-channel frequency response for each channel can be combined with other frequency data to provide a higher resolution spectrum. For example, the in-channel frequency response of a particular channel can be overlayed/combined with the same frequency band of data obtained in the full spectrum capture to provide higher resolution information within that band. For example, if the full spectrum frequency data exhibits a standing wave, and a minimum of the standing wave falls within a channel, in-channel frequency response of that channel may be overlayed with the frequency data of the full spectrum data within the channel bandwidth to provide a higher resolution image of that bandwidth. Likewise, the SNR data of each channel, when viewed in frequency sequential order, may show a course representation of a standing wave. The in-channel frequency response of each channel may be normalized to the SNR of that channel and sequenced together to provide a higher resolution picture of the standing wave.

In step 1740, the combined frequency spectrum data is provided to the analyzer 118. In some embodiments, the different spectrum data is provided to analyzer 118 separately, and then combined by analyzer 118. Before and after data capture, the tuner may be utilized by the user to tune to video or data services.

Once an anomaly is detected and located, FIG. 5 includes steps 560 and 570 for determining the impact of the anomaly on services (e.g., video and data services) provided over the network. FIG. 18 illustrates a process 1800 for performing these steps in more detail. In step 1810, a spectrum allocation of services (e.g., video, audio, DOCSIS, MOCA, etc.) to channels is retrieved from a database. In step 1820, a SNR is derived for one or more channels based on the detected anomaly and frequency spectrum data. For example, if a standing wave is detected, the channels where the standing wave minimums are located may be determined, and the SNR of those channels may be calculated based on the frequency spectrum data in those channel bandwidths. In step 1830, the spectrum allocation database is compared to the calculated SNRs to identify those channels that may potentially be impacted by a reduced SNR. In step 1840, the calculated SNRs of the potentially impacted channels are compared to predetermined threshold SNRs that may indicate a SNR level below which results in a degraded service (e.g., pixelated video). The threshold SNR may be different for different types of service. For example, a DOCSIS data service may be impacted to a greater extent than video for the same SNR. Channels having an SNR below their respective thresholds for the type of service they carry are identified as impacted channels. In step 1850, a course of action is determined for the impacted channels. For example, if a standing wave was detected and located within a user premises, but no channels in the user premises were impacted, analyzer 118 may determine that no course of action should be taken. As another example, the customer may have a channel that is degraded, but it may be a service to which the customer does not subscribe. In such a case, the analyzer 118 may still determine not to take action. In another example, if the customer's subscribed services were impacted, analyzer 118 may provide the location of the fault causing the standing wave to a technician or to the customer with suggested directions of correcting the fault (e.g., tighten connection at drop line to premises, remove splitter, remove filter, etc.).

Figure 19:
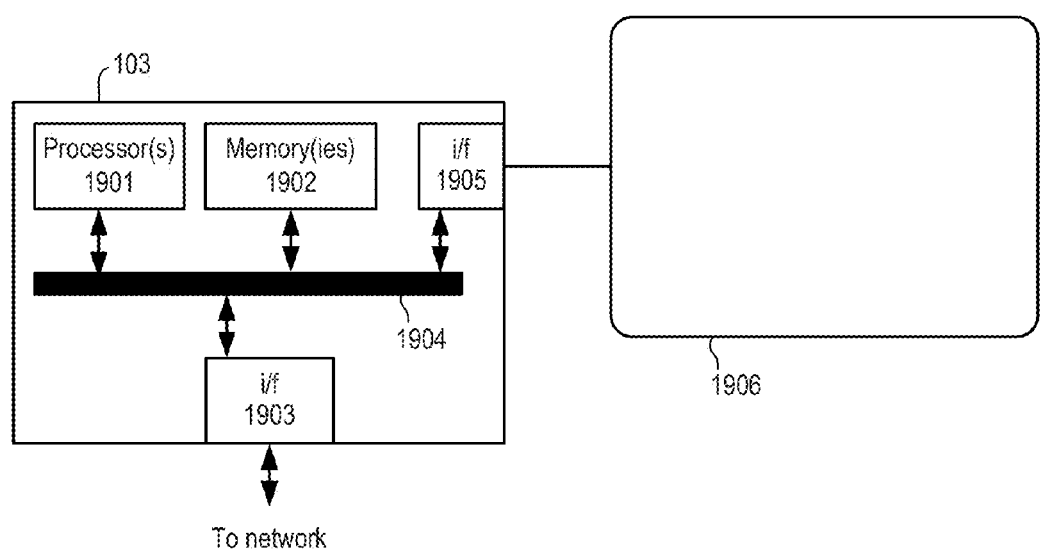
FIG. 19 includes a diagram showing elements of an illustrative computer device in which some embodiments may be practiced

FIG. 19 is a block diagram of an illustrative analyzer 118 according to some embodiments. In one embodiment, the analyzer can be implemented as a part of a CPE device. In at least some embodiments, analyzer 118 can be implemented as (or as part of) a server, system (e.g., leakage detection system), or other computer platform. Such a computer platform could be dedicated to performing analyzer 118 operations described herein, or could additionally perform other operations. Analyzer 118 may communicate with local office 118 and/or other network elements over one or more network interfaces (i/f) 1903. Interface 1903 could be, e.g., a Gigabit Ethernet card, 802.11 wireless interface, etc. Analyzer 118 may further include memory 1902 for storing machine-readable instructions and data and a processor 1901 for executing the instructions and controlling operations of analyzer 118 to perform the various functions described herein. Although a single block is shown for memory 1902 and a single block is shown for processor 1901, data/instruction storage and computational operations of analyzer 118 could respectively be distributed across multiple memory devices and multiple processors located within analyzer 118 or spread across multiple platforms (e.g., multiple computers, servers, mainframes, etc.). Memory 1902 may include volatile and non-volatile memory and can include any of various types of storage technology, including but not limited to read only memory (ROM) modules, random access memory (RAM) modules, magnetic tape, magnetic discs (e.g., a fixed hard disk drive or a removable floppy disk), optical disk (e.g., a CD-ROM disc, a CD-RW disc, a DVD disc), flash memory, and EEPROM memory, or other devices with equivalent capabilities. Processor 1901 may be implemented with any of numerous types of devices, including but not limited to one or more microprocessors, microcontrollers, digital signal processors, embedded processors, application specific integrated circuits, field programmable gate arrays, and combinations thereof. In at least some embodiments, processor 1901 carries out operations of analyzer 118 described herein according to machine-readable instructions (e.g., software) stored in memory 1902 and/or stored as hardwired logic gates within processor 1901. Processor 1901 may communicate with and control memory 1902 and interface 1903 over one or more buses 1904.

Analyzer 118 may output data to a display 1906 using video interface (i/f) 1905. Although not shown, analyzer 118 may also receive user input via a keyboard, mouse, finger or other user input device. In some embodiments, analyzer 118 may communicate with other computers and devices over network interface 1903. For example, a user having a remote computer (e.g., a laptop computer, PDA, smartphone, etc.) could establish a communication session with analyzer 118 over one or more network links. The user could provide instructions, submit queries, or otherwise interact with analyzer 118 by sending communications over the network links via the remote computer. Analyzer 118 could then provide data outputs to the user's remote computer over those same or other links, which data could then be output on a display of the user's computer (e.g., a web server).

Figure 20:
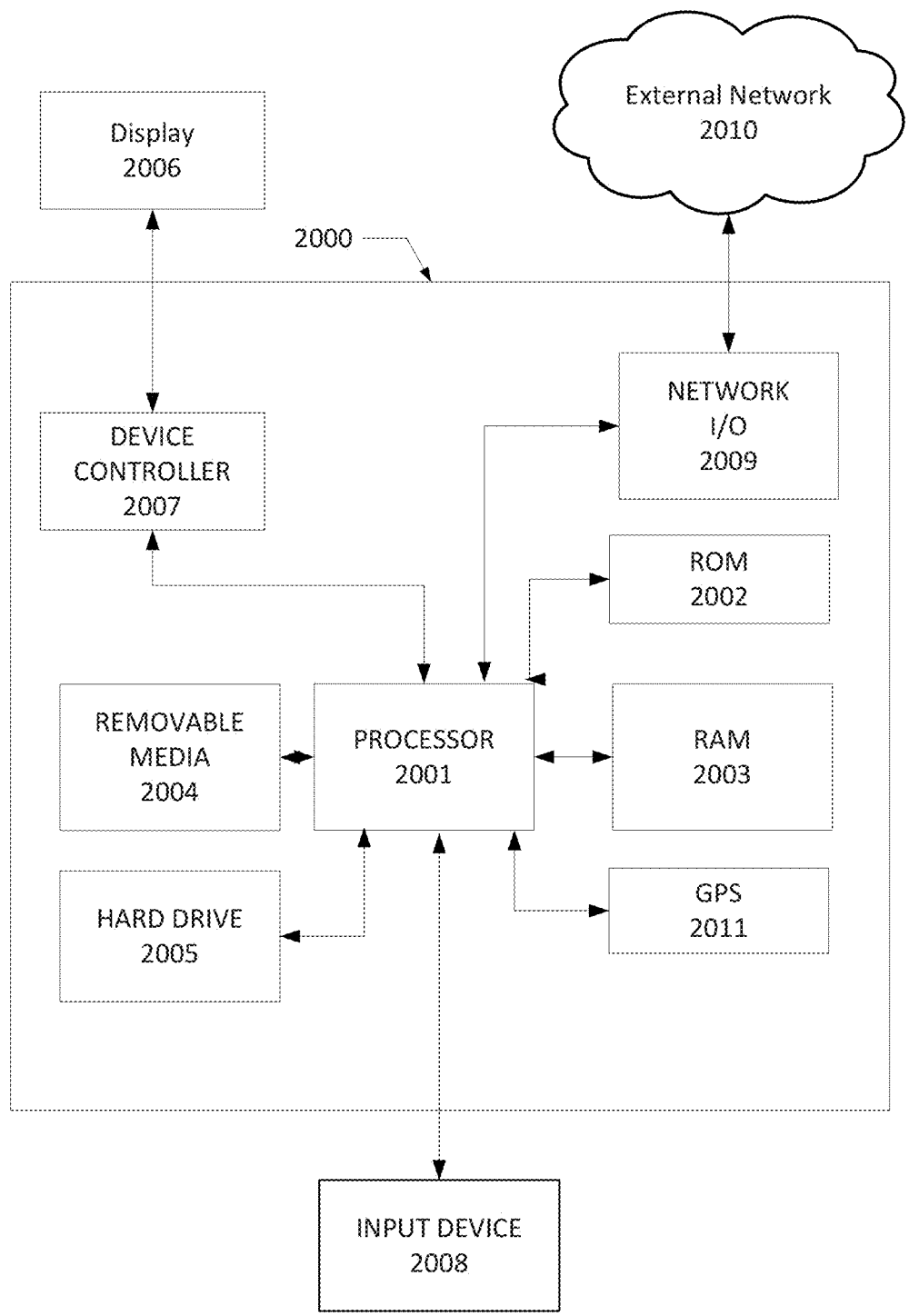
FIG. 20 illustrates an example computing device that can be used to implement any of the methods, servers, entities, and computing devices described herein.

As yet another variation, FIG. 20 illustrates general hardware elements (similar to FIG. 19) that can be used to implement any of the various computing devices discussed herein. The computing device 2000 may include one or more processors 2001, which may execute instructions of a computer program to perform any of the features described herein. The instructions may be stored in any type of computer-readable medium or memory, to configure the operation of the processor 2001. For example, instructions may be stored in a read-only memory (ROM) 2002, random access memory (RAM) 2003, removable media 2004, such as a Universal Serial Bus (USB) drive, compact disk (CD) or digital versatile disk (DVD), floppy disk drive, or any other desired storage medium. Instructions may also be stored in an attached (or internal) hard drive 2005. The computing device 2000 may include one or more output devices, such as a display 2006 (e.g., an external television), and may include one or more output device controllers 2007, such as a video processor. There may also be one or more user input devices 2008, such as a remote control, keyboard, mouse, touch screen, microphone, etc. The computing device 2000 may also include one or more network interfaces, such as a network input/output (I/O) circuit 2009 (e.g., a network card) to communicate with an external network 2010. The network input/output circuit 2009 may be a wired interface, wireless interface, or a combination of the two. In some embodiments, the network input/output circuit 2009 may include a modem (e.g., a cable modem), and the external network 2010 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 2011, which can be configured to receive and process global positioning signals and determine, with possible assistance from an external server and antenna, a geographic position of the device.

The FIG. 20 example is a hardware configuration, although the illustrated components may be implemented as software as well. Modifications may be made to add, remove, combine, divide, etc. components of the computing device 2000 as desired. Additionally, the components illustrated may be implemented using basic computing devices and components, and the same components (e.g., processor 2001, ROM storage 2002, display 2006, etc.) may be used to implement any of the other computing devices and components described herein. For example, the various components herein may be implemented using computing devices having components such as a processor executing computer-executable instructions stored on a computer-readable medium, as illustrated in FIG. 20. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Features described herein allow a wired network operator, such as a coaxial cable network operator, to approximate the location in the wired network at which an interfering signal, such as a wireless signal from a cell phone tower, radio station, is entering into the wired network. In general, when the interfering signal enters the wired network through the site of the leak (e.g., the location where cable shielding has worn away), it will propagate through the wired network, and will be received at the various devices, such as CPEs, that are near the site of the leak. Those CPEs will receive these signals with a signal strength, or amplitude, that depends on the distance traversed, and much of the degradation will be due to the free-space propagation between the wireless transmitter and the leak point in the wired network. By consulting databases identifying signal characteristics and locations of wireless transmitters (e.g., radio station tower location and signal strength/frequency information, cellular telephone tower information, etc.), and in view of the known location of the CPE, the CPE may determine an expected signal strength level at which the CPE would expect to receive the wireless signal.

For example, by knowing the location of a radio transmitter tower for a first radio station, and the signal strength being used by that tower, the CPE can determine an expected signal strength if the radio station's signal were received at the CPE's location. Then, by comparing that expected signal strength with the actual received signal strength (with an adjustment for average signal loss through the portion of the wired network between a leak location and the CPE), the CPE may generally determine whether the received wireless signal is stronger, or weaker, than the expected signal. If the received interfering wireless signal is stronger than expected, then the CPE may determine that the distance between the leak and the radio station tower is less than the distance between the radio station tower and the CPE. Conversely, if the received signal is weaker than expected, then the CPE may determine that the distance between the leak and the radio station tower is greater than the distance between the radio station tower and the CPE. With this information, and a map of the wired network's geographic route, the CPE may begin to approximate the location of the leak. Information from additional CPEs and/or regarding additional interfering signals (e.g., another signal from a different radio station tower, or from a cellular telephone tower) may be used to further improve the approximation.

An additional variation of the process of FIG. 5 will be discussed below with respect to FIGS. 21A-21B. The processes may be used together, with portions of each process first identifying respective types of anomalies (e.g., faults, leaks, breaks, etc.) in within a network as discussed in steps 510-530, and based on the identified anomalies, deciding which of the processes to continue in step 540 to determine the location of the anomaly as in step 550.

Figure 21A:
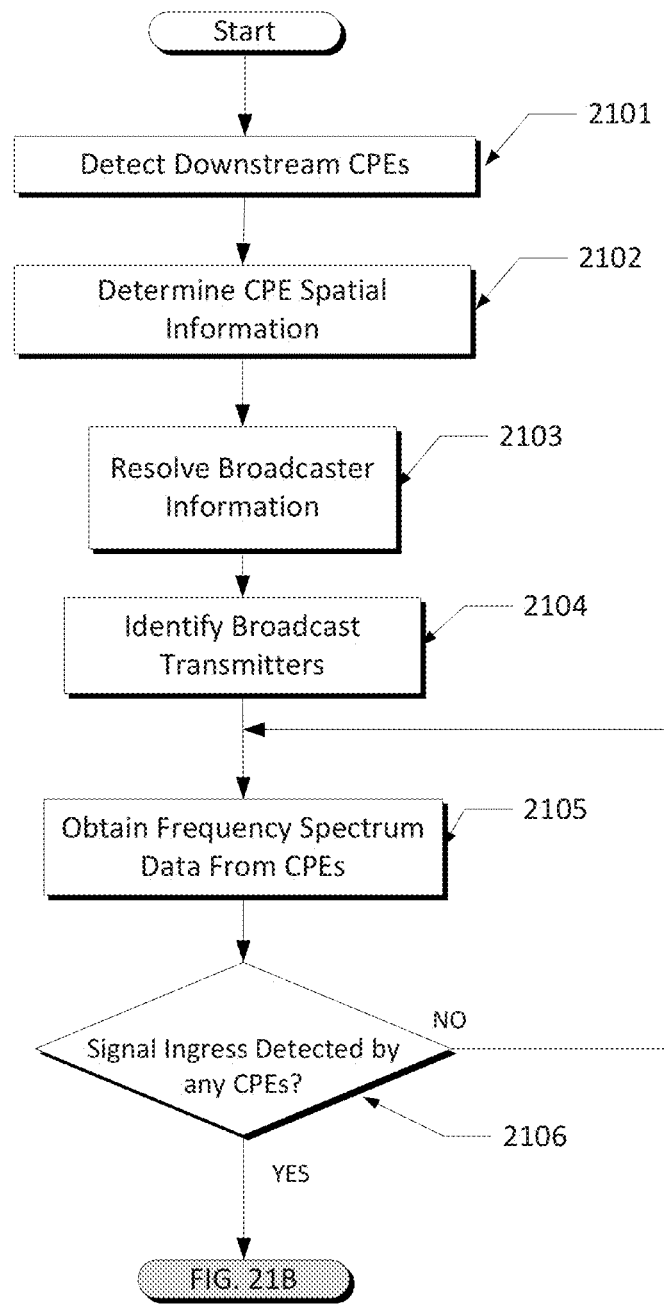
FIGS. 21A-B illustrate exemplary flowcharts of a method in accordance with one or more aspects of the disclosure.
Figure 21B:
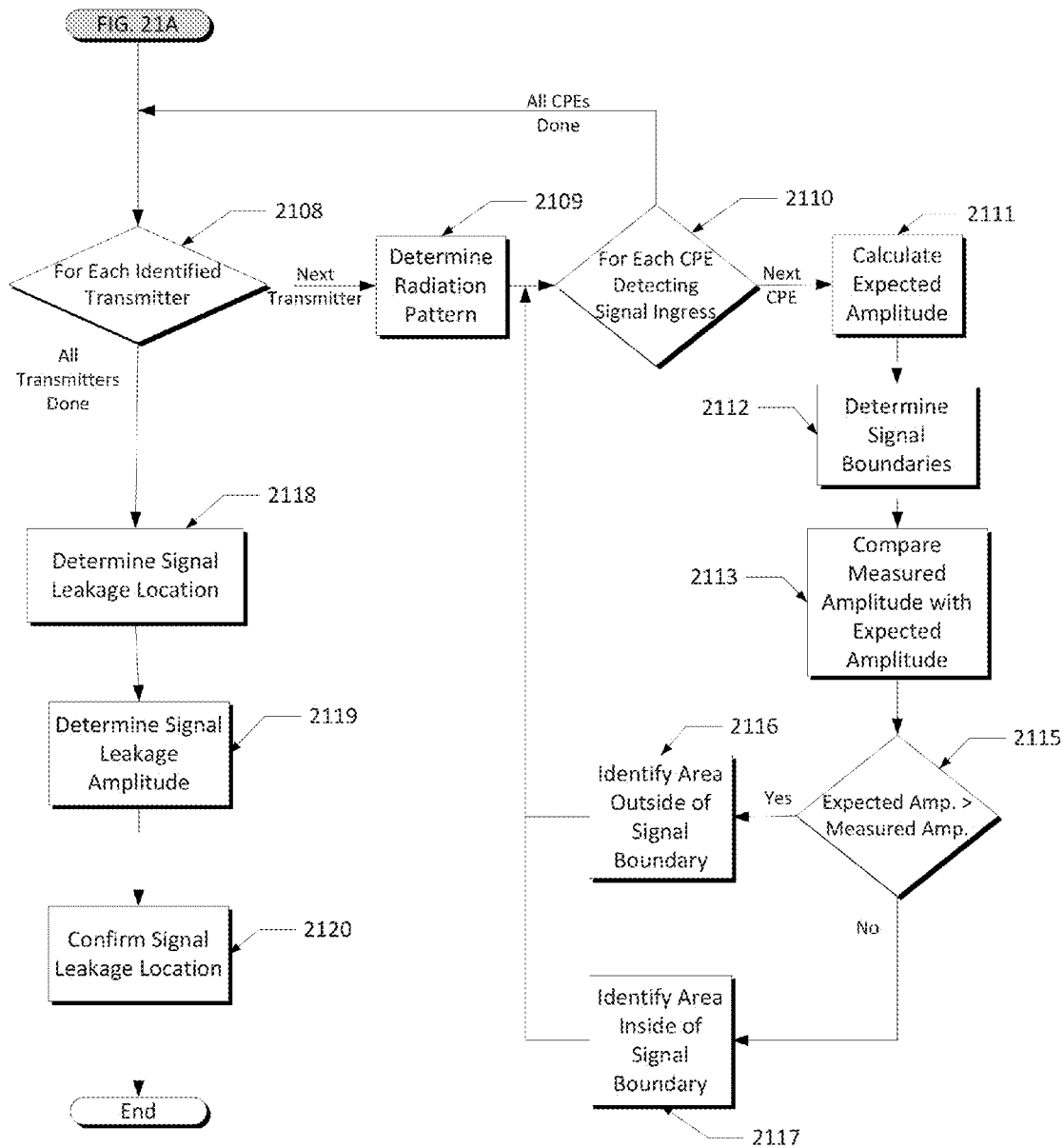

FIGS. 21A-B illustrate an example method by which the level of signal ingress or egress may be detected based on data obtained from a plurality of user premises devices that may be performed by one or more computing devices, such as computing device 200, or any other suitable computing device. When describing the steps of the method below, the term "system" may be used when referring to each component, either singularly or collectively, employed at each step of the method. Such usage is merely for ease in discussing the method, and should not be interpreted as limiting the exact embodiment in which the following method may be performed.

The process shown in FIGS. 21A-B describes one variation (e.g., identifying/locating ingress noise or wideband interference) of process 500 from FIG. 5). The process begins at step 2101, where for example, a leakage detection system, which may be implemented on computing device 2000, may detect one or more CPEs or access devices within a network. The system may detect one or more CPEs within a particular service group. In particular, the system may identify one or more CPEs that share and/or operatively connected to a particular communication link in the network. In some embodiments, the system may detect one or more CPEs in a network that are located downstream from all amplifiers within the network. In this example, the system may ignore any CPEs located upstream from and/or in between any amplifiers within the network. Additionally, the system may detect CPEs within a particular geographic, such as a particular street address, neighborhood, or other area. As discussed above, CPEs may be located in a user premises, such as premises 102, or may be located at any other suitable location in the network, such as a power supply cabinet. The detection of CPEs within the same service group and/or geographic location is further described below with respect to FIG. 22B. There are a variety of ways in which the system may detect downstream CPEs without departing from the scope of the present disclosure. For example, the leakage detection system may utilize satellite broadcasting systems to locate and/or detect downstream CPEs. As another example, a network provider or operator may transmit a frequency downstream and monitor the network for response signals transmitted from one or more downstream CPEs.

A local office associated with a network operator (e.g., local office 103) may include an interface, such as a termination system (e.g., termination system 104). In embodiments where the network is a hybrid fiber-coaxial network, the interface may be a cable modem termination system ("CMTS"), which may be a computing device configured to manage communications between devices on a network of communication links (e.g., links 101) and backend devices. The interface may be configured to place data on one or more downstream frequencies to be received by CPEs at various locations (e.g., user premises). In some embodiments, the CMTS may transmit to the system data relating to the detection of one or more CPEs in a downstream service group (e.g., MAC domain). For example, the CMTS may analyze data from a service group to locate all of the CPEs residing in the group. In other embodiments, the system may identify specific CPEs in the group that support particular capabilities or functions, such as the capability to perform a frequency spectrum sweep or analysis of signals on a communication link.

As noted above, one or more of the detected CPEs may include a modem, such as modem 110, which may be configured to receive downstream frequencies transmitted from a local office or other suitable location. The modem may be, for example, a coaxial cable modem (e.g., for coaxial cable lines 101), a fiber interface node (e.g., for fiber optic lines 101), twisted-pair telephone modem, cellular telephone transceiver, satellite transceiver, local wi-fi router or access point, or any other desired modem device. The modem may be connected to, or be a part of, another computing device, such as a gateway interface device (e.g., gateway 111). The modem or gateway interface device may include, or be operatively connected to, a spectrum analyzer (e.g., analyzer 118) that may be configured to detect and/or identify the frequency and amplitude of a downstream signal transmitted to a user premises as it varies by signal frequency. Step 2101 may include the CPE detection and identification steps described above with respect to step 510 of FIG. 5, step 810 of FIG. 8A, and/or step 861 of FIG. 8B.

At step 2102, the leakage detection system, which may be implemented on computing device 200, may determine a location of one or more CPEs detected during step 301. The system may retrieve from memory data identifying a location of a detected CPE. For example, the system may determine a location of a CPE by retrieving geospatial information (e.g., spatial coordinates) for one or more CPEs from memory or a database, such as database 210. The system may utilize a database (e.g., database 210) to correlate a CPE identifier (e.g., the CPE's MAC address or other unique identifier), to the CPE's respective geospatial location. Such detection and geospatial analysis of CPEs is further described below with respect to FIG. 4A. As an example, the system may utilize the MAC address of a CPE to retrieve location information from an embedded geographic information system ("eGIS"), which may provide location information for computing devices (e.g., CPEs) using geographically referenced data. As another example, the system may utilize the MAC address (or other unique identifier) of a CPE to retrieve location information from an address database operated by and/or associated with the network operator. In this example, the system may retrieve from memory information relating to the billing address of a user premise, and may associate the retrieved address as the location of a CPE. Other location information for a CPE may be retrieved by the leakage detection system without departing from the scope of the present disclosure, for example, the system may retrieve the latitudinal and longitudinal coordinates of the CPE. Step 2102 may include the CPE detection and identification steps described above with respect to step 510 of FIG. 5 and/or step 810 of FIG. 8.

At step 2103, the leakage detection system, which may be implemented on computing device 200, may request and/or receive data relating to one or more frequency broadcasters transmitting within a predetermined range of the location of each of the CPEs. For example, the system may request and/or receive data relating to a frequency broadcasters transmitting within 1 to 10 miles of the location of each identified CPE. The system may query a broadcaster database to retrieve information relating to one or more broadcasters transmitting frequencies in a particular location or geographic area. The system may request various types of information relating to the broadcaster (i.e., broadcaster information) from a variety of different databases. For example, the system may query a database associated with the Federal Communications Commission ("FCC") to obtain broadcaster information. As another example, the system may query a "White Space" database operated by and/or associated with one or more entities to obtain broadcaster information. The broadcaster information requested and/or retrieved by the system may include information such as licensing information, transmission frequencies, broadcast tower locations, transmission power levels for each broadcast tower, and the like. Such retrieval of broadcaster information is further described below with respect to FIG. 5.

At step 2104 the leakage detection system, which may be implemented on computing device 200, may identify and/or detect one or more transmitters based on data obtained during step 2103. In other embodiments, the system may utilize a spectrum analyzer (e.g., analyzer 118) to identify and/or detect the one or more transmitters. The system may utilize broadcaster information obtained during step 2103 to identify the various transmitters (e.g., transmission stations, transmission towers, etc.) that are transmitting signal frequencies in a particular area or geographic location. The leakage detection system may be configured to detect and/or identify any desired type of frequency transmission without departing from the scope of the present disclosure. For example, the leakage detection system may be configured to detect and/or identify frequency modulation ("FM") transmissions, wide-band FM transmissions, radio frequency ("RF") transmission, global system for mobile communication ("GSM") transmissions, long-term evolution ("LTE") transmissions, and cable television ("CATV") transmission.

In some embodiments, the system may identify each transmitter transmitting signals (or frequencies) within a predetermined area. The system may also be configured to identify each transmitter within a certain proximity to a CPE in the network. The system may identify the various transmitters based on their distance from the CPE as well as the transmission power level of the transmitter being identified. In other embodiments, the system may identify transmitters that are within a threshold distance to the CPE (e.g., within a 5-mile radius of a CPE). The system may associate each detected transmitter with a unique identifier so as to easily identify the different detected transmitters. The system may store in memory the transmitter identifier, and may also store in memory information relating to the identified transmitter (i.e., transmitter information), such as the transmission frequency for the transmitter, the transmission power level of the frequency being transmitted by the transmitter, and other information.

Other types of information associated with an identified transmitter may include the height of the transmitter, the location of the transmitter, and a distance between the transmitter and a particular CPE. The leakage detection system may correlate, in a database, collected transmitter information with the identifier for the corresponding transmitter. The system may also correlate an identified transmitter with corresponding broadcaster information obtained during step 2103. For example, the system may correlate a transmission frequency for a broadcaster with the identifier corresponding to the transmitter that generated that particular frequency. The detection of transmitters and retrieval of transmitter information is further described below with respect to FIG. 5.

At step 2105, the leakage detection system, which may be implemented on computing device 200, may obtain frequency spectrum data from one or more downstream CPEs. As noted above, CPEs (e.g., modems, gateways, and the like) may include or be operatively connected to a spectrum analyzer device, which detects and measures signal frequencies received at the analyzer. A CPE that includes a spectrum analyzer may be configured to detect and/or identify the amplitude (e.g., magnitude, strength, etc.) of a downstream signal received at the CPE as it varies by signal frequency within a defined range of frequencies (e.g., frequency spectrum data) during a predetermined sampling time period. The CPE may be operatively connected to a receiver, display device, or other computing device to allow visual detection and analysis of detected signal frequencies. In some embodiments, the system may generate a visual depiction of the frequency spectrum data obtained by a CPE, and the system may be configured to output the frequency spectrum data, or a visual depiction thereof, to a display device. Such collection and visual depiction of frequency spectrum data is further described below with respect to FIG. 25. Additionally, the CPE may be configured to transmit to the system frequency spectrum data generated by the spectrum analyzer for further processing and/or analysis by the system.

Each CPE detected during step 2101 may include a spectrum analyzer device, and may be configured to periodically obtain frequency spectrum data over a predetermined band of frequencies and over a predetermined sampling time period. A network administrator may determine and/or adjust the amount of time comprising the sampling time period for the plurality of CPEs on the network. In some embodiments, the CPE may generate and/or transmit frequency spectrum data upon receiving a request (or query) from the system. In some embodiments, the leakage detection system may query a plurality of CPEs for frequency spectrum data so as to determine spectral amplitudes of downstream signal frequencies being received at the CPEs. For example, the system may query a CPE (located at a user premises) for spectral amplitude data of a downstream signal received at the CPE. Spectral amplitude data may include the particular amplitude of various signal frequencies transmitted on a communication link. The system may also query a plurality of CPEs to obtain spectral amplitude data as perceived by each CPE at a plurality of different locations (e.g., user premises).

The leakage detection system may utilize the frequency spectrum data obtained by one or more CPEs to determine whether a CPE has detected and/or received signals at frequencies other than an intended communication frequency transmitted by a content provider or network operator over a communication link. To support this, the system may identify the predetermined time period noted above, and may also store transmitted frequency spectrum data, identifying the downstream signal characteristics of the downstream frequencies that were sent from the local office, and expected to be received by the CPE, during the sampling time of the CPE's frequency spectrum data. The system may retrieve from memory information indicating the particular signal frequency (or frequencies) being received at a particular user premises (and/or CPE), and compare this information to frequency spectrum data obtained by the CPE to determine whether unintended signal frequencies (e.g., signal noise, interference, and the like) are being coupled with the intended communication frequency and received at the CPE (e.g., user premises). Step 2105 may include the frequency spectrum data retrieval steps described above with respect to steps 510-540 of FIG. 5.

At step 2106, the leakage detection system, which may be implemented on computing device 200, may determine whether any signal ingress has been detected by a CPE. The system may utilize frequency spectrum data obtained from one or more CPEs during step 2105 to determine whether any unintended or extraneous signal frequencies have ingressed onto the downstream signal transmitted over the communication link. The leakage detection system may detect ingress of an over-the-air signal onto a communication link by processing frequency spectrum data obtained during step 2105 to determine whether signal frequencies other than the intended communication frequency have been detected by a CPE.

The content provider providing the downstream signal to multiple CPEs may be aware of or have access to data indicating the various characteristics and properties of the intended communication frequency signal being sent downstream to a user premises. Thus, if there is a break in the communication link, a CPE may detect signal frequencies (e.g., interference, noise, etc.) that are getting onto the link and being coupled with the intended communication frequency that is transmitted to a user premises. Additionally, the CPE may detect a gain in the amplitude of the downstream signal being received at the CPE due to the added (or coupled) signal (e.g., noise, interference, etc.). In some embodiments, the system may store in memory the identity (e.g., a unique identifier) of the one or more CPEs that detect excess signal on a communication link at their respective location (e.g., user premises).

As will be discussed further below, in some embodiments, if signal ingress has been detected by a CPE, the leakage detection system may determine the frequency of the unintended signal entering the communication link to identify the transmitter that is emitting that particular frequency, and may calculate expected amplitude of the signal emitted from the identified transmitter that should be received at the CPE. Such calculations may be based on a variety of factors, including the transmission power of the over-the-air signal and the distance of the CPE to the transmitter transmitting the over-the-air signal. The leakage detection system may then compare the expected amplitude of the over-the-air signal with the amplitude of the over-the-air signal that has ingressed onto the communication link and is detected (or received) at the CPE. In some embodiments, the system may store in memory a location (e.g., geographic location, street address, etc.) of the one or more CPEs that detect signal ingress. Detection of signal ingress and egress on a communication link by a CPE is further described below with respect to FIG. 24.

If the leakage detection system does not detect signal ingress at a downstream CPE, the method may proceed back to step 2105, where the system may obtain frequency spectrum data from one or more CPEs. In some embodiments, if the system does not detect signal ingress at a downstream CPE, the method may proceed back to step 301, where the system may detect additional downstream CPEs. If the system detects signal ingress at a downstream CPE, the method may proceed to step 2108.

Referring now to FIG. 21B, at step 2108, the leakage detection system may begin a loop that is performed for one or more identified transmitters. In some embodiments, the system may begin a loop that is performed for one, some, or all of the transmitters identified during step 2104. In still other embodiments, the system may begin a loop that is performed for a subset of the transmitters detected and/or identified at step 2104. For example, the leakage detection system may limit the loop to those transmitters that are within a defined proximity to any CPEs that detected signal ingress during step 2106. For instance, the system may identify one or more transmitters within a defined proximity from any CPEs that have detected signal ingress, and during step 2108, the system may begin a loop for those identified transmitters.

The system may identify these transmitters based on the distance of each transmitter to the CPEs that have detected signal ingress, and the transmission power of each transmitter. The system may identify transmitters within a variety of different distances from a particular CPE that has detected signal ingress and having a variety of different levels of transmission power without departing from the scope of the present disclosure. The system may process data indicating the transmission power for one or more transmitters, and may identify one or more transmitters that are emitting signals at transmission power levels necessary for the emitted signals to be received at various CPE that have detected signal ingress. As will be appreciated, transmitters having high transmission power levels may be located at a further distance from the CPEs than a transmitter having relatively lower transmission power levels. Thus, the transmitters identified by the system may be located at various distances from the CPEs that have detected signal ingress.

At step 2109 the leakage detection system may determine and/or identify a frequency radiation pattern for the transmitter being analyzed at step 2108. Each transmitter may have a particular frequency radiation pattern corresponding to the directional dependence of the strength of the over-the-air waves emitted from the transmitter. Signals emitted from the transmitter and received by a CPE may be affected in a manner that reflects the generated frequency radiation pattern. The system may utilize transmitter information obtained during step 2104 to determine the radiation pattern for the transmitter. Such determinations of radiation patterns for a transmitter are further described below with respect to FIGS. 27A-D.

At step 2110, the leakage detection system may begin a loop that is performed for each downstream CPE that has detected signal ingress on the communication link. The system may retrieve from memory the identity of the one or more CPEs that have detected signal ingress. In some embodiments, the system may begin a loop that is performed for one or more downstream CPEs identified during step 2106.

At step 2111, for each CPE analyzed in loop 2110, the leakage detection system, which may be implemented on computing device 200, may calculate an expected amplitude of a signal frequency that should be detected by the CPE (e.g., receive level) based on a signal being transmitted by a particular transmitter (i.e., the transmitter being analyzed at loop 2108). In other embodiments, the system may calculate expected amplitude of a signal frequency at the location of a particular user premises (e.g., the location of the CPE within the particular user premise). As will be described in more detail below, the system may calculate expected signal amplitude at a particular location (e.g., the location of the CPE) for a particular transmitter (and/or transmission frequency) based on several factors, including free space path loss, the distance of the CPE from the transmitter generating the signal frequency, and the transmission power of the transmitter.

Free-space path loss ("FSPL") generically describes an algorithm for determining the loss in signal strength of a signal that would result from a path through free space (e.g., air), with no obstacles to cause reflection, diffraction, or dampening. The formula for FSPL (in decibels) is:

$$FSPL = 20 \log_{10}(d) + 20 \log_{10}(f) - 147.55$$

where d is the distance from the transmitter (in meters); and where f is the signal frequency (in hertz).

The leakage detection system may utilize transmitter information in conjunction with the free-space path loss algorithm to calculate the expected amplitude of an over-the-air signal frequency at a particular location. For example, a transmitter located 10,000 meters from a first CPE and transmitting a FM frequency of 93.3 MHz at a transmission power level ("Tx") of 50 kW may generate an expected signal amplitude (e.g., receive level) at the first CPE. To determine the amplitude of the signal frequency being generated by a transmitter at a particular CPE, the system may convert the transmission power level of the transmitter to a standard metric (e.g., decibels, decibel-milliwatts, etc.).

$$\text{transmission power ("Tx")} = 50 \text{ kW} = 10 \log(50E+3) + 30 = 77 \text{ dBm}$$

The leakage detection system may utilize the FSPL algorithm to determine the loss in signal amplitude (e.g., magnitude, strength, etc.) that would result from a signal being transmitted a distance (d) from the transmitter to the CPE. As a result, the expected receive level ("Rx") or signal amplitude at the CPE may be determined by subtracting the FSPL from the transmission power level of the transmitter. Referring back to the above example, the expected receive level or signal amplitude generated by the transmitter at a location 10 km away is −15 dBm (or 32 dBmV).

$$FSPL = 20 \log_{10}(10,000) + 20 \log_{10}(93.3E+6) - 147.55 = 92 \text{ dB}$$

$$Rx = Tx - FSPL = 77 \text{ dBm} - 92 \text{ dB} = -15 \text{ dBm}$$

To convert dBm to dBmV (where resistance is 50 ohms)

$$Rx = -15 \text{ dBm} + \sim 47 \text{dBmV} = 32 \text{ dBmV}$$

For each CPE analyzed in loop 2110, the system may store in memory the expected receive level or amplitude of the over-the-air signal generated by the transmitter being analyzed at step 2108.

At step 2112, the leakage detection system, which may be implemented on computing device 200, may determine an expected signal boundary (e.g., periphery) for the CPE being analyzed at loop 2110. The expected signal boundary may encompass the geographic area around the source antenna at which the expected signal strength should be found. The boundary may vary depending on the antenna's transmission properties—some antennas provide circular radiation patterns, while other antennas may have different lobes and shapes. During step 2102, the system may determine a boundary defining an area where the over-the-air signal emitted from the transmitter being analyzed at step 2108 has signal amplitude that is equal to the expected amplitude calculated at step 2111. The system may generate a graphical depiction of the expected signal boundary associated with the CPE being analyzed at loop 2110 and the transmitter emitting the over-the-air signals detected by that CPE (e.g., the transmitter being analyzed at loop 2108). The system may generate the graphical depiction of the expected signal boundary on a layout representing the geographic location of the CPE and transmitter being analyzed.

In some embodiments, the expected signal boundary (e.g., periphery) determined by the system may correspond to a shape of the radiation pattern identified at step 2109. In other embodiments, the system may use a default circular radiation pattern for a transmitter, where the signals emitted from the transmitter are assumed to radiate in all directions at equal transmission strengths. In such embodiments, the center of the circular signal boundary corresponds to the location of the transmitter begin analyzed at loop 2108, and the radius of the boundary corresponds to the distance between the transmitter and the CPE being analyzed at loop 2110. Such determinations of expected signal boundaries for a CPE and corresponding transmitter are further described below with respect to FIGS. 27A-D.

At step 2113, the leakage detection system, which may be implemented on computing device 200, may compare the signal amplitude of an over-the-air signal that was detected on a communication link by a CPE with the expected signal amplitude (or receive level) that was calculated during step 2111. In other embodiments, for each CPE analyzed in loop 2110, the system may compare the signal amplitude of an over-the-air signal emitted from transmitter being analyzed at loop 2108 that was detected on a communication link by the CPE with the expected signal amplitude (or receive level) that was calculated during step 2111 for that CPE. In other embodiments the system may determine a delta (e.g., a difference) between the measured amplitude and expected amplitude for frequency signals emitted from the transmitter being analyzed at loop 2108. In some embodiments, the system may utilize a correction factor For each CPE analyzed in loop 2110, the leakage detection system may store in memory data relating to the difference in measured and expected signal amplitudes for the transmitter being analyzed during loop 2108. As noted above, the system may retrieve from memory frequency spectrum data, including the signal amplitude (or receive level) for a defined range of frequencies that may be detected or received at the CPE. The system may also query a CPE for the signal amplitude of a particular frequency being received (or detected) at the CPE being analyzed at loop 2110. Step 2113 may include the data retrieval and/or comparison steps described above with respect to steps 820 and 840 of FIG. 8A.

After comparing the measured and expected amplitudes, at step 2115 the leakage detection system may determine whether the expected amplitude calculated at step 2111 is greater than the amplitude of the signal frequency that entered onto the communication link as detected (or measured) by the CPE being analyzed at loop 2110. The system may retrieve from memory data indicating the amplitude of the signal emitted from the transmitter being analyzed during loop 2108 that was detected on a communication link by the by the CPE being analyzed at loop 2110. Alternatively, the system may query the CPE being analyzed at loop 2110 for data indicating the amplitude of the signal emitted from the transmitter being analyzed during loop 2108. The determination of whether the signal is greater or less than the expected strength may indicate whether the leak is located inside, or outside, of the expected signal boundary.

If the system determines the expected amplitude calculated at step 2111 is greater than the measured amplitude detected by the CPE, then the system may determine that the leak is outside of the boundary area, and the method may proceed to step 2117, where the system may identify the estimated location of the signal ingress (or egress). In instances where the expected amplitude calculated at step 2111 is greater than the measured amplitude detected by the CPE on the communication link, the location of the signal ingress (i.e., the location of the break in the communication link) may be determined to be a further distance from the transmitter emitting the over-the-air signal than the CPE that detected the over-the-air signal on the communication link. Thus, the location of the signal ingress is located in an area outside of the signal boundary determined during step 2112. The system may store in memory data indicating that the location of the signal ingress (or egress) is located in a geographical area outside of the signal boundary. In some embodiment, the system may perform step 2116 when the expected amplitude calculated at step 2111 is greater than the measured amplitude detected by the CPE. After identifying the appropriate area outside of the signal boundary corresponding the general location of the signal ingress (or egress), the method may return back to step 2110 to continue the loop until all of the CPEs that have detected signal ingress on the communication link have been analyzed for the transmitter being analyzed at loop 2108. The determination of a signal ingress (or egress) location with respect to an expected signal boundary is further described below with respect to FIGS. 27A-B.

If the system determines the expected amplitude calculated at step 2111 is less than or equal to the measured amplitude detected by the CPE, then the system may conclude that the leak is within the boundary, and the method may proceed to step 2117, where the system may identify an estimated location of the signal ingress (or egress). In instances where the expected amplitude calculated at step 2111 is less than or equal to the measured amplitude detected by the CPE on the communication link, the location of the signal ingress (i.e., the location of the break in the communication link) may be a shorter distance from the transmitter emitting the over-the-air signal than the CPE that detected the over-the-air signal on the communication link. Thus, the location of the signal ingress is located in an area inside of the signal boundary determined during step 2112. The system may store in memory data indicating that the location of the signal ingress (or egress) is located in a geographical area inside of the signal boundary. After identifying the area inside of the signal boundary corresponding to the general location of the signal ingress (or egress), the method may return back to step 2110 to continue the loop until all of the CPEs that have detected signal ingress on the communication link have been analyzed for the transmitter being analyzed at loop 2108. The determination of a signal ingress (or egress) location with respect to an expected signal boundary is further described below with respect to FIGS. 28A-B.

When all of the CPEs have been analyzed, the method may proceed back to step 2108, where the system may continue the loop for the next transmitter. The method may perform loop 2110 and steps 2111 through 2117 with respect to the next transmitter until all of the identified transmitters have been analyzed. When all of the transmitters have been analyzed, the method may proceed to step 2118, where the system may determine the location of the signal ingress (or egress).

At step 2118, the leakage detection system may determine the location of the signal ingress (or egress) by utilizing frequency spectrum data and data obtained during steps 2111-2117 to determine the location of the signal ingress (or egress). There are a variety of ways in which the system may utilize such data to determine the location of the signal ingress (or egress). For example, in some embodiments, the system may utilize data (e.g., frequency spectrum data and data obtained during steps 2111-2117) from one CPE analyzed during loop 2110 and a plurality of transmitters analyzed during step 2108 (or detected by the CPE on the communication link). To determine the location of the signal ingress (egress) the system may identify, for the one CPE, an area defined by expected signal boundaries for each of the plurality of transmitters analyzed during step 2108 (or detected by the CPE on the communication link). The determination of the signal ingress location by identifying, for one CPE, the area defined by expected signal boundaries associated with a plurality of transmitters is further described below with respect to FIGS. 33A-B.

As another example, in some embodiments, the system may utilize data (e.g., frequency spectrum data and data obtained during steps 2111-2117) associated with multiple CPEs analyzed during loop 2110 and one transmitter of the multiple transmitters analyzed during step 2108 (or detected by the multiple CPEs on the communication link). To determine the location of the signal ingress (egress) the system may identify, for each of the multiple CPEs, an area defined by expected signal boundaries associated with one transmitter of the multiple transmitters analyzed during step 2108 (or detected by the multiple CPEs on the communication link). The determination of the signal ingress location by identifying, for multiple CPEs, the area defined by expected signal boundaries associated with a transmitter is further described below with respect to FIG. 34.

As still another example, in many embodiments, the system may utilize data (e.g., frequency spectrum data and data obtained during steps 2111-2117) associated with multiple CPEs analyzed during loop 2110 and multiple transmitters analyzed during step 2108. To determine the location of the signal ingress (egress) the system may identify, for each of the multiple CPEs, an area defined by expected signal boundaries associated with each of the multiple transmitters analyzed during step 2108. The determination of the signal ingress location by identifying, for each of the multiple CPEs, an area defined by expected signal boundaries associated with multiple transmitters is further described below with respect to FIGS. 28-32.

Under the principle of reciprocity, the receive and transmit properties of an antenna are identical at a certain frequency and amplitude (or gain). By determining the frequency and amplitude of an over-the-air signal that has entered a communication link via a break, in view of the principle of reciprocity, the amplitude and frequency of signal egress (i.e., signal leakage) from the communication link via the break may be determined. Based on the calculated amount of signal leaking from the communication link, the system identify or initiate one or more corrective measures for repairing the communication link.

At step 2119, the leakage detection system may determine an amount of signal ingress (or egress) on the communication link. The system may approximate the amplitude of signal ingress, and conversely the amount of signal egress, on a communication link by determining the delta between measured and expected signal amplitudes at a CPE for one or more transmission frequencies.

Additionally, as further discussed below, the system may also take into account the attenuation properties of the communication link when determining an amount of signal ingress (or egress) on the communication link. As will be appreciated communication links may be comprised of various mediums (or materials), each having their own specified transmission and/or attenuation properties. In some embodiments, the system may retrieve from memory data indicating the relationship between distance/frequency and attenuation for each type of wired communication link, and determine an amount of loss attributable to attenuation for a signal on that wired communication link. As an example, the level of attenuation attributed to a signal on a particular communication link may be as indicated in Table 1 below:

TABLE 1

| Frequency | Attenuation (db/100 m) | Attenuation (db/100 ft) |
|---|---|---|
| 5 MHz | 0.36 | 0.11 |
| 55 MHz | 1.21 | 0.37 |
| 83 MHz | 1.51 | 0.46 |
| 211 MHz | 2.43 | 0.74 |
| 250 MHz | 2.60 | 0.81 |
| 350 MHz | 3.18 | 0.97 |
| 400 MHz | 3.45 | 1.05 |
| 500 MHz | 3.87 | 1.18 |
| 600 MHz | 4.30 | 1.31 |
| 750 MHz | 4.86 | 1.48 |
| 1000 MHz | 5.71 | 1.74 |

In some embodiments, the system may utilize data indicating the estimated location of signal ingress on the communication link to determine a distance along the communication link from the point of signal ingress to a particular location in the network (e.g., a CPE, spectrum analyzer, etc.). The system may use such distance information, in conjunction with the attenuation properties of the communication link, to determine an amount of signal loss attributed to attenuation.

In other embodiments, the system may also determine an amount of signal loss attributed to an over-the-air signal entering into a wired communication link at a break (i.e., transfer loss). As noted above, communication links may be comprised of various types of mediums each having specified transmission and/or attenuation properties, and such properties may affect the amplitude of an external over-the-air signal that enters into and is subsequently prorogated through a communication link. Similar to the attenuation loss data for a signal propagated a predetermined distance over a communication link as represented in Table 1, the system may retrieve from memory transfer loss data indicating the relationship between frequency and signal loss for signals ingressing into (or egressing from) various types of mediums (e.g., communication links). In still other embodiments, the attenuation loss data retrieved by the system may also incorporate (e.g., factor in) transfer loss information for the communication link.

Referring to the example discussed above, assuming transfer loss of 20 dB for the over-the-air FM signal ingressing into the wired communication link and no attenuation loss for the FM signal propagating through the communication link from the break to a CPE in the network, the approximate signal strength of the over-the-air FM signal at the CPE would be 12 dBmV.

Expected Rx (@ ingress point)−Signal Loss=Approx. Rx (@ CPE)

Approx. Rx (@ CPE)=32 dBmV−20 dBmV=12 dBmV

In this example, the over-the-air FM signal at the location of signal ingress (e.g., the break in the communication link) experiences a transfer loss of 20 dB when entering the communication link, but does not experience signal loss when propagating through the link to the CPE.

As noted above, under the principle of reciprocity, the frequency and amplitude of an over-the-air signal that has entered a communication link is identical to the amplitude and frequency of signal egress. Accordingly, intended communication signal frequencies (e.g., Cable TV QAM channels) on the communication link may egress or leak at an identical amplitude, frequency, and radiation pattern as the ingress noise. Thus, under the above example, CATV QAMs (e.g., intended communication frequency) would experience no loss when propagating through the communication link; however the CATV QAMs may experience a loss of 20 dB when egressing from the communication link. As such, assuming that the CATV QAM channels are transmitted from a local office (or other location in the network) at 12 dBmV, the CATV QAMs would egress from the communication link at −8 dBmV.

Approx. CATV QAM egress=CATV QAM Tx−Signal Loss

Approx. CATV QAM egress=12 dBmV−20 dBmV=−8 dBmV

Additionally, or alternatively, the leakage detection system may determine, at a particular location, an expected strength of the intended communication frequency (e.g., CATV QAM) that has egressed from the communication link utilizing the FSPL formula and the distance between the particular location & the egress point (e.g., the break in the communication path). During step 2119, when calculating FSPL, the leakage detection system may identify distance (d) as the distance between the location of the signal ingress or egress (as determined during step 2118) and a signal leakage detector. Referring to the example above, if the distance between the signal egress location and the signal leakage detector is 3m, the FSPL of the intended communication frequency from the signal egress location to the detector would be 21 dB, and the approximate amount of signal egress measured at the detector would be −29 dBmV (or 69.5 uV/m).

$$d = \text{distance between signal egress and } CPE = 3m$$

$$FSPL = 20\log_{10}(3) + 20\log_{10}(93.3E + 6) - 147.55 = 21 \text{ dBmV}$$

$$CATV \text{ QAM } Rx(@ \text{ detector}) = CATV \text{ QAMs egress} - FSPL$$
$$= -8 \text{ dBmv} - 21 \text{ dBmV} = -29 \text{ dBmV}$$

As the distance (d) between the signal egress location (as determined during step 2118) and a leakage detector varies, the calculated FSPL and the approximate strength of the intended frequency signal (e.g., CATV QAMs) measured by the detector may also vary. The system may utilize such calculations to assist network personnel in manually confirming the presence and/or location of a break in the wired communication link using a signal leakage detector, spectrum analyzer, or other devices capable of measuring signal frequencies and amplitude. In some embodiments, the system may determine an amount of signal egress for each of the various frequencies detected over the communication link. The system may store in memory the calculated amount of signal egress detected at a break in the communication link or at other locations in the network.

At step 2120 the leakage detection system may confirm the location of the signal leakage. In some embodiments, the leakage detection system may confirm the location of the signal leakage based on frequency spectrum data and data obtained during steps 2111-2117. To confirm the signal ingress or egress location, the system may utilize one of the alternative location determination embodiments discussed with respect to step 2118. For example, if the system determined the signal location ingress (or egress) location during step 2118 by identifying, for one CPE, expected signal boundaries associated with multiple transmitters, the system may confirm the location of the signal ingress (or egress) by identifying, for multiple CPEs, expected signal boundaries associated with multiple transmitters. Additionally or alternatively, the system may confirm the location of the signal ingress (or egress) by identifying, for multiple CPEs, expected signal boundaries associated with one transmitter.

In other embodiments, the leakage detection system may confirm the location of the signal leakage based on the location of communication links in a geographic area within the vicinity of the signal ingress (or egress) location determined during step 2118. In these embodiments, the system may compare data indicating the location of the signal ingress (or egress) to data indicating the location of communication links within the network. Confirmation of the signal ingress or egress location based on the location of communication links in the network is further described below with respect to FIG. 32. The process of FIGS. 21A and 21B are only an example, and steps may be omitted or other steps added.

Figure 22A:
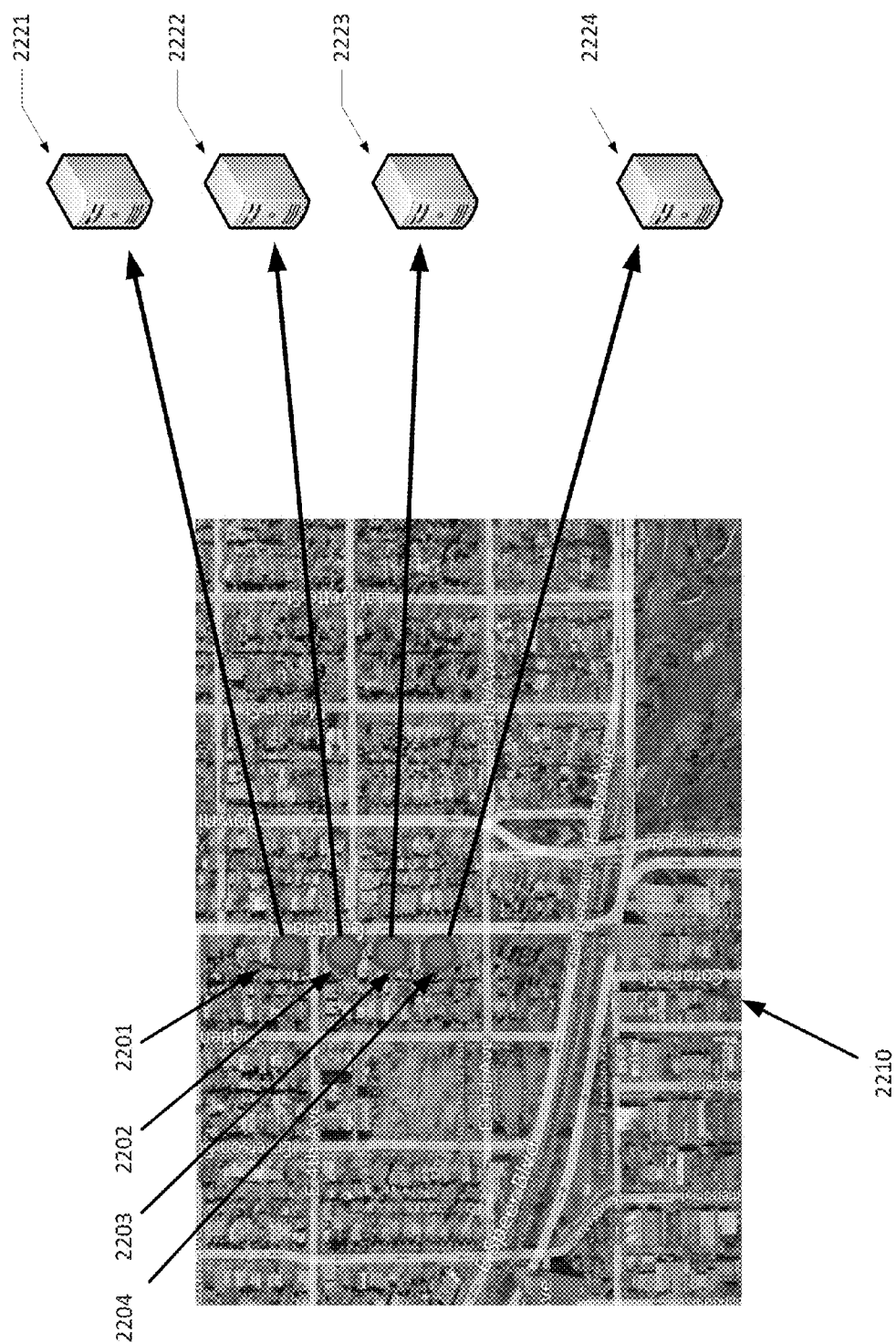
FIG. 22A illustrates an example layout of user premises and downstream devices according to one or more illustrative aspects of the disclosure.

FIG. 22A illustrates an example geographical layout of user premises and corresponding downstream devices according to one or more illustrative aspects of the disclosure. Map 2210 depicts multiple user premises (i.e., user premises 2201-2204) along a street (i.e., "Corona Street") in a geographic area. Each user premises may include one or more consumer premises equipment ("CPE"). The CPE need not be located at a user premises, and may be located at any suitable location in the network. As illustrated in FIG. 22A, user premises 2201 includes CPE 2221. A CPE (e.g., CPE 2221) may comprise a computing device such as a modem (e.g., modem 110), or a gateway (e.g., gateway 111), or any other suitable computing device. CPE 2221 may include or be operatively connected to a spectrum analyzer (e.g., spectrum analyzer 118). As illustrated in FIG. 22A, each user premises (e.g., user premises 2201-2204), includes at least one CPE (e.g., CPEs 2221-2224).

As noted with respect to FIG. 21, the system may detect downstream CPEs within a particular geographical area, such as a particular street address, neighborhood, or other area. As illustrated in FIG. 22A, the system has detected CPEs 2221-2224 which are all located on the same street. After the one or more CPEs have been detected, the system may determine the location of the detected CPEs. The system may retrieve from memory data relating to a location of a detected CPE, and may determine a location of a CPE by resolving spatial information (e.g., spatial coordinates, billing address, eGIS, etc.) for the CPE based on the retrieved data. Additionally, the system may correlate, in a database, a unique identifier associated with a detected CPE, such as a MAC address, and the CPE's respective spatial information and/or geographic location.

Figure 22B:
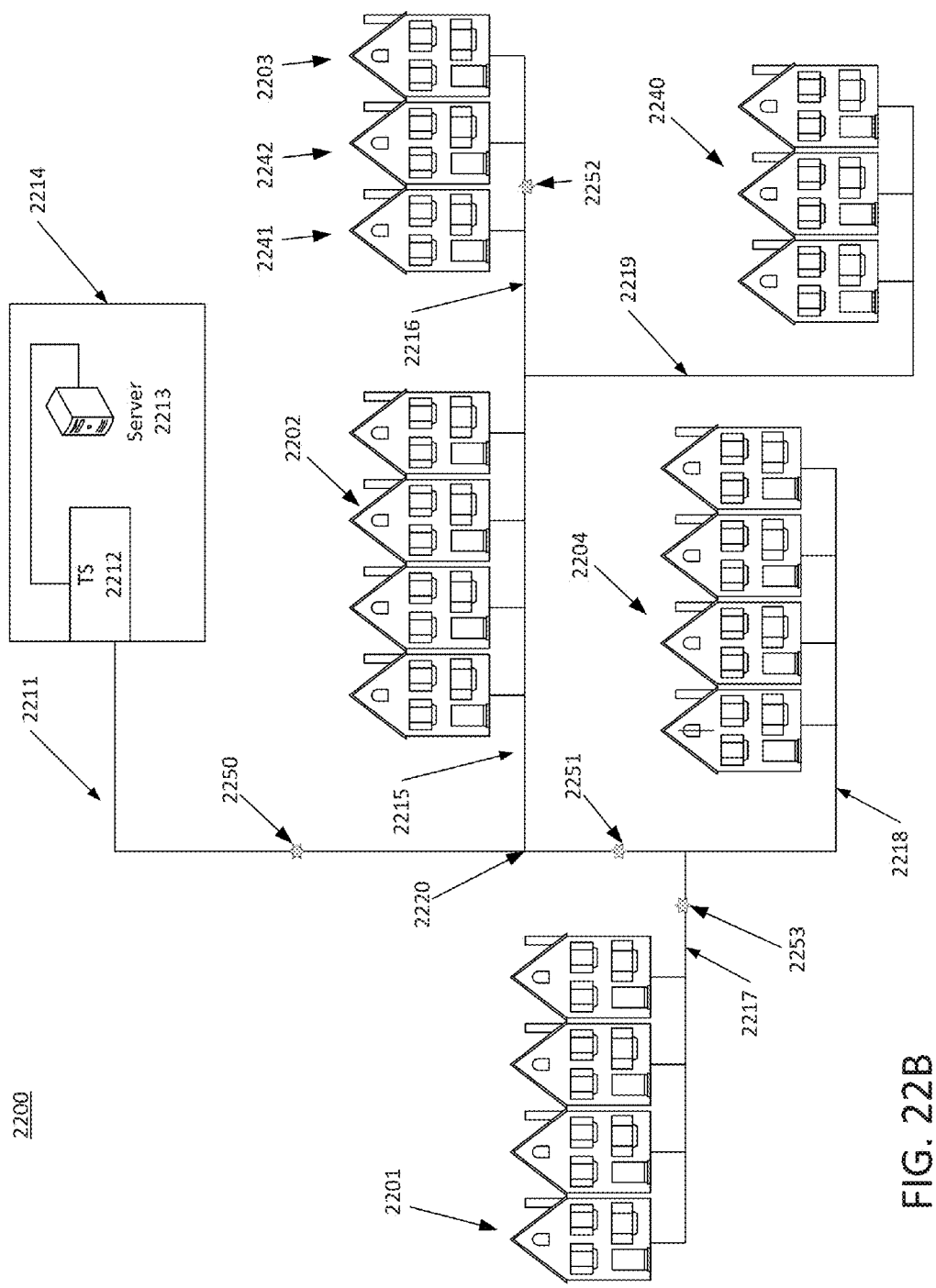
FIG. 22B illustrates an example communication network on which various features described herein may be used.

FIG. 22B illustrates an example communication network on which various features described herein may be used. While not depicted in FIG. 22B, network 2200 may include similar devices having similar operational functionality as network 100. For example, network 2200 may include a network interface which can permit the local office 2214 to communicate with various other external networks. The coaxial cable network depicted in FIG. 22B may use a series of interconnected coaxial cables (e.g., communication links 2211) to connect multiple premises (e.g., user premises 2240, 2201, 2202, etc.) to a local office, (e.g., local office 2214).

The coaxial cable network depicted in FIG. 22B is only an example of the various types of networks on which many of the various features for detecting signal ingress and egress as described herein may be implemented. Local office 2214 may transmit downstream information signals onto communications links, and each user premises may have one or more CPEs for receiving and possessing those signals. Local office 2214 may include an interface, which may be a CMTS, configured to manage communication between devices on the network, such as CPEs, and backend devices, such as server 2213.

As illustrated in FIG. 22B, there may be one communication link 2211 originating from the local office 2214, and link 2211 may be split a number of times into multiple links (e.g., links 2215-2219) to distribute the signal to various premises (e.g., premises 2201-2204, 2240, etc.) in the vicinity (which may be many miles) of the local office 2214. User premises may be identified or grouped based on a variety of factors. For example, user premises may be identified or categorized based on their respective geographic location. Referring to FIG. 22B, user premises 2240 may be located in a first geographic location (e.g., zip code, street, neighborhood), while user premises 2202 is located in a different geographic location. As another example, user premises may be identified or categorized based on their respective network service group. Referring to FIG. 22B, user premises 2201 may be associated with a first service group, while user premises 2203 may be associated with a second (different) service group. User premises may be associated with different service groups based on a variety of factors, such as geographic location and/or whether the user premises share a common communication link (or trunk) such that the system does not process signal leaks from too many disparate locations.

As depicted in FIG. 22B, user premises 2202 and 2203 may be connected to different communications links (e g, links 2215 and 2216) that originate from (or are connected to) link 2211. The signal transmitted from the local office may be transmitted to multiple user premises within the same or similar service group. In some embodiments, user premises sharing the same downstream communication path may be associated with the same service group. For example, referring to FIG. 22B, user premises 2203, 2241, and 2242 may each be associated with the same downstream service group. As another example, user premises 2202, 2203, and 2240 may be associated with the same downstream service group. The communication links in network 2200 may include components not illustrated, such as splitters, filters, amplifiers, etc. to help convey the signal clearly, but in general each split (e.g., split 2220) may introduce a bit of signal degradation. In other embodiments, splits in the communication link may indicate new service groups within the network. For example, split 2220 may be used to identify a first downstream service group including user premises 2201 and 2202, and a second service group including user premises 2202, 2203, and 2240.

As depicted in FIG. 22B, portions of a communication link within a network (e.g., network 2200) may become worn down and a physical sheath or covering surrounding the link may lead to signal ingress or egress at the location of one or more breaks in the link. Referring to FIG. 22B, over-the-air frequencies may ingress onto communication link 2211 at a break (e.g., breaks 2250-453), and may be detected by one or more user premises in the network that share the communication link. For example, user premises located downstream from break 2250 (e.g., user premises 2201-2204 and 2240-442) may detect over-the-air signals that ingress onto the communications link via break 2250. As another example, user premises operatively connected to communication link 2217 may detect over-the-air signals that ingress onto link 2217 via break 2253. As yet another example, user premises operatively connected to communication link 2216 (e.g., user premises 442) may detect over-the-air signals that ingress onto link 2216 via break 2252.

Figure 23:
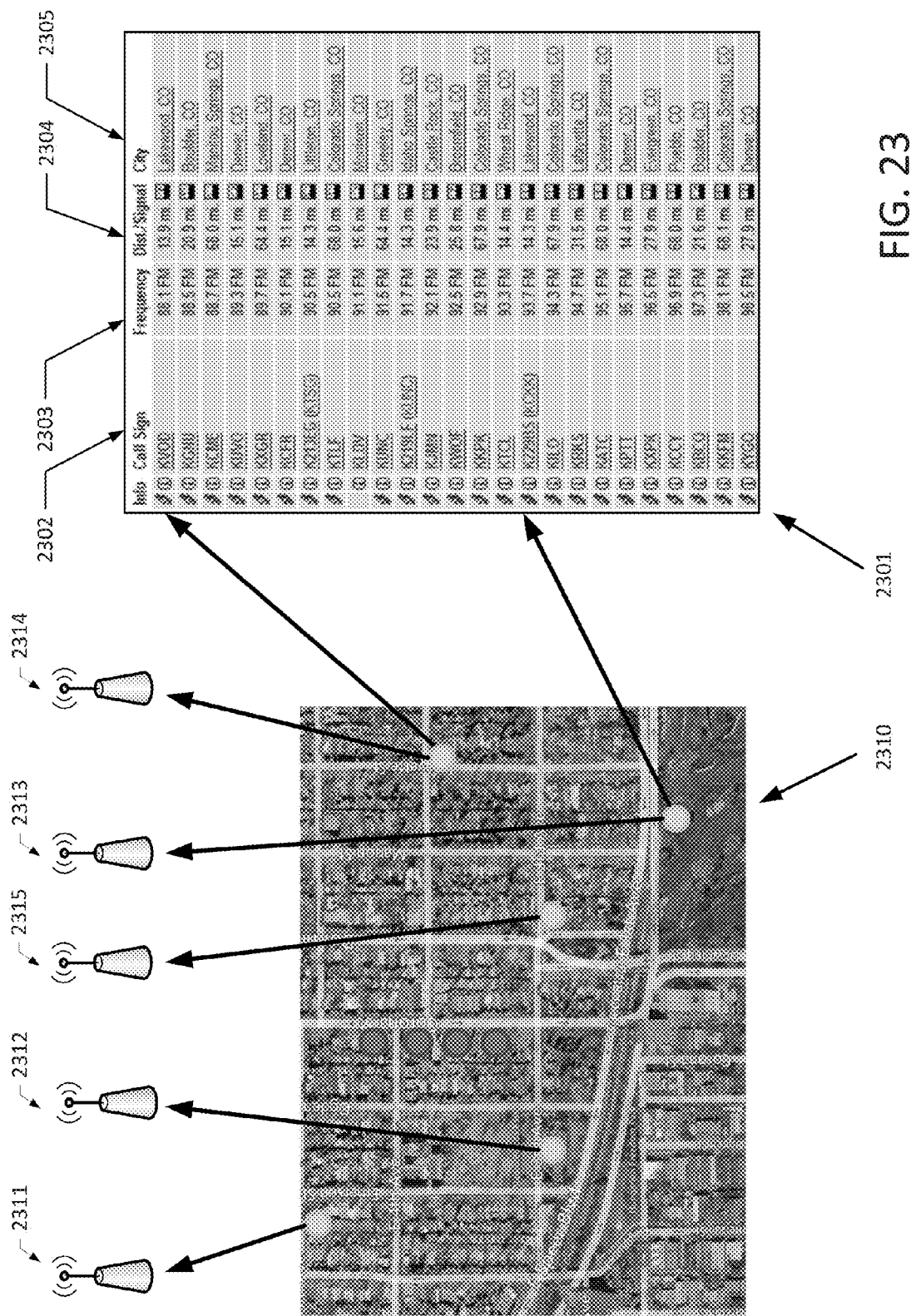
FIG. 23 illustrates an example layout of user premises and signal transmission devices according to one or more illustrative aspects of the disclosure.

FIG. 23 illustrates an example geographical layout of user premises, signal transmission devices, and broadcaster information according to one or more illustrative aspects of the disclosure. Map 2310 depicts multiple user premises (e.g., user premises 2201-2204) along a street in a particular geographic area (e.g., Lakewood, Colo.). The system may access layouts (e.g., maps) of various geographical areas for which a network provides services or coverage. A geographic map, such as map 2310, is merely an example of one such layout that may be accessed by the system. As discussed further below with respect to FIGS. 33A-B, the system may also utilize and/or access layouts indicating the location of communication links within a geographic area that are associated with or operatively connected to the network.

As noted above with respect to FIG. 21, the system may retrieve information relating to one or more signal broadcasters by querying or communicating with a database, such as a FCC database or White Space database. Broadcaster information retrieved by the system, from a database, may be transmitted to one or more computing devices. In some embodiments, the system may output for display on a display device the retrieved broadcaster information. The broadcaster information may be presented in various formats. For example, the broadcaster information may be presented in a spreadsheet, report, chart, or other formants. For example, chart 2301 in FIG. 23 depicts an exemplary chart of broadcaster information that may generate by the system. For example, as depicted by element 2302 in chart 2301, the system may retrieve information indicating a name or call sign for one or more broadcasters (or broadcast stations). Additionally, as depicted by element 2303 in chart 2301, the system may retrieve information indicating the transmission frequency used by a broadcaster to transmit signals. While element chart 2301 depicts multiple broadcasters transmitting signals in FM frequencies, the system may also retrieve broadcaster information for broadcasters that transmit signals in other frequency ranges, such as RF, GSM, LTE, CATV, and other frequencies ranges across the full frequency spectrum.

As depicted by element 2304 in chart 2301, the system may also retrieve information relating to the coverage area of the signals transmitted by the broadcaster. Coverage area information retrieved by the system may be broken into multiple segments indicating the portions of a coverage area where the signal has good, moderate, and poor reception. For example, the coverage area information retrieved by the system may indicate that a first portion of the coverage area (e.g., a 10 mile radius around the broadcaster station) may provide moderately good or very good reception of the transmitted signal. A second portion of the coverage area (e.g., the area between a 10 mile radius and a 20 mile radius around the broadcaster station) may provide moderate reception of the transmitted signal. Lastly, a third portion of the coverage area (e.g., the area between a 20 mile radius and a 30 mile radius around the broadcaster station) may provide a weak signal that provides poor reception. Such coverage information may be obtained by the system, from a database, and utilized in accordance with one or more aspects of the present disclosure.

As depicted by element 2305 of chart 2301, the system may retrieve information indicating a location of the broadcaster. The system may also retrieve a location of one or more transmitters utilized by the broadcaster to transmit signals. Additionally or alternatively, the system may utilize broadcaster information retrieved from the database to identify and/or detect one or more transmission devices (e.g., transmitters) associated with a broadcaster. Map 2310 depicts five transmission devices (e.g., transmitters 2311-2315) detected by the system based on broadcaster information retrieved from a database. Transmitters 2311-2315 are each located in different areas of map 2310. The system may also retrieve, from the database, transmitter information for one or more transmitters associated with a particular broadcaster. For example, while not depicted in chart 2301, the system may retrieve, from a database, information relating to one or more transmitters utilized by a broadcaster to transmit signals, such as the transmission power or effective radiated power ("ERP") of a transmitter associated with a broadcaster (or broadcast station), and the antenna height above average terrain ("HAAT") for a transmitter associated with a broadcaster (or broadcast station). The system may further retrieve other transmitter information from a database without departing from the scope of the present disclosure.

Referring back to FIG. 23, transmitters 2311-2315 each correspond to and/or are associated with a broadcaster identified by the system. For example, transmitter 2314 is associated with (or corresponds to) the broadcaster having a call sign of KVOD. Transmitter 2314 transmits signals at a FM frequency of 88.1 MHz, and is located in Lakewood, Colo. As another example, transmitter 2313 is associated with (or corresponds to) the broadcaster having a call sign of K229BS. Transmitter 2313 transmits signals at a FM frequency of 93.7 MHz, and is located in Lakewood, Colo.

Figure 24:
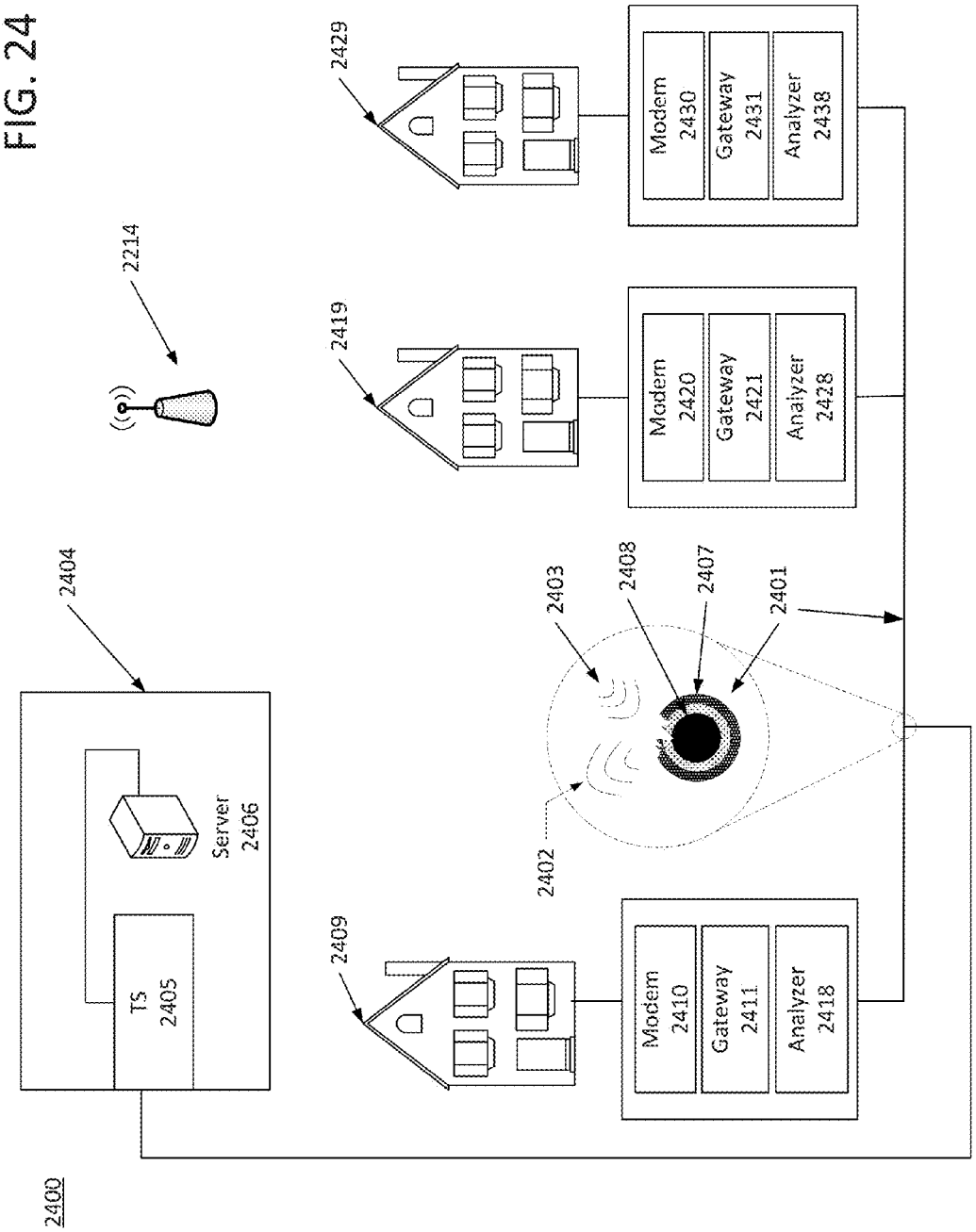
FIG. 24 illustrates an example layout of a communication network for detecting signal characteristics at multiple user premises according to one or more illustrative aspects of the disclosure.

FIG. 24 illustrates an example communication network 2400 on which many of the various features for detecting signal ingress and egress as described herein may be implemented. While not depicted in FIG. 24, network 2400 may include similar devices having similar operational functionality as network 100. For example, network 2400 may include a network interface which can permit the local office 2404 to communicate with various other external networks. The coaxial cable network depicted in FIG. 24 may use a series of interconnected coaxial cables (e.g., links 2401) to connect multiple premises (e.g., user premises 2409, 2419, and 2429) to a local office, (e.g., local office 2404).

The coaxial cable network depicted in FIG. 24 is only an example of the various types of networks on which many of the various features for detecting signal ingress and egress as described herein may be implemented. Network 2400 may be any type of information distribution network, such as a hybrid fiber/coax distribution network and the like. Local office 2404 may transmit downstream information signals onto links 2401, and each user premises may have one or more CPEs for receiving and possessing those signals. Local office 2404 may include an interface 108, which may be a CMTS, configured to manage communication between devices on the network, such as CPEs, and backend devices, such as server 2406.

Each user premises may be equipped with one or more CPEs. For example, as depicted in FIG. 24, premises 2409 may be equipped with one or more CPEs that communicate on one or more links 2401 with other devices in the network. User premises 2409 includes a modem 2410, a gateway 2411, and a spectrum analyzer 2418, which may incorporate the same features and operational functionality as modem 110, gateway 111, and spectrum analyzer 118 discussed above with respect to FIG. 1. Additionally, spectrum analyzer 2418 may be included (or integrated) in or operatively connected to another CPE, such as modem 2410 or gateway 2418.

Signal frequencies other than an intended communication frequency may ingress onto link 2401 for a variety of reasons. As depicted in FIG. 24, coaxial cable 2401 may include an outer sheath 2407 that encloses and/or surrounds a center conductor 2408 which carries signals transmitted from local office 2404 to multiple premises. In instances where inner conductor 2407 becomes exposed, signal 2403 transmitted by transmitter 2314 (e.g., a signal frequency other than the intended communication frequency transmitted by local office 2404) may ingress onto communication link 2401. Conversely, signal 2402 may leak from the communication leak.

A spectrum analyzer, such as spectrum analyzers 2418, 2428, or 2438, may detect and/or identify (or measure) signal frequencies transmitted over communication link 2401 that are received at a user premises. For example, spectrum analyzer 2418 may detect and/or measure the amplitude of the downstream signal transmitted over link 2401 as it varies by signal frequency within a defined range of frequencies. Spectrum analyzer 2418 may transmit frequency spectrum data to one or more other computing devices for further processing and analysis. Spectrum analyzer 2418 may be operatively connected to a device, such as a receiver, display device, or other computing device, which allows visual detection and analysis of signal frequencies detected on link 2401. In some embodiments, a visual depiction of the frequency spectrum data obtained by spectrum analyzer 2418 may be generated by one or more computing devices.

Figure 25:
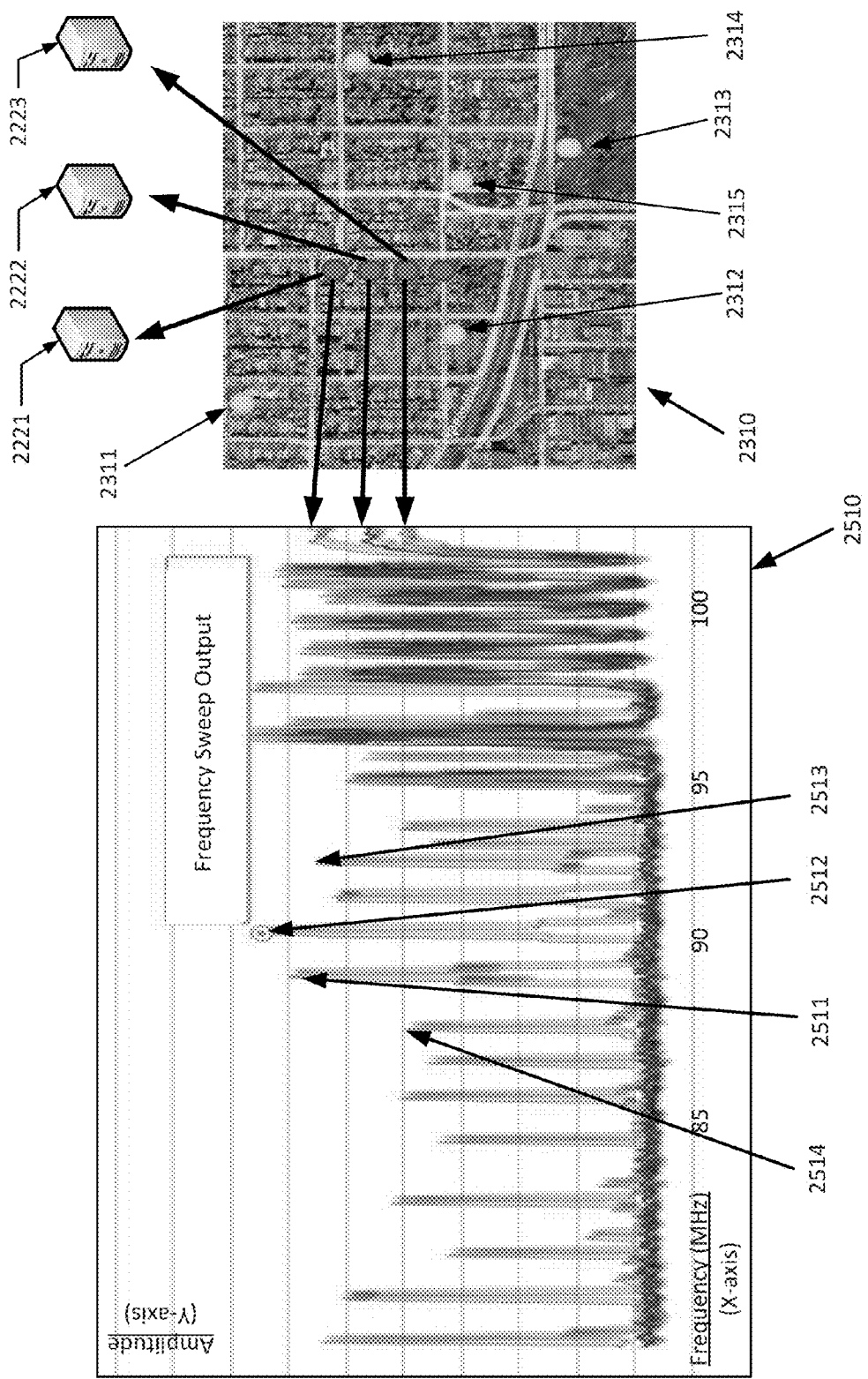
FIG. 25 illustrates an example depiction of frequency spectrum data obtained by a computing device according to one or more illustrative aspects of the disclosure.

FIG. 25 illustrates an example visual depiction of frequency spectrum data obtained by one or more computing devices over a predetermined sampling time period according to one or more illustrative aspects of the disclosure. As discussed above with respect to FIG. 23, map 2310 depicts multiple user premises (e.g., user premises 2201-2204) and multiple transmitters (e.g., transmitters 2311-2315) positioned in different locations within a particular geographic area. Multiple user premises in map 2310 each include at least one CPE (e.g., CPEs 2221-2223). Each CPE may be equipped with a spectrum analyzer, which may be configured to detect and/or identify the amplitude of a downstream signal as it varies by signal frequency over a predetermined sampling time period. For example, CPE 2221 may detect and/or identify the amplitude of a downstream signal transmitted over a communication link to user premises 2201 during the predetermined sampling time period. The frequency spectrum data collected by CPE 2221 may be transmitted to one or more computing devices, and further, may be utilized to generate a visual depiction of the frequency spectrum data (or output) measured by the CPE. The frequency spectrum data may be displayed on a display device, as illustrated by display 2510. In particular, display 2510 depicts frequency spectrum data obtained by CPEs 2221-2223 during a predetermined sampling time period, and provides a plot or trace of signal amplitude versus frequency. As will be discussed in more detail below, each trace in the spectrum analysis may correspond to a frequency sweep obtained, via a spectrum analyzer or other suitable CPE having frequency sweep functionality at a particular user premises.

As discussed above with respect to FIGS. 21 and 24, due to breaks or breaches in a communication link, frequencies other than an intended frequency transmitted from a local office may ingress onto the communication link, and a CPE located at a user premises may detect this signal ingress. The sweep frequency data obtained by each CPE (e.g., CPEs 2221-2223) may be depicted in display 2510. As illustrated in FIG. 25, the sweep frequency output generated by a CPE and displayed on display 2510 indicates the strength or amplitude of a particular frequency detected by that CPE. The system may utilize the frequency spectrum data obtained from a CPE to determine whether signal frequencies other than the intended communication frequency transmitted from a local office are being received at a user premises. For example, as illustrated in display 2510, CPE 2221 detects signal frequencies on the communication link that are higher than 95 MHz. In this example, the signal frequencies that are less than 95 MHz constitute the intended communication frequency transmitted from the local office to multiple user premises.

However, as further illustrated by display 2510 in FIG. 25, CPE 2221 also detects signal frequencies that are lower than the intended communication frequency transmitted from the local office (e.g., lower than 95 MHz). Thus, CPE 2221 is detecting signal frequencies originating from external sources that have ingressed onto the communication link. In particular, CPE 2221 is detecting signal frequencies originating from (e.g., transmitted from) transmitters 2311-2315. Element 2513 of display 2510 shows that CPE 2221 is detecting a signal frequency of approximately 93 MHz on the communication link at user premises 2201. As discussed above with reference to FIG. 23, transmitter 2313 associated with the K229BS broadcast station is transmitting signal frequencies at 93.7 MHz. Thus, by processing the frequency spectrum data generated by CPE 2221, the system may determine that signal frequencies transmitted from transmitter 2314 have ingressed onto the communication link via a break in the link (e.g., coaxial cable).

Additionally, element 2514 of display 2510 shows that CPE 2221 is detecting a signal frequency of approximately 88 MHz on the communication link at user premises 2201. As discussed above with reference to FIG. 23, transmitter 2314 associated with the KVOD broadcast station is transmitting signal frequencies at 88.1 MHz. Thus, by processing the frequency spectrum data generated by CPE 2221, the system may determine that signal frequencies transmitted from transmitter 2314 have ingressed onto the communication link via a break in the link (e.g., coaxial cable). As illustrated by elements 2511 and 2512, CPE 2221 is further detecting signal frequencies of at least 89 and 91 MHz on the communication link, which correspond to the frequencies being transmitted by transmitters 2311 and 2312, respectively.

As discussed above, by processing and analyzing the frequency spectrum data generated by a CPE, the system may determine that frequencies other than the intended communication frequency have ingressed onto the communication link. In particular, as shown in display 2510, frequencies transmitted by at least five transmitters (e.g., transmitters 2311-2315) located in a geographic area encompassed by map 2310, have ingressed onto the communication link, and are being detected by CPE 2221 at user premises 2201. Additionally, or alternatively, the system may process and analyze frequency spectrum data generated by a CPE to determine the signal amplitude of over-the-air frequencies on a communication link that is detected by the CPE. As discussed in further detail below, the system may determine the location of the signal ingress (or egress) by utilizing frequency spectrum data obtained by one or more CPEs on the network (e.g., CPE 2221) that detect signal frequencies originating from (e.g., transmitted from) transmitters 2311-2315 to determine the location and/or magnitude of signal ingress (or egress) in the network.

FIG. 26 illustrates an example layout of user premises and signal transmission devices according to one or more illustrative aspects of the disclosure. Map 2610 depicts user premises 2201 and 2204, transmitters 2311-2315 in a particular geographic area. Map 2610 further depicts the location of a break (e.g., break 2601) in a communication link. As discussed above, over-the-air frequencies transmitted from transmitters 2311-2315 may enter onto the communication link within the network via break 2601. Conversely, intended communication frequencies transmitted on the communication link may egress at break 2601. CPEs at one or more user premises located downstream from break 2601 may detect over-the-air frequencies emitted from transmitters 2311-2315 on the communication link.

Figure 27B:
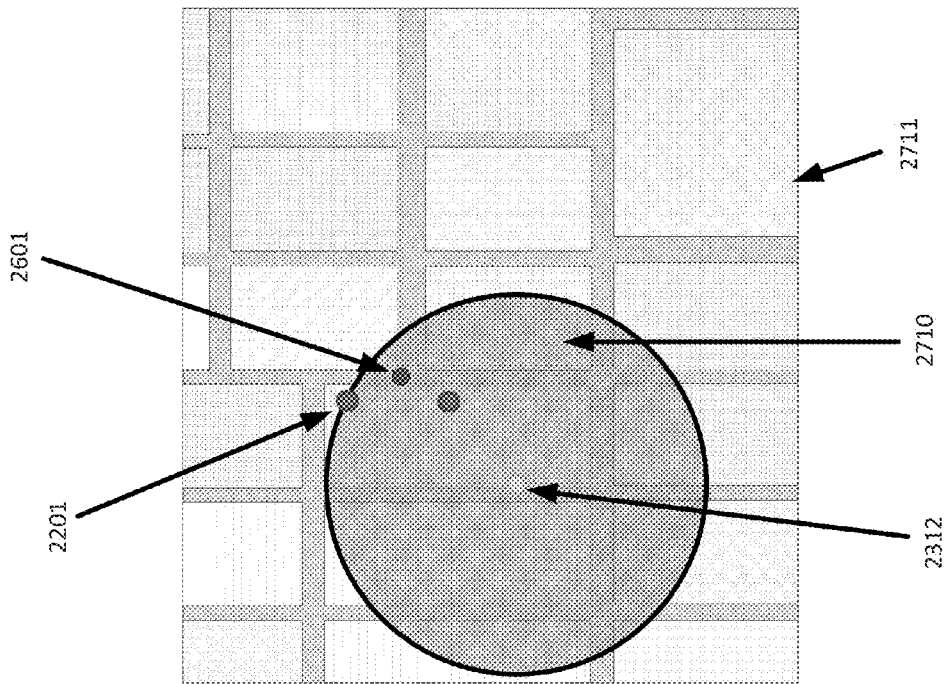
FIGS. 27A-B illustrate example layouts of user premises and signal transmission devices for detecting the location signal leaks according to one or more illustrative aspects of the disclosure.
Figure 27A:
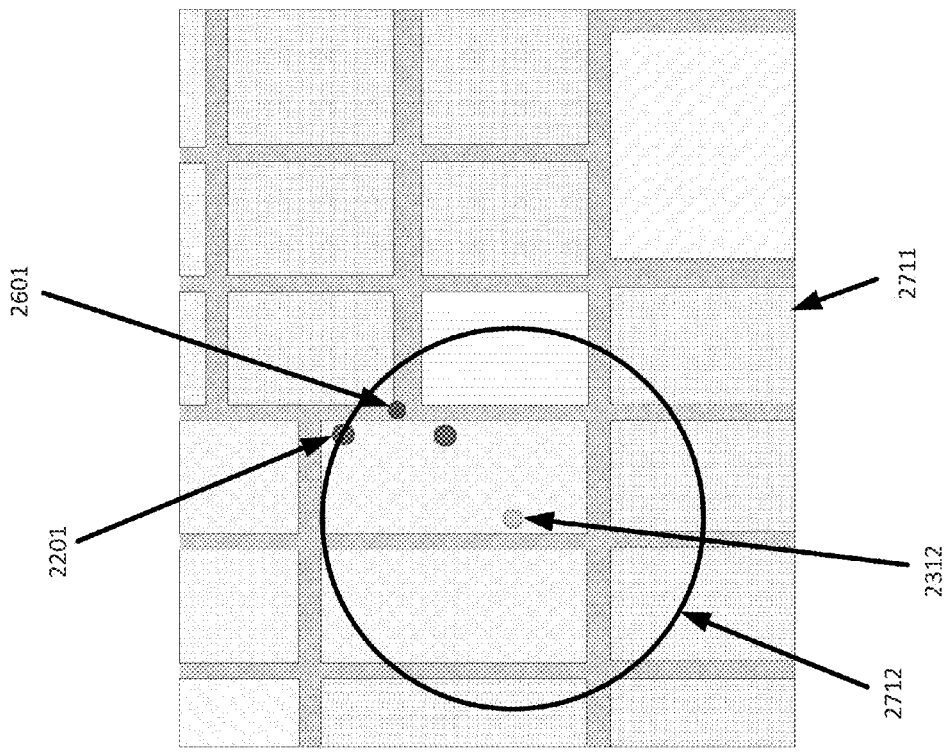

FIGS. 27A-B illustrate example layouts of user premises and signal transmission devices for detecting the location signal leaks according to one or more illustrative aspects of the disclosure. Map 2711 depicts user premises 2201 and 2204, transmitter 2312, and a location of break 2601 in the communication link. As discussed above with respect to FIG. 21, the system may determine an expected signal boundary for a CPE with respect to a particular transmitter. As illustrated in FIG. 27A, element 2712 identifies the expected signal boundary (or periphery) associated with transmitter 2312 and a CPE located at user premises 2201. Signal boundary 2712 represents a shape of the radiation pattern associated with transmitter 2312 that is emitting over-the-air signals in all directions at equal transmission strengths. Transmitter 2312 is located the center of signal boundary 2712, and the radius of boundary 2312 corresponds to the distance between transmitter 2312 and the CPE located at user premises 2201. As noted above with reference to FIG. 21, the expected signal boundary defines an area where the over-the-air signal emitted from transmitter 2312 has a signal amplitude equal to the calculated expected amplitude of the signal emitted from transmitter 2312 at the location of user premises 2201.

The system may determine whether the location of signal ingress or egress is located inside or outside of the expected signal boundary based on a comparison of the expected amplitude of the over-the-air signal emitted from transmitter 2312 that should be detected by the CPE at user premises 2201, and the actual amplitude of the over-the-air signal emitted from transmitter 2312 that is detected by the CPE at user premises 2201 over the communication link. The expected amplitude of the signal emitted from transmitter 2312 at user premises 2201 will be greater than the measured amplitude if the location of the signal ingress or egress is outside of the expected signal boundary. When over-the-air signals emitted from transmitter 2312 enter the communication link at a location that is determined to be further away than the distance from transmitter 2312 to user premises 2201, the over-the-air signal enters the communication link, and is propagated through the link, having an amplitude that is less than (e.g., weaker than) the expected amplitude of the over-the-air signal received at user premises 2201 given that the user premises is determined to be closer to transmitter 2312 than the location of the break in the communication link.

Conversely, when over-the-air signals emitted from transmitter 2312 enter the communication link at a location that is determined to be closer than the distance from transmitter 2312 to user premises 2201, the over-the-air signal enters the communication link, and is propagated through the link, having an amplitude that is greater than (e.g., stronger than) the expected amplitude of the over-the-air signal received at user premises 2201 given that the user premises is determined to be further away from transmitter 2312 than the location of the break in the communication link.

Referring back to FIG. 27A, in this example, the amplitude of the expected signal is less than the amplitude of the signal measured at the CPE at user premises 2201. Thus, the location of the break in the communication link (e.g., the location of the signal ingress or egress), is located within signal boundary 2712 because the over-the-air signal emitted from transmitter 2312 is entering the communication link at a distance that is determined to be closer to transmitter 2312 than the distance of user premises 2201 to the transmitter. The system may identify an area where the location of the signal ingress or egress may be estimated and/or predicted to be. As depicted by FIG. 27B, the system identified area 2710, which is located within signal boundary 2712, where the location of the signal ingress or egress may be estimated (or predicted) to be.

Figure 27D:
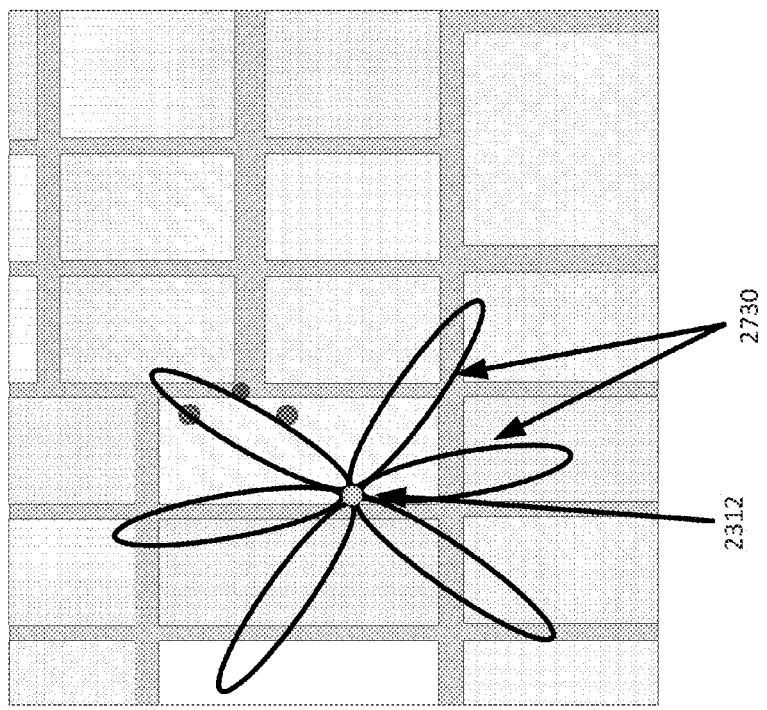
FIGS. 27C-D illustrate example layouts of signal transmission devices and corresponding radiation patterns according to one or more illustrative aspects of the disclosure.
Figure 27C:
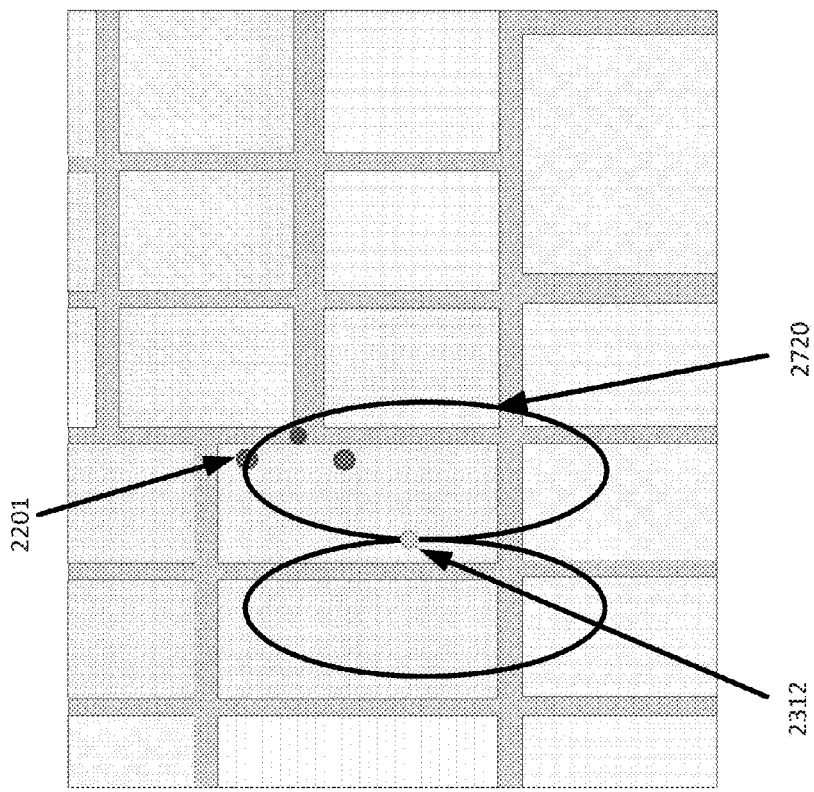

As noted above, the signal boundary may represent a shape of the radiation pattern associated with over-the-air signals, e.g., wireless transmissions, emitted from a transmitter. As will be appreciated, each transmitter may have its own unique radiation pattern, and a transmitter may have a radiation pattern that is different than the default radiation pattern that is illustrated in FIGS. 27A-B. The system may retrieve, from a database (e.g., FCC or Whitespace database), information identifying a radiation pattern for a particular transmitter. As illustrated in FIGS. 27C-D, the radiation pattern for a transmitter may comprise a variety of shapes that emit signal frequencies over a variety of different geographic areas. Accordingly, the expected signal boundaries identified for transmitters having different radiation patterns may vary.

For example, signal boundary 2720 depicted in FIG. 27C defines an area where the over-the-air signal emitted from transmitter 2312 (having a first radiation pattern) has a signal amplitude equal to the calculated expected amplitude of the signal emitted from transmitter 2312 at the location of user premises 2201. As another example, signal boundary 2730 depicted in FIG. 27D defines an area where the over-the-air signal emitted from transmitter 2312 (having a second, different radiation pattern) has a signal amplitude equal to the calculated expected amplitude of the signal emitted from transmitter 2312 at the location of user premises 2201.

Figure 28B:
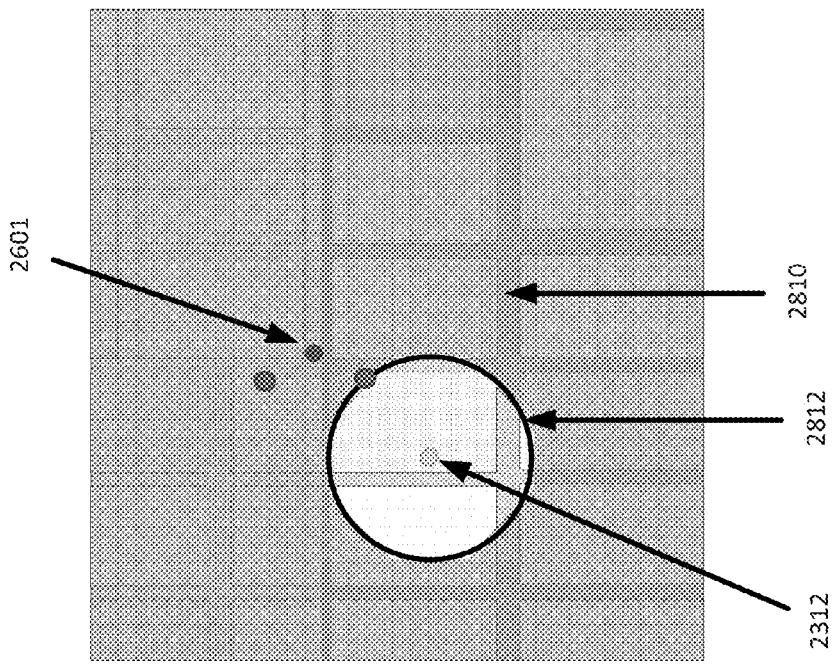
FIGS. 28A-B illustrate example layouts of user premises and signal transmission devices for detecting the location signal leaks according to one or more illustrative aspects of the disclosure.
Figure 28A:
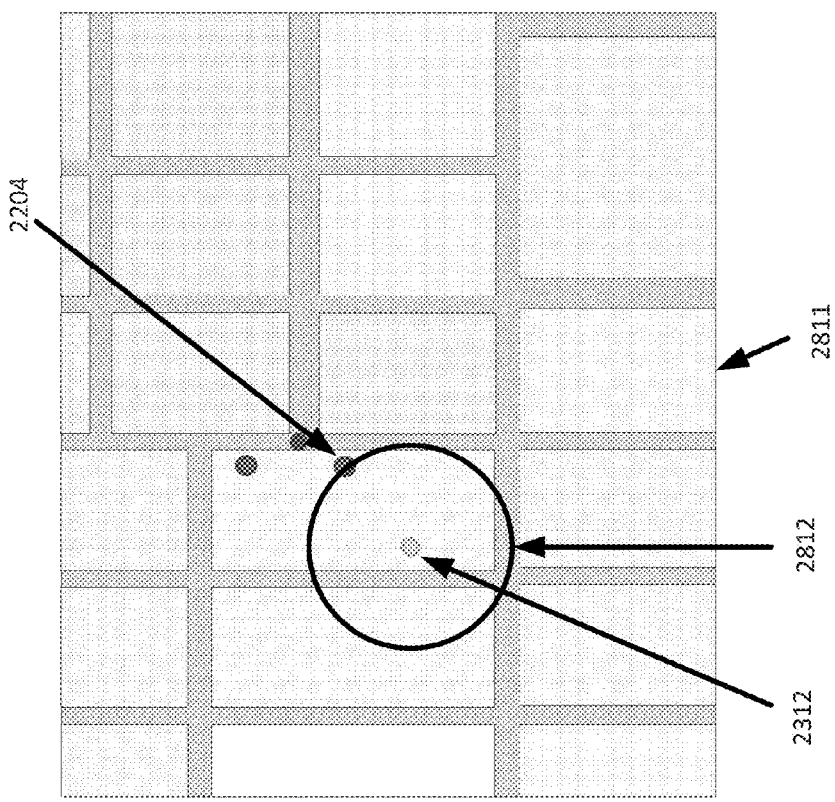

FIGS. 28A-B illustrate example layouts of user premises and signal transmission devices for detecting the location signal leaks according to one or more illustrative aspects of the disclosure. FIG. 28A shows map 2811 which depicts signal boundary 2812 associated with transmitter 2312 and user premises 2204. Signal boundary 2812 defines an area where the over-the-air signal emitted from transmitter 2312 has a signal amplitude equal to the calculated expected amplitude of the signal emitted from transmitter 2312 at the location of user premises 2204. Transmitter 2312 is located at the center of signal boundary 2812, and the radius of boundary 2812 corresponds to the distance between transmitter 2312 and the CPE located at user premises 2204.

Referring to FIG. 28B, in this example, the amplitude of the expected signal is greater than the amplitude of the signal measured at the CPE at user premises 2204. Accordingly, the location of the break in the communication link (e.g., the location of the signal ingress or egress), is located outside signal boundary 2812 because the over-the-air signal emitted from transmitter 2312 is entering the communication link at a distance that is determined to be further from transmitter 2312 than the distance of user premises 2204 to the transmitter. As depicted by FIG. 28B, the system may identify an area (i.e., area 2810) outside of signal boundary 2812 where the location of the signal ingress or egress may be estimated (or predicted) to be.

Figure 29:
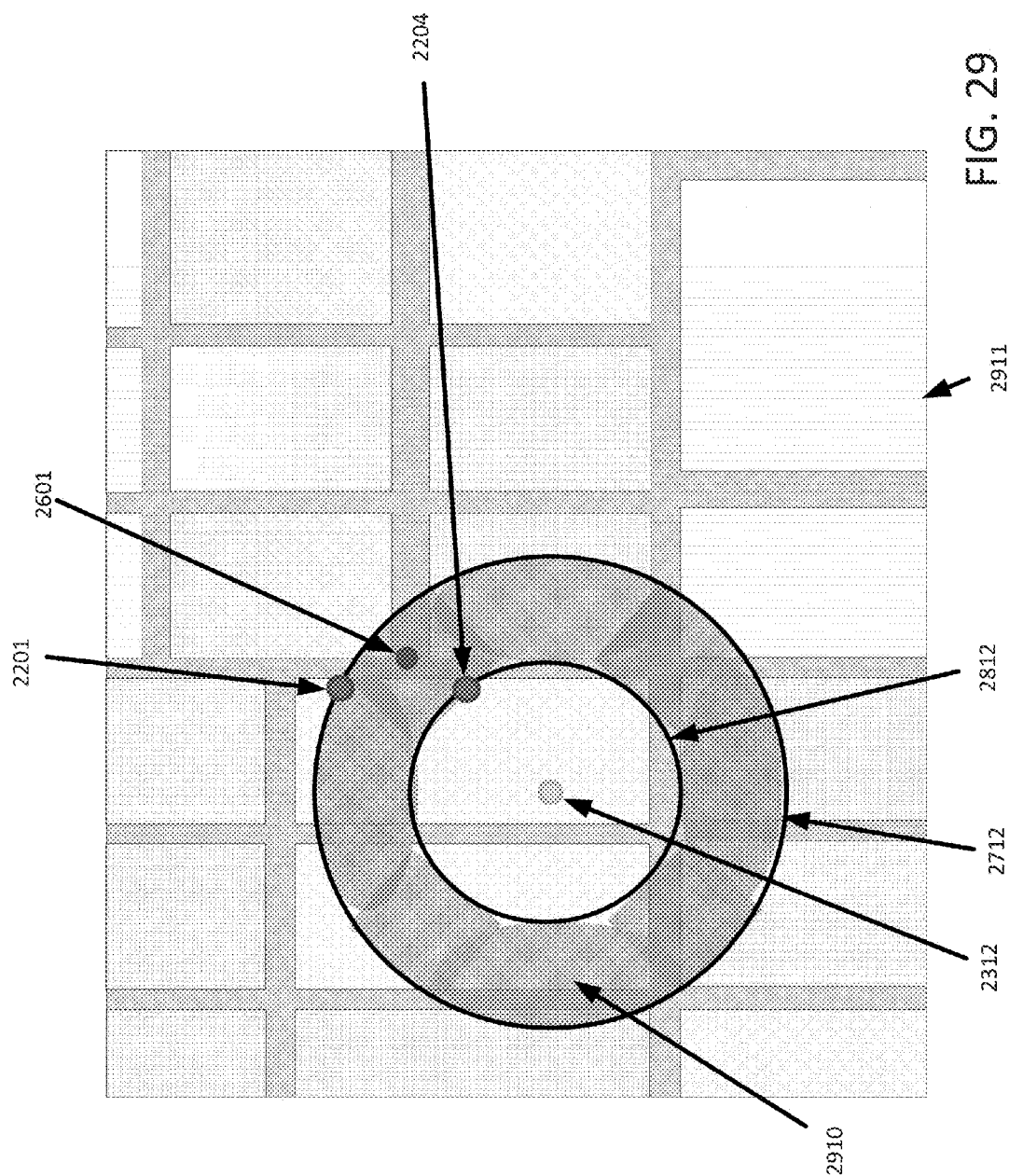
FIG. 29 illustrates an example layout of user premises and signal transmission devices for detecting the location signal leaks according to one or more illustrative aspects of the disclosure.

FIG. 29 illustrates an example layout of user premises and signal transmission devices for detecting the location signal leaks according to one or more illustrative aspects of the disclosure. In particular, area 2910 in map 2911 depicts the resulting overlap between areas 2710 and 2810 as illustrated in FIGS. 27B and 28B, respectively. Area 2910 may be the overlap between an interfering signal from transmitter 2312 received at two locations 2201 and 2204. The overlap may occur when the system determines that the leak is closer than location 2201, but further than location 2204. The system may utilize identified area 2910, the overlapping area, to determine the location of break 2601. As discussed in more detailed below with respect to FIG. 32, the system may compare the area 2910 with a map of the wiring layout of the wired network, and identify the area(s) of wire (e.g., communication links) that overlap the area 2910.

Figure 30B:
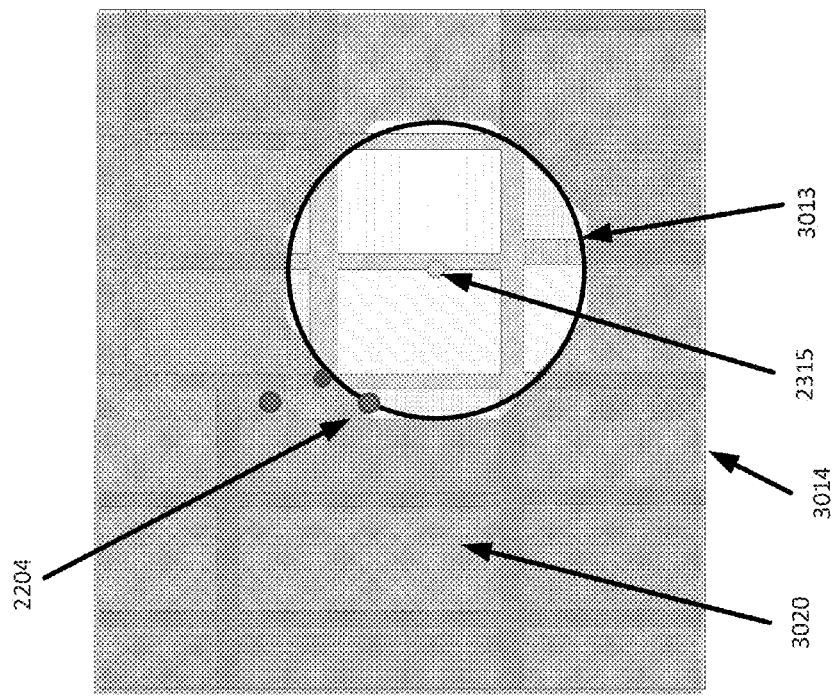
FIGS. 30A-B illustrate example layouts of user premises and signal transmission devices for detecting the location signal leaks according to one or more illustrative aspects of the disclosure.
Figure 30A:
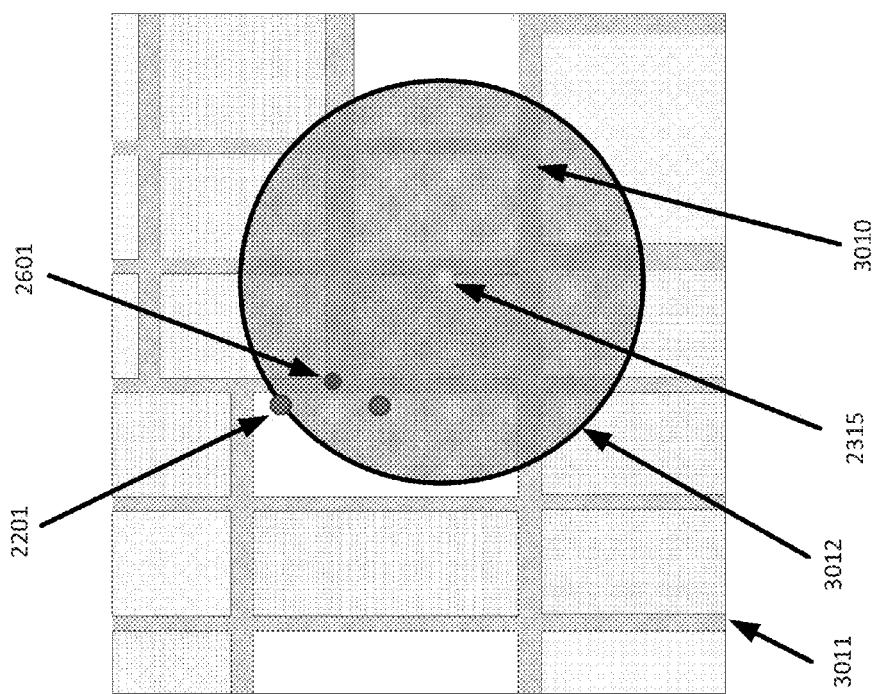

FIGS. 30A-B illustrate additional examples in which multiple data-points may be used to generate overlapping areas where the location of a signal leak may be determined according to one or more illustrative aspects of the disclosure. Map 3011 depicts user premises 2201 and 2204, transmitter 2315, and a location of break 2601 in the communication link. Element 3012 identifies the expected signal boundary (or periphery) associated with transmitter 2315 and a CPE located at user premises 2201. Signal boundary 3012 defines an area where the over-the-air signal emitted from transmitter 2315 has a signal amplitude equal to the calculated expected amplitude of the signal emitted from transmitter 2315 at the location of user premises 2201.

Transmitter 2315 is located at the center of signal boundary 3012, and the radius of boundary 3012 corresponds to the distance between transmitter 2315 and the CPE located at user premises 2201. Referring to FIG. 30A, in this example, the amplitude of the expected signal is less than the amplitude of the signal measured at the CPE at user premises 2201. Accordingly, the location of the break in the communication link (e.g., the location of the signal ingress or egress), is located inside signal boundary 3012 because the over-the-air signal emitted from transmitter 2315 is entering the communication link at a distance that is determined to be closer to transmitter 2312 than the distance of user premises 2201 to the transmitter. The system may identify an area (i.e., area 3010) inside of signal boundary 3012 corresponding to the general location of the signal ingress or egress.

Referring now to FIG. 30B, map 3014 shows signal boundary 3013, which is associated with transmitter 2315 and a CPE located at user premises 2204. Signal boundary 3013 defines an area where the over-the-air signal emitted from transmitter 2315 has a signal amplitude equal to the calculated expected amplitude of the signal emitted from transmitter 2315 at the location of user premises 2204. In this example, the amplitude of the expected signal is greater than the amplitude of the signal measured at the CPE at user premises 2201. Accordingly, the location of the break in the communication link (e.g., the location of the signal ingress or egress), is located outside signal boundary 3013 because the over-the-air signal emitted from transmitter 2315 is entering the communication link at a distance that is determined to be further from transmitter 2312 than the distance of user premises 2204 to the transmitter. The system may identify an area (i.e., area 3020) outside of signal boundary 3013 where the location of the signal ingress or egress may be estimated to be.

Figure 30C:
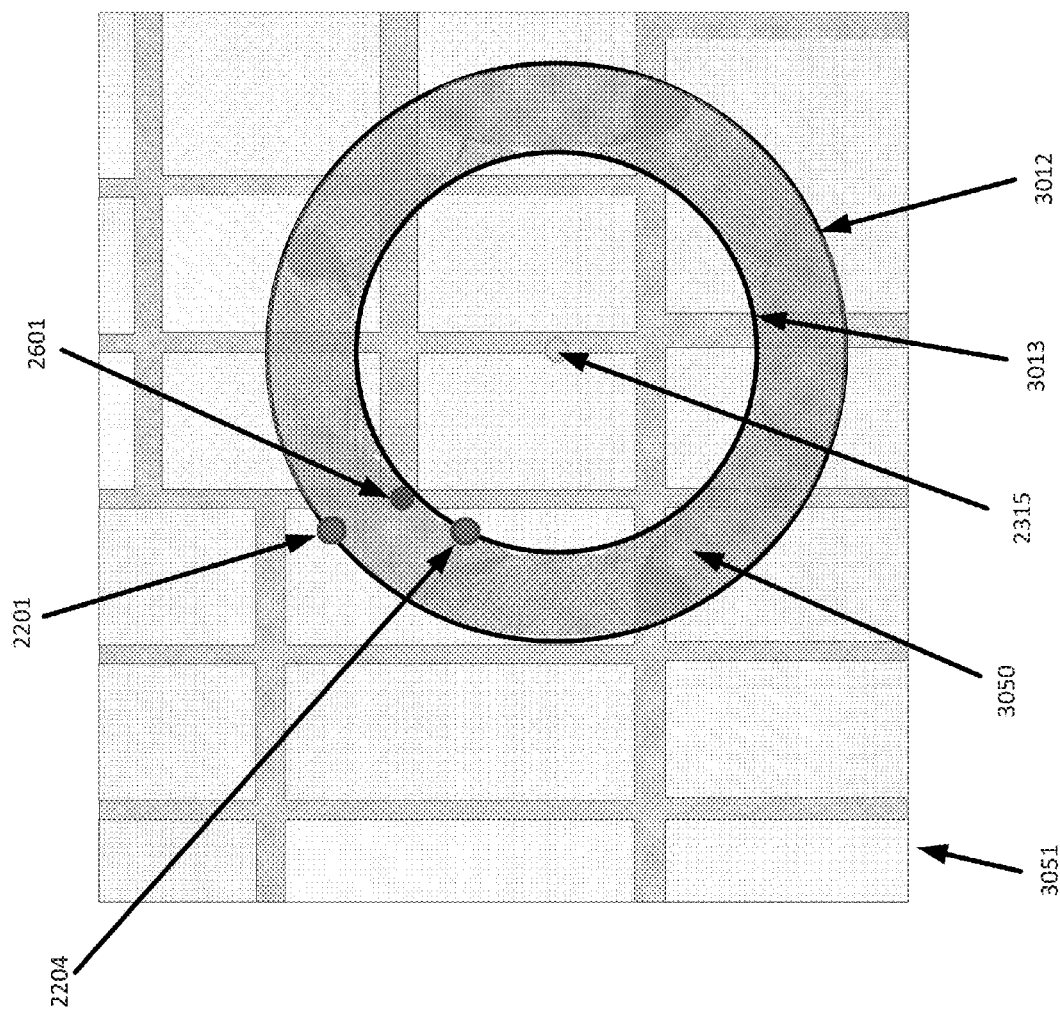
FIG. 30C illustrates an example layout of user premises and signal transmission devices for detecting the location signal leaks according to one or more illustrative aspects of the disclosure.

FIG. 30C illustrates an example in which multiple data points may be used to determine overlapping areas that may identify a location of a signal leak according to one or more illustrative aspects of the disclosure. Area 3050 may be the overlap between an interfering signal from transmitter 2315 received at two locations 2201 and 2204. In particular, area 3050 is defined by the overlap between areas 3010 and 3020 as discussed with respect to FIGS. 30A-B. The overlap may occur when the system determines that the leak is closer than location 2204, but further than location 2201. The system may utilize identified area 3050, the overlapping area, to determine the location of break 2601. As discussed in more detail below with respect to FIG. 32, the system may compare area 3050 with a map of the wiring layout of the wired network, and identify the area(s) of the wire that overlap with area 3050.

Figure 31:
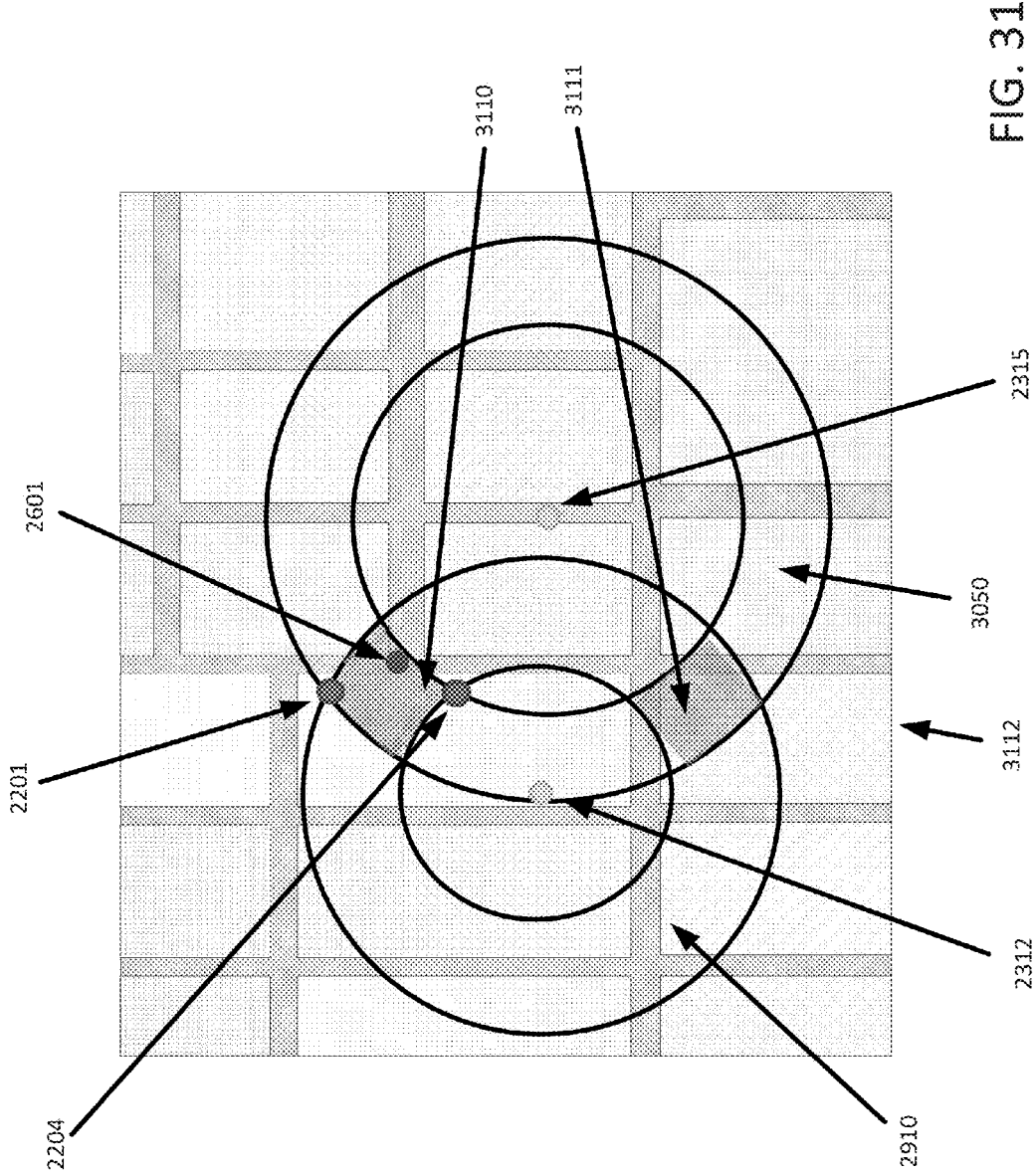
FIG. 31 illustrates an example layout of user premises and signal transmission devices for detecting the location of signal leaks according to one or more illustrative aspects of the disclosure.

When these measurements are made with multiple transmitters and multiple CPE locations, the resulting overlap in the location predictions may significantly help in pinpointing the location of the leak. FIG. 31 illustrates an example in which noise from two transmitters (512 and 2315) were received at two locations (e.g., user premises 2201 and 2204). As discussed above with reference to FIG. 21, the system may determine the location of a break in the communication link (e.g., break 2601) by identifying, for multiple CPEs (e.g., CPEs located at locations 2201 and 2204), the expected signal boundaries associated with multiple transmitters (e.g., transmitters 2312 and 2315). The system may compare the overlap between the areas defined by signal boundaries associated with transmitters 2312 and 2315 with respect to user premises 2201 and 2204. The resulting overlaps in coverage result in small areas 3110 and 3111 where the leak (e.g., break 2601) may be estimated to be.

In some embodiments, the system may retrieve data (e.g., frequency spectrum data) associated with additional user premises and/or transmitters within a vicinity of transmitters 2312 and 2315, and/or within the vicinity of user premises 2201 and 2204, to identify additional expected signal boundaries and corresponding areas where the break in the communication link may be located. To determine a more precise location of break 2601 (and/or to confirm the location of the break), the system may compare a first data set indicating the additional corresponding areas identified by the system where break 2601 may be located, with a second data set indicating the areas shown in FIG. 31 to determine any overlap between the areas where break 2601 may be located. The system may continue to determine a more precise location of break 2601 by further identifying additional expected signal boundaries and corresponding areas where break 2601 may be located, and further identifying any overlap between the additional corresponding areas and previously identified locations where break 2601 may be located.

Figure 32:
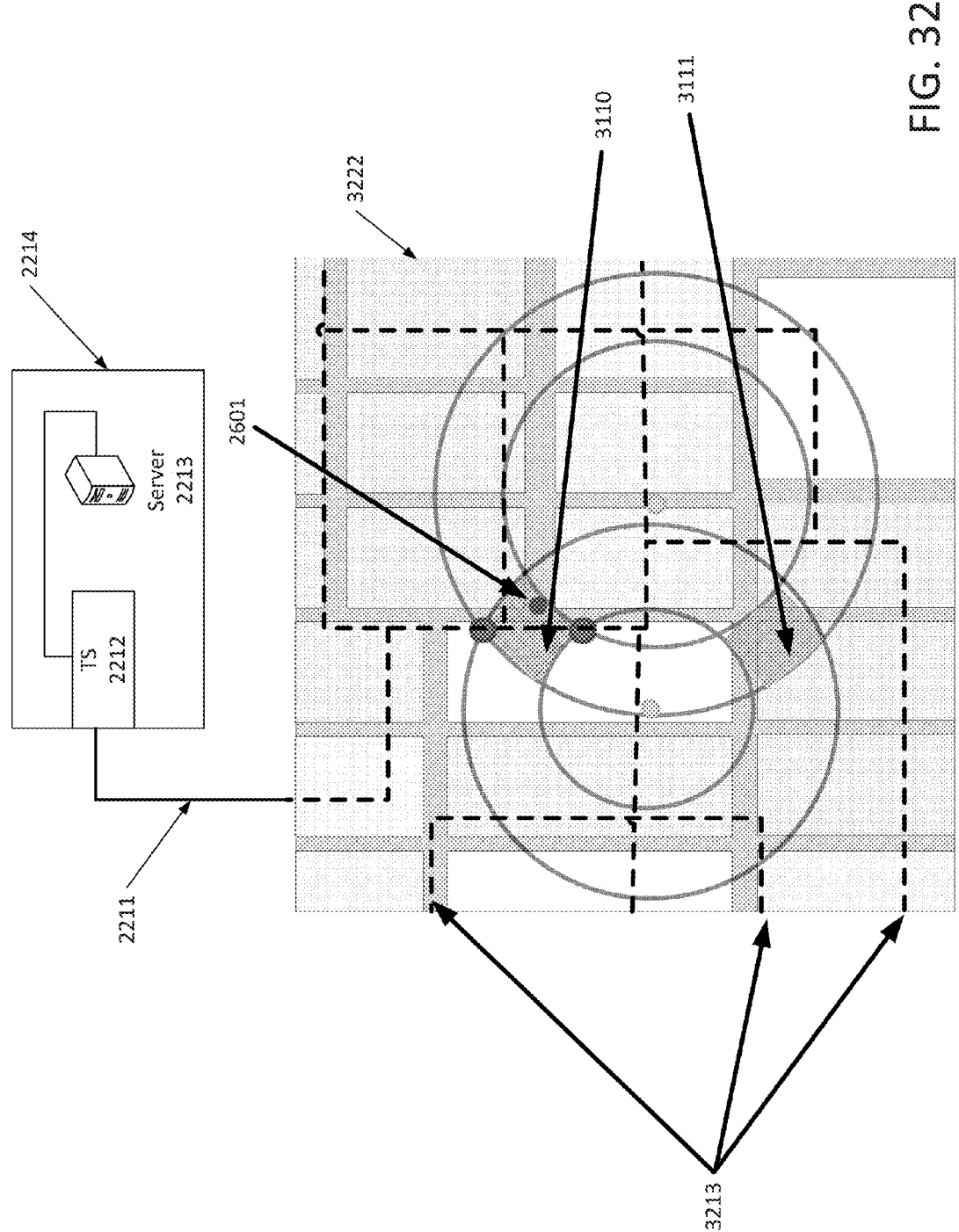
FIG. 32 illustrates an example layout of communication links, user premises and signal transmission devices for detecting the location of signal leaks according to one or more illustrative aspects of the disclosure.

Referring now to FIG. 32, in some embodiments, the system may identify and/or confirm the location of break 2601 by comparing one or more areas identified by the system as potential locations for break 2601 with data indicating the layout of communication links within the network. FIG. 32 illustrates an example layout of communication links in the network, user premises and signal transmission devices for detecting the location of signal leaks according to one or more illustrative aspects of the disclosure. In particular, FIG. 32 depicts a map of the communication links originating from local office 2214, which distribute signal to the various premises in the geographic area shown in map 3222, including user premises 2201 and 2201. As shown in FIG. 32, communication link 2211 is split into multiple communication links (e.g., links 3213). The system may retrieve from memory information indicating the location of communication links within a particular geographic area. Additionally, the system may query one or more computing devices associated with the network provider to request information indicating the location of communication links within a particular geographic area.

To identify and/or confirm the location of break 2601, the system may compare a first data set indicating the one or more areas identified by the system where break 2601 may be located, with a second data set indicating the various locations of communication links within the network. They system may identify the location(s) of communication link that overlap with the areas identified by the system where break 2601 may be located to determine any overlap. For example, referring now to FIG. 32, the system may compare the location of areas 3110 and 3111 (e.g., the one or more areas identified by the system where break 2601 may be located) with the various locations of link 3213 to determine whether any of the areas overlap with the communication link.

In some embodiments, if the system determines that multiple areas where the break in the communication link may be located overlap with locations of communication links in the network, the system may attempt to determine (and/or triangulate) a more precise location of the break (e.g., signal ingress or egress) by identifying additional expected signal boundaries and corresponding areas where the break may be located, and identifying any overlap between the additional corresponding areas identified by the system and previously identified locations where the break may be located, as discussed with respect to FIG. 31.

Figure 33A:
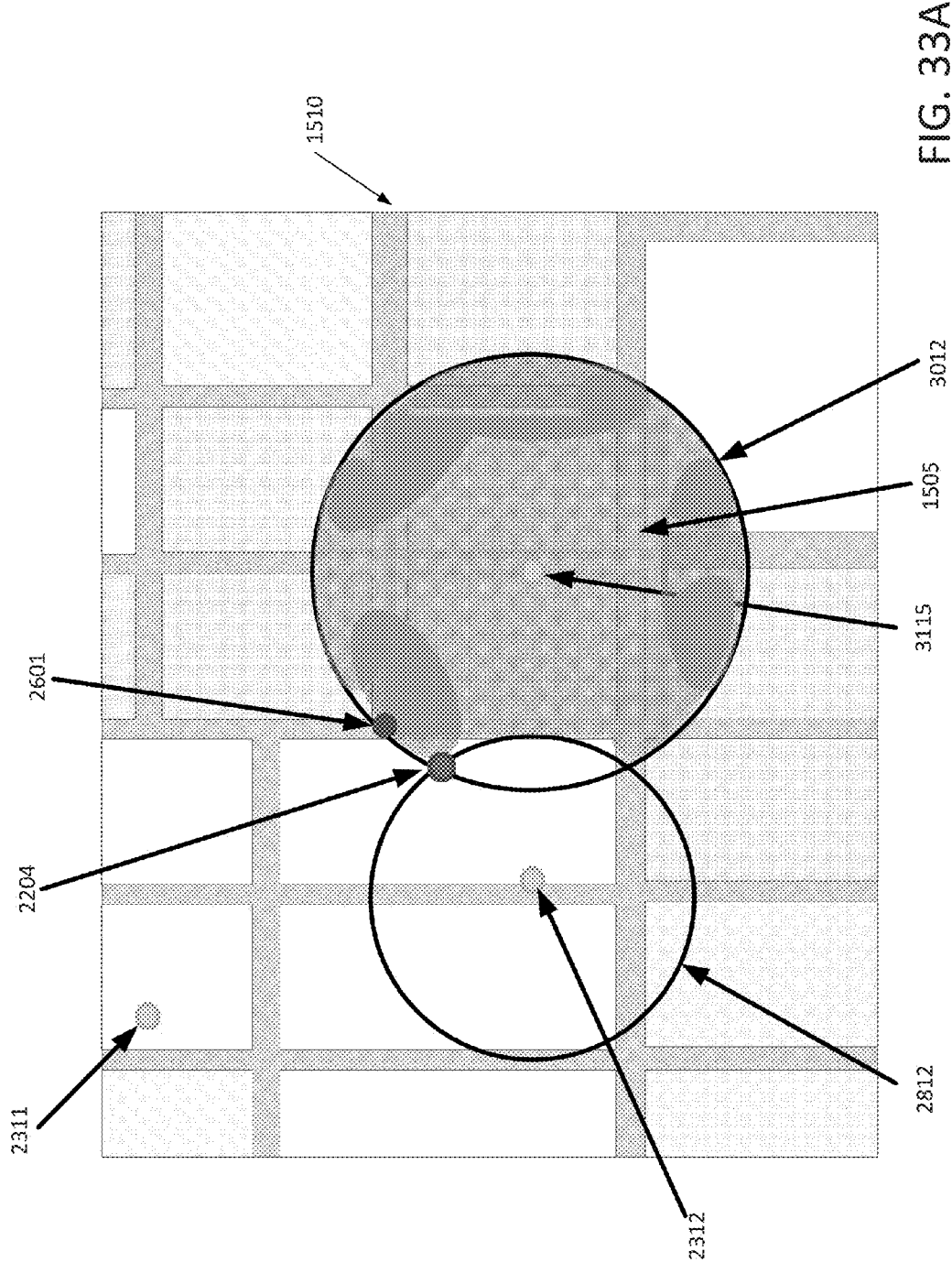
FIGS. 33A-B illustrate an example layout of user premises and signal transmission devices for detecting the location of signal leaks according to one or more illustrative aspects of the disclosure.

Referring now to FIG. 33A, in some embodiments, the system may identify and/or confirm the location of a break (e.g., break 2601) by identifying additional expected signal boundaries and corresponding areas where the break in the communication link may be located. In some embodiments, the system may identify additional expected signal boundaries by identifying additional transmitters that are emitting over-the-air signals that are being detected by a CPE at a particular user premises. Map 3310 illustrates expected signal boundary 2812 for transmitter 2312 with respect to user premises 2204, and expected signal boundary 3012 for transmitter 2315 with respect to user premises 2204. Map 3310 also depicts an additional transmitter 2311. As discussed with respect to FIGS. 28B and 30A, area 2810 and area 3010 have been identified by the leakage detection system as areas where signal leak (e.g., break 2601) may be located. FIG. 33A depicts area 3305 which comprises the overlap in coverage between areas 2810 and 3010. The system may utilize identified area 3305 to determine the location of break 2601.

Figure 33B:
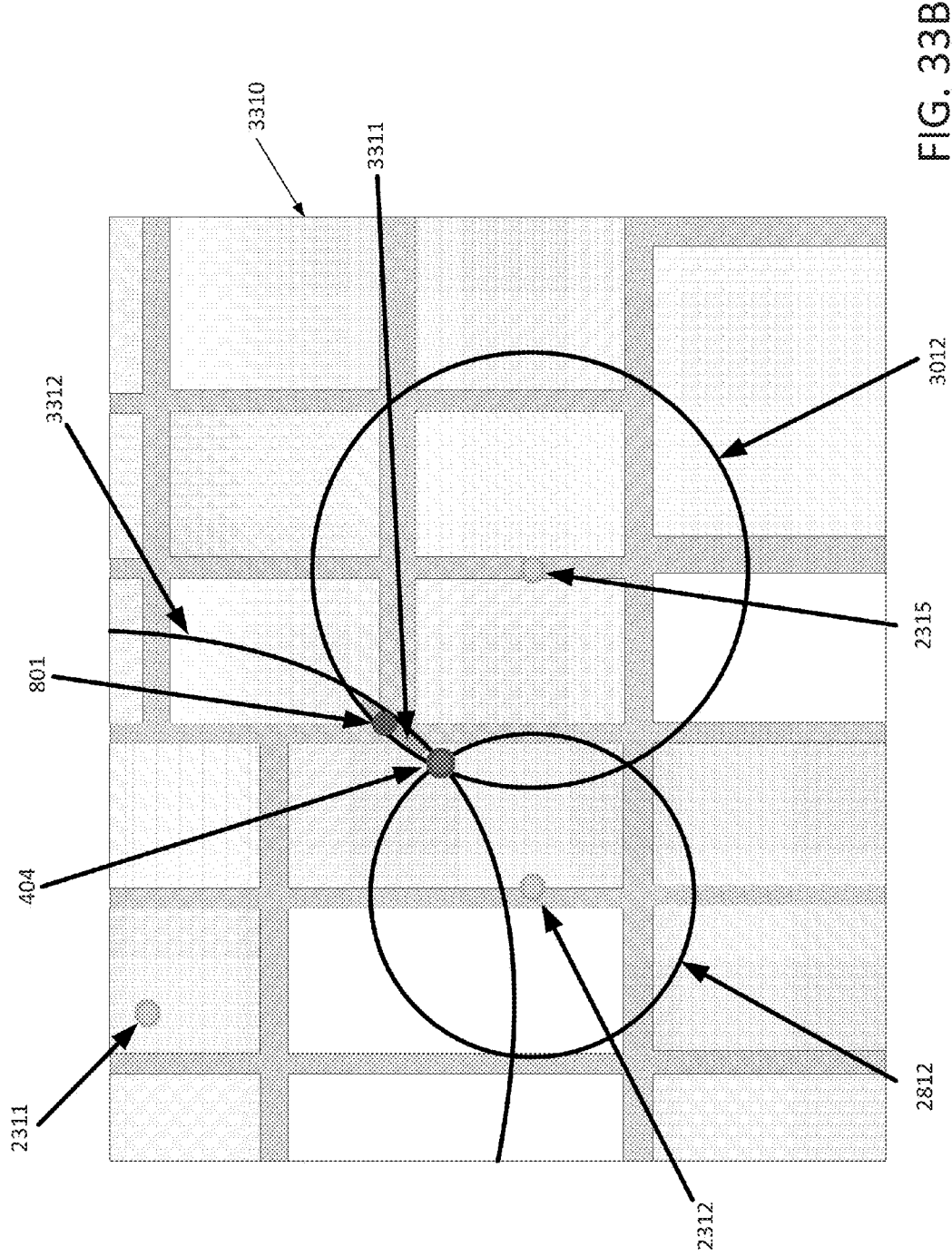

In some embodiments, the system may identify additional transmitters emitting over-the-air signals onto a communication link and may obtain frequency spectrum data for the identified transmitter with respect to a CPE such that the resulting overlap in location predictions may assist in pinpointing the location of the leak (e.g., break 2601). FIG. 33B illustrates an example in which noise from three transmitters (2311, 2312, and 2315) were received at one location (e.g., user premise 2204). The resulting overlaps in coverage result in small area 3311 where the leak 2601 may be estimated to be. In particular, the leakage detection system may identify an expected signal boundary for additional transmitters that emit over-the-air signals that are entering the communication link and have been detected by a CPE at a particular user premises. The system may identify additional transmitter based on frequency spectrum data and transmitter information retrieved from a database. In the example depicted in FIG. 33B, the system has identified transmitter 2311 as an additional transmitter that a CPE at user premises 2204 has detected as emitting over-the-air signals that are entering the communication link via a break (e.g., break 2601). The system may identify a signal boundary (e.g., boundary 3312) for transmitter 2311 with respect to user premises 2204. Transmitter 2311 is located the center of signal boundary 3312, and the radius of boundary 3312 corresponds to the distance between transmitter 2315 and the CPE located at user premises 2204.

In this example, the amplitude of the expected signal with respect to transmitter 2311 is less than the amplitude of the signal measured at the CPE at user premises 2204. Accordingly, the location of the break in the communication link (e.g., the location of the signal ingress or egress), is located inside signal boundary 3312 because the over-the-air signal emitted from transmitter 2315 is entering the communication link at a distance that is determined to be closer to transmitter 2311 than the distance of user premises 2204 to the transmitter. The system may compare the overlap between area 3305 and the area identified by the system where break 2601 may be located with respect to signal boundary 3312. Based on this comparison, as depicted by FIG. 33B, the system may identify area 3311 as the estimated location of break 2601.

Figure 34:
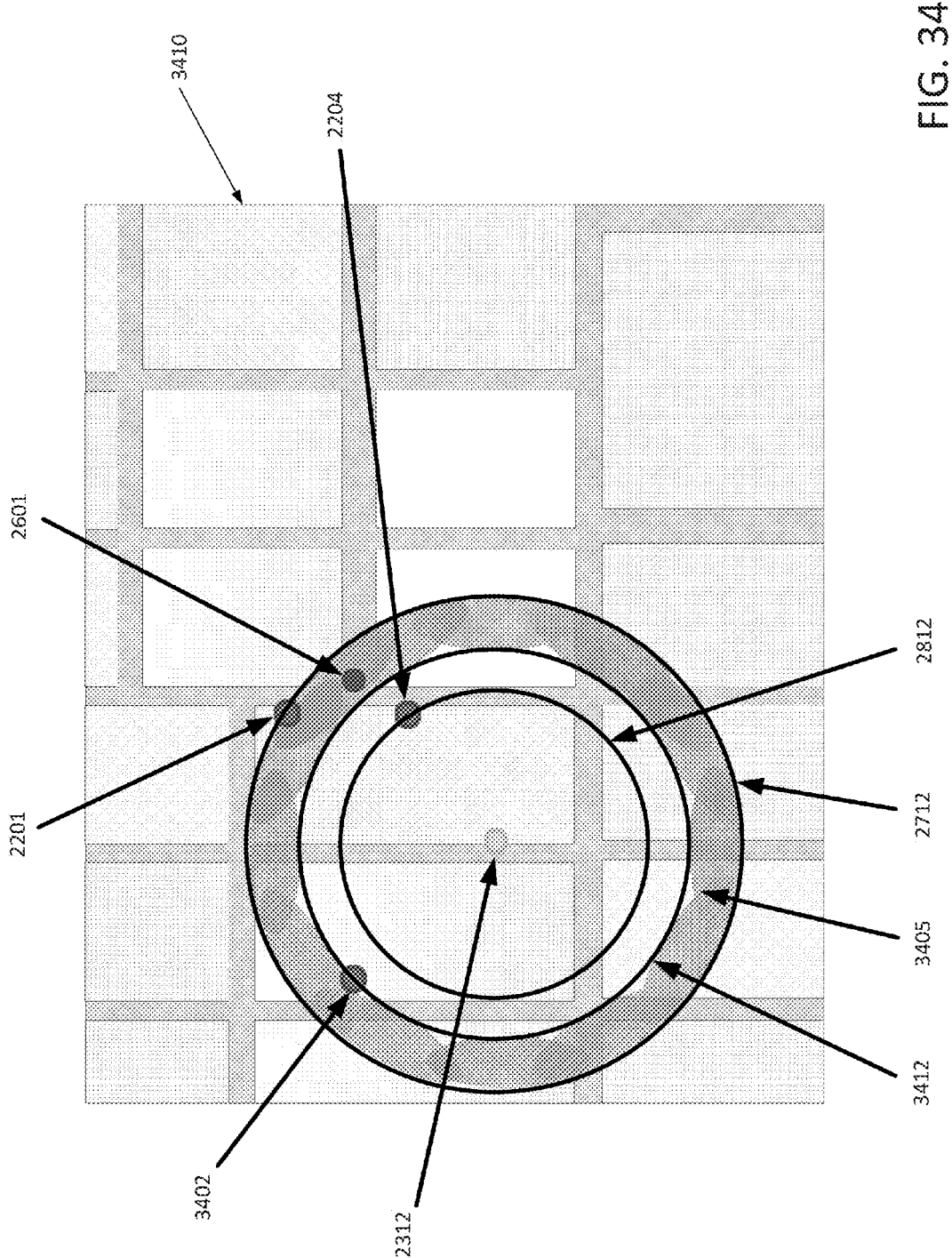
FIG. 34 illustrates an example layout of user premises and signal transmission devices for detecting the location of signal leaks according to one or more illustrative aspects of the disclosure.

In other embodiments, the system may identify additional CPEs at one or more user premises that are detecting (or receiving) over-the-air signals emitted from a particular transmitter. FIG. 34 illustrates an example in which noise from transmitter was received at three locations (e.g., user premises 2201, 2204, and 3402). The resulting overlaps in coverage result in area 3412 where the leak 2601 may be estimated to be.

In particular, the system may identify additional CPEs at particular user premises detecting over-the-air signals emitted from transmitter 2312 that are entering the communication link via a break (e.g., break 2601). The system may identify the one or more CPEs that are detecting signals emitted from transmitter 2312 on the communication link based on frequency spectrum data obtained by the CPE and transmitter information retrieved from a database. Referring back to FIG. 29, area 2910 is defined by signal boundaries 2712 for and 2812. Referring now to FIG. 34, in this example, a CPE at user premises 3402 has been identified by the system as an additional CPE detecting over-the-air signals emitted from transmitter 2312 that have entered the communication link via a break (e.g., break 2601). The system may identify a signal boundary (e.g., boundary 3412) for transmitter 2312 with respect to user premises 3402. Transmitter 2312 is located the center of signal boundary 3412, and the radius of boundary 3412 corresponds to the distance between transmitter 2312 and the CPE located at user premises 3402.

In this example, the amplitude of the expected signal is greater than the amplitude of the signal emitted from transmitter 2312 that is detected and/or measured at the CPE at user premises 3402. Accordingly, the location of the break in the communication link (e.g., the location of the signal ingress or egress), is located outside signal boundary 3412 because the over-the-air signal emitted from transmitter 2312 is entering the communication link at a distance that is farther from transmitter 2312 than the distance of user premises 3402 to the transmitter. The system may compare the overlap between the area where break 2601 may be located as defined by signal boundaries 2712 and 2812 (e.g., area 2910), and the area identified by the system where break 2601 may be located with respect to signal boundary 3412. Based on this comparison, as depicted by FIG. 34, the system may identify that the location of break 2601 is within area 3405. As discussed further below, in some embodiments, the system may compare an area identified as the location of a break in the communication link (e.g., area 3405) with the location of communication links within the network to identify and/or confirm the location of the break.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

We claim:

1. A method comprising:
   detecting, on a wired communication path, a presence of an external signal caused by an over-the-air signal received by a computing device;
   identifying strengths at which the over-the-air signal was received over the wired communication path at a plurality of different locations in a network;
   comparing the strengths received over the wired communication path with expected signal strengths at the plurality of different locations; and
   identifying a location in the network at which the over-the-air signal is entering the network based on the comparison.

2. The method of claim 1, further comprising:
   retrieving, from a database, transmitter information associated with a transmission device generating the over-the-air signal.

3. The method of claim 2, further comprising:
   calculating, by a processor, expected signal strengths at the plurality of different locations based on the transmitter information.

4. The method of claim 1, wherein identifying strengths at which the over-the-air signal was received further comprises:
   receiving, from one or more computing devices, frequency spectrum data corresponding to strengths of frequency signals detected on the wired communication path.

5. The method of claim 4, further comprising:
   outputting, on a display device, a visual depiction of the frequency spectrum data.

6. The method of claim 1, wherein identifying the location in the network at which the over-the-air signal is entering the network further comprises:
   determining the location at which the over-the-air signal is entering the network based on the difference between the strengths received over the wired communication path and the expected signal strengths at one or more locations in the plurality of different locations.

7. The method of claim 1, wherein identifying the location in the network at which the over-the-air signal is entering the network further comprises:

identifying a first area and a second area where the over-the-air signal is entering the network.

8. The method of claim 7, further comprising:
identifying a third area consisting of an overlap between the first area and the second area.

9. The method of claim 8, further comprising:
comparing a location of the third area with a location of the wired communication path.

10. A method comprising:
detecting, on a wired communication path, a presence of a plurality of wireless transmissions emitted from a plurality of transmission devices;
identifying, at a first location in a network, a first computing device having detected the plurality of wireless transmissions;
for each transmission device in the plurality of transmission devices, identifying an expected signal strength of the wireless transmission at the first location and an actual signal strength at which the wireless transmission was received over the wired communication path at the first location; and
determining a location in the network where the plurality of wireless transmissions are entering the wired communication path based on a comparison of the actual and expected signal strengths.

11. The method of claim 10, further comprising:
for each transmission device in the plurality of transmission devices:
determining whether the expected signal strength is greater than the actual signal strength; and
identifying an area where the wireless transmission is entering the wired communication path based on the determination.

12. The method of claim 11, wherein determining a location in the network where the plurality of wireless transmissions are entering the wired communication path further comprises:
determining a location where identified areas overlap.

13. The method of claim 10, wherein identifying the expected signal strength of the wireless transmission further comprises:
determining a loss in strength associated with a propagation of the wireless transmission, over the wired communication path, from a transmission device to the first computing device.

14. The method of claim 10, further comprising:
identifying a frequency radiation pattern for at least one transmission device in the plurality of transmission devices.

15. A method comprising:
detecting, on a wired communication path, a presence of a first wireless transmission received by a first computing device and a second computing device at a first location and a second location;
identifying expected signal strengths at the first location and the second location with respect to a first transmission device generating the first wireless transmission;
identifying actual signal strengths at which the first wireless transmission was received over the wired communication path at the first location and the second location;
identifying a first area at which the first wireless transmission is entering the wired communication path based on a comparison of the expected and actual signal strengths at the first location; and
identifying a second area at which the first wireless transmission is entering the wired communication path based on a comparison of the expected and actual signal strengths at the second location.

16. The method of claim 15, further comprising:
identifying a third area where the first area and the second area overlap.

17. The method of claim 16, further comprising:
comparing a location of the third area with a location of the wired communication path.

18. The method of claim 17, further comprising:
identifying a location in a network at which the first wireless transmission is entering the network based on the comparison.

19. The method of claim 15, wherein identifying a first area at which the first wireless transmission is entering the wired communication path further comprises:
identifying a periphery defining one or more locations where amplitude of the first wireless transmission corresponds to an expected signal strength at the first location with respect to the first transmission device.

20. The method of claim 15, wherein the first wireless transmission is a frequency modulated transmission.

* * * * *

UNITED STATES PATENT AND TRADEMARK OFFICE
CERTIFICATE OF CORRECTION

PATENT NO.        : 9,444,719 B2                                                      Page 1 of 1
APPLICATION NO. : 14/498553
DATED             : September 13, 2016
INVENTOR(S)       : Wolcott et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 136 days.

Signed and Sealed this
Twenty-fifth Day of September, 2018

Andrei Iancu
*Director of the United States Patent and Trademark Office*